(12) United States Patent
Siddiqi et al.

(10) Patent No.: US 10,848,540 B1
(45) Date of Patent: *Nov. 24, 2020

(54) VIRTUAL RESOURCE LOCATOR

(71) Applicant: Conviva Inc., Foster City, CA (US)

(72) Inventors: Faisal Zakaria Siddiqi, San Jose, CA (US); Alexey Serbin, Palo Alto, CA (US); Alexander Schneidman, San Francisco, CA (US); Alexander Kolbasov, Palo Alto, CA (US); Soumyadeb Mitra, San Mateo, CA (US); Aditya R. Ganjam, San Francisco, CA (US); Ion Stoica, Piedmont, CA (US); Hui Zhang, Pittsburgh, PA (US)

(73) Assignee: Conviva Inc., Foster City, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/182,305

(22) Filed: Nov. 6, 2018

Related U.S. Application Data

(63) Continuation of application No. 14/229,724, filed on Mar. 28, 2014, now Pat. No. 10,182,096, which is a
(Continued)

(51) Int. Cl.
| | |
|---|---|
| *G06F 15/16* | (2006.01) |
| *H04L 29/06* | (2006.01) |
| *H04N 21/472* | (2011.01) |
| *H04N 21/24* | (2011.01) |
| *H04N 21/231* | (2011.01) |
| *H04L 29/08* | (2006.01) |

(52) U.S. Cl.
CPC ........ *H04L 65/608* (2013.01); *H04L 65/4084* (2013.01); *H04L 67/306* (2013.01); *H04N 21/23103* (2013.01); *H04N 21/2402* (2013.01); *H04N 21/2404* (2013.01); *H04N 21/47202* (2013.01)

(58) Field of Classification Search
CPC . H04L 65/608; H04L 65/4084; H04L 67/306; H04N 21/23103; H04N 21/2402; H04N 21/2404; H04N 21/47202
See application file for complete search history.

(56) References Cited

U.S. PATENT DOCUMENTS

| | | |
|---|---|---|
| 5,926,204 A | 7/1999 | Mayer |
| 5,930,473 A | 7/1999 | Teng |
| (Continued) | | |

OTHER PUBLICATIONS

"Firefly-Inspired Heartbeat Synchronization in Overlay Networks"—Binci et al., University of Bologna, Italy, Feb. 2007 http://www.cs.unibo.it/babaoglu/courses/cas06-07/papers/pdf/fireflies.pdf.
(Continued)

*Primary Examiner* — Sm A Rahman
(74) *Attorney, Agent, or Firm* — Van Pelt, Yi & James LLP

(57) ABSTRACT

Directing a content player to a content source is disclosed. A message from a content management system including information associated with a client that is currently requesting content is received. Based at least in part on the information included in the message, a set of content sources is determined. Instructions indicating the set of content sources for the client are sent to the content management system.

19 Claims, 20 Drawing Sheets

Related U.S. Application Data continuation-in-part of application No. 13/752,252, filed on Jan. 28, 2013, now Pat. No. 9,246,965.

(60) Provisional application No. 61/806,648, filed on Mar. 29, 2013, provisional application No. 61/697,225, filed on Sep. 5, 2012.

(56) References Cited

U.S. PATENT DOCUMENTS

| | | |
|---|---|---|
| 5,987,621 A | 11/1999 | Duso |
| 6,006,264 A | 12/1999 | Colby |
| 6,026,077 A | 2/2000 | Iwata |
| 6,032,857 A | 3/2000 | Kitagawa |
| 6,188,993 B1 | 2/2001 | Eng |
| 6,208,977 B1 | 3/2001 | Hernandez |
| 6,223,206 B1 | 4/2001 | Dan |
| 6,250,557 B1 | 6/2001 | Forslund |
| 6,279,039 B1 | 8/2001 | Bhat |
| 6,324,565 B1 | 11/2001 | Holt, III |
| 6,377,996 B1 | 4/2002 | Lumelsky |
| 6,405,251 B1 | 6/2002 | Bullard |
| 6,434,159 B1 | 8/2002 | Woodward |
| 6,438,592 B1 | 8/2002 | Killian |
| 6,469,991 B1 | 10/2002 | Chuah |
| 6,470,389 B1 | 10/2002 | Chung |
| 6,487,540 B1 | 11/2002 | Smith |
| 6,502,747 B1 | 1/2003 | Stoutenburg |
| 6,542,933 B1 | 4/2003 | Durst, Jr. |
| 6,711,622 B1 | 3/2004 | Fuller |
| 6,735,630 B1 | 5/2004 | Gelvin |
| 6,754,833 B1 | 6/2004 | Black |
| 6,769,028 B1 | 7/2004 | Sass |
| 6,836,691 B1 | 12/2004 | Stirton |
| 6,892,236 B1 | 5/2005 | Conrad |
| 6,892,307 B1 | 5/2005 | Wood |
| 6,906,743 B1 | 6/2005 | Maurer |
| 6,920,580 B1 | 7/2005 | Cramer |
| 6,941,270 B1 | 9/2005 | Hannula |
| 6,950,855 B2 | 9/2005 | Sampathkumar |
| 7,006,666 B2 | 2/2006 | Montgomery |
| 7,010,598 B2 | 3/2006 | Sitaraman |
| 7,020,082 B2 | 3/2006 | Bhagavath |
| 7,024,452 B1 | 4/2006 | O'Connell, Jr. |
| 7,024,468 B1 | 4/2006 | Meyer |
| 7,039,694 B2 | 5/2006 | Kampe |
| 7,092,696 B1 | 8/2006 | Hosain |
| 7,139,834 B1 | 11/2006 | Albanese |
| 7,159,234 B1 | 1/2007 | Murphy |
| 7,222,190 B2 | 5/2007 | Klinker |
| 7,233,926 B2 | 6/2007 | Durand |
| 7,277,896 B2 | 10/2007 | Matsubara |
| 7,313,087 B2 | 12/2007 | Patil |
| 7,318,107 B1 | 1/2008 | Menon |
| 7,353,023 B1 | 4/2008 | Link, II |
| 7,356,341 B2 | 4/2008 | Nanda |
| 7,367,044 B2 | 4/2008 | Fowler |
| 7,373,415 B1 | 5/2008 | Deshan |
| 7,389,537 B1 | 6/2008 | Callon |
| 7,487,509 B2 | 2/2009 | Hugly |
| 7,490,136 B2 | 2/2009 | Suzuki |
| 7,509,372 B2 | 3/2009 | Dutta |
| 7,519,703 B1 | 4/2009 | Stuart |
| 7,574,488 B2 | 8/2009 | Matsubara |
| 7,593,333 B2 | 9/2009 | Li |
| 7,599,698 B2 | 10/2009 | Cheng |
| 7,617,525 B1 | 11/2009 | Moeck |
| 7,620,848 B1 | 11/2009 | Tanner |
| 7,627,872 B2 | 12/2009 | Hebeler |
| 7,668,761 B2 | 2/2010 | Jenkins |
| 7,668,914 B2 | 2/2010 | Parker |
| 7,689,485 B2 | 3/2010 | Kanekar |
| 7,689,508 B2 | 3/2010 | Davis |
| 7,698,460 B2 | 4/2010 | Zhang |
| 7,702,581 B2 | 4/2010 | Hogl |
| 7,721,292 B2 | 5/2010 | Frasier |
| 7,725,576 B2 | 5/2010 | Sitaraman |
| 7,792,889 B1 | 9/2010 | Lee |
| 7,813,326 B1 | 10/2010 | Kelm |
| 7,844,491 B1 | 11/2010 | Haitsuka |
| 7,853,529 B1 | 12/2010 | Walker |
| 7,873,727 B2 | 1/2011 | Pal |
| 7,904,580 B2 | 3/2011 | Mandera |
| 7,921,215 B2 | 4/2011 | Dessart |
| 7,921,222 B2 | 4/2011 | Courtemanche |
| 7,930,347 B2 | 4/2011 | Maxwell |
| 7,941,823 B2 | 5/2011 | Hasek |
| 7,969,987 B1 | 6/2011 | Hansen |
| 7,970,402 B2 | 6/2011 | Wu |
| 8,028,159 B2 | 9/2011 | Li |
| 8,038,535 B2 | 10/2011 | Jensen |
| 8,046,765 B2 | 10/2011 | Cherkasova |
| 8,098,160 B2 | 1/2012 | Howarth |
| 8,108,403 B2 | 1/2012 | Gopalraj |
| 8,135,855 B2 | 3/2012 | Sitaraman |
| 8,156,204 B2 | 4/2012 | Leblanc |
| 8,182,326 B2 | 5/2012 | Speer, II |
| 8,230,105 B2 | 7/2012 | Melnyk |
| 8,234,350 B1 | 7/2012 | Gu |
| 8,259,597 B1 | 9/2012 | Oak |
| 8,370,887 B2 | 2/2013 | Virdi |
| 8,374,929 B1 | 2/2013 | Lappas |
| 8,387,094 B1 | 2/2013 | Ho |
| 8,402,494 B1 | 3/2013 | Hu |
| 8,417,797 B2 | 4/2013 | Thoen |
| 8,484,319 B2 | 7/2013 | Wein |
| 8,489,683 B2 | 7/2013 | Leblanc |
| 8,489,923 B1 | 7/2013 | Lakshminarayanan |
| 8,555,355 B2 | 10/2013 | Rathbun |
| 8,589,473 B2 | 11/2013 | Bruss |
| 8,639,553 B1 | 1/2014 | Knauth |
| 8,647,203 B2 | 2/2014 | Albrecht |
| 8,677,428 B2 | 3/2014 | Lewis |
| 8,683,066 B2 | 3/2014 | Hurst |
| 8,719,876 B2 * | 5/2014 | Kotecha .............. H04L 65/4084 725/68 |
| 8,751,605 B1 | 6/2014 | Zhang |
| 8,751,679 B2 | 6/2014 | McHugh |
| 8,843,597 B2 | 9/2014 | Leblanc |
| 8,874,725 B1 | 10/2014 | Ganjam |
| 8,874,964 B1 | 10/2014 | Lakshminarayanan |
| 8,898,338 B1 | 11/2014 | McGowan |
| 8,909,736 B1 * | 12/2014 | Bosch ................. H04L 67/1093 709/217 |
| 8,924,996 B2 | 12/2014 | Shafiee |
| 8,930,991 B2 | 1/2015 | Philpott |
| 8,943,170 B2 | 1/2015 | Li |
| 8,954,491 B1 | 2/2015 | Medved |
| 9,098,844 B2 | 8/2015 | Davis |
| 9,100,288 B1 | 8/2015 | Ganjam |
| 9,100,826 B2 | 8/2015 | Weiss |
| 9,264,780 B1 | 2/2016 | Stoica |
| 9,356,821 B1 | 5/2016 | Jagannathan |
| 9,456,015 B2 | 9/2016 | Chen |
| 9,549,043 B1 | 1/2017 | Stoica |
| 9,613,042 B1 | 4/2017 | Joseph |
| 9,819,566 B1 | 11/2017 | Ganjam |
| 9,898,781 B1 | 2/2018 | Silverman |
| 10,021,672 B2 | 7/2018 | Cole |
| 10,530,852 B2 | 1/2020 | Newton |
| 2002/0002708 A1 | 1/2002 | Arye |
| 2002/0016831 A1 | 2/2002 | Peled |
| 2002/0029190 A1 | 3/2002 | Gutierrez-Sheris |
| 2002/0052841 A1 | 5/2002 | Guthrie |
| 2002/0082730 A1 | 6/2002 | Capps |
| 2002/0095400 A1 | 7/2002 | Johnson |
| 2002/0126135 A1 | 9/2002 | Ball |
| 2002/0133601 A1 | 9/2002 | Kennamer |
| 2002/0141343 A1 | 10/2002 | Bays |
| 2002/0143798 A1 | 10/2002 | Lisiecki |
| 2002/0175934 A1 | 11/2002 | Hand |
| 2002/0183972 A1 | 12/2002 | Enck |
| 2002/0184357 A1 | 12/2002 | Traversat |
| 2002/0198984 A1 | 12/2002 | Goldstein |

(56) References Cited

U.S. PATENT DOCUMENTS

| | | |
|---|---|---|
| 2003/0046383 A1 | 3/2003 | Lee |
| 2003/0046396 A1 | 3/2003 | Richter |
| 2003/0046704 A1 | 3/2003 | Laksono |
| 2003/0046708 A1 | 3/2003 | Jutzi |
| 2003/0050966 A1 | 3/2003 | Dutta |
| 2003/0051051 A1 | 3/2003 | O'Neal |
| 2003/0061305 A1 | 3/2003 | Copley |
| 2003/0061356 A1 | 3/2003 | Jason, Jr. |
| 2003/0065739 A1 | 4/2003 | Shnier |
| 2003/0065763 A1 | 4/2003 | Swildens |
| 2003/0074142 A1 | 4/2003 | Steeg |
| 2003/0084003 A1 | 5/2003 | Pinkas |
| 2003/0105850 A1 | 6/2003 | Lean |
| 2003/0135593 A1 | 7/2003 | Lee |
| 2003/0140108 A1 | 7/2003 | Sampathkumar |
| 2003/0140180 A1 | 7/2003 | Brown |
| 2003/0145066 A1 | 7/2003 | Okada |
| 2003/0169863 A1 | 9/2003 | Hernandez |
| 2003/0204613 A1 | 10/2003 | Hudson |
| 2004/0010544 A1 | 1/2004 | Slater |
| 2004/0019675 A1 | 1/2004 | Hebeler |
| 2004/0047354 A1 | 3/2004 | Slater |
| 2004/0049793 A1 | 3/2004 | Chou |
| 2004/0057420 A1 | 3/2004 | Curcio |
| 2004/0064556 A1 | 4/2004 | Zhang |
| 2004/0088347 A1 | 5/2004 | Yeager |
| 2004/0093155 A1 | 5/2004 | Simonds |
| 2004/0107387 A1 | 6/2004 | Larsson |
| 2004/0128682 A1 | 7/2004 | Liga |
| 2004/0133471 A1 | 7/2004 | Pisaris-Henderson |
| 2004/0136327 A1 | 7/2004 | Sitaraman |
| 2004/0158643 A1 | 8/2004 | Suzuki |
| 2004/0162901 A1 | 8/2004 | Mangipudi |
| 2004/0187159 A1 | 9/2004 | Gaydos |
| 2004/0193716 A1 | 9/2004 | McConnell |
| 2004/0233918 A1 | 11/2004 | Larsson |
| 2004/0236846 A1 | 11/2004 | Alvarez |
| 2004/0267691 A1 | 12/2004 | Vasudeva |
| 2005/0010915 A1 | 1/2005 | Chen |
| 2005/0021715 A1 | 1/2005 | Dugatkin |
| 2005/0060158 A1 | 3/2005 | Endo |
| 2005/0076104 A1 | 4/2005 | Liskov |
| 2005/0086300 A1 | 4/2005 | Yeager |
| 2005/0086469 A1 | 4/2005 | Dunagan |
| 2005/0089043 A1 | 4/2005 | Seckin |
| 2005/0114262 A1 | 5/2005 | Howard |
| 2005/0120131 A1 | 6/2005 | Allen |
| 2005/0169179 A1 | 8/2005 | Antal |
| 2005/0177785 A1 | 8/2005 | Shrader |
| 2005/0183120 A1 | 8/2005 | Jain |
| 2005/0187873 A1 | 8/2005 | Labrou |
| 2005/0243735 A1 | 11/2005 | Kashima |
| 2005/0251835 A1 | 11/2005 | Scott |
| 2005/0278259 A1 | 12/2005 | Gunaseelan |
| 2006/0052100 A1 | 3/2006 | Almgren |
| 2006/0059248 A1 | 3/2006 | Ikeda |
| 2006/0075094 A1 | 4/2006 | Wen |
| 2006/0085246 A1 | 4/2006 | Li |
| 2006/0100932 A1 | 5/2006 | Ohmori |
| 2006/0123080 A1 | 6/2006 | Baudino |
| 2006/0135172 A1 | 6/2006 | Dronne |
| 2006/0136218 A1 | 6/2006 | Lee |
| 2006/0136597 A1 | 6/2006 | Shabtai |
| 2006/0143350 A1 | 6/2006 | Miloushev |
| 2006/0165060 A1 | 7/2006 | Dua |
| 2006/0168304 A1 | 7/2006 | Bauer |
| 2006/0179154 A1 | 8/2006 | Sitaraman |
| 2006/0190615 A1 | 8/2006 | Panwar |
| 2006/0206539 A1 | 9/2006 | Thompson |
| 2006/0236017 A1 | 10/2006 | Rooholamini |
| 2006/0246880 A1 | 11/2006 | Baldwin |
| 2006/0259949 A1 | 11/2006 | Schaefer |
| 2006/0285489 A1 | 12/2006 | Francisco |
| 2007/0005809 A1 | 1/2007 | Kobayashi |
| 2007/0025381 A1 | 2/2007 | Feng |
| 2007/0041584 A1 | 2/2007 | O'Connor |
| 2007/0055632 A1 | 3/2007 | Hogl |
| 2007/0066403 A1 | 3/2007 | Conkwright |
| 2007/0097997 A1 | 5/2007 | MacLean |
| 2007/0101202 A1 | 5/2007 | Garbow |
| 2007/0125840 A1 | 6/2007 | Law |
| 2007/0136311 A1 | 6/2007 | Kasten |
| 2007/0140113 A1 | 6/2007 | Gemelos |
| 2007/0150612 A1 | 6/2007 | Chaney |
| 2007/0183427 A1 | 8/2007 | Nylander |
| 2007/0198413 A1 | 8/2007 | Nagao |
| 2007/0204011 A1 | 8/2007 | Shaver |
| 2007/0232332 A1 | 10/2007 | Holur |
| 2007/0250560 A1 | 10/2007 | Wein |
| 2007/0265984 A1 | 11/2007 | Santhana |
| 2007/0282994 A1 | 12/2007 | Beers |
| 2007/0286351 A1 | 12/2007 | Ethier |
| 2007/0288638 A1 | 12/2007 | Vuong |
| 2008/0016205 A1 | 1/2008 | Svendsen |
| 2008/0037438 A1 | 2/2008 | Twiss |
| 2008/0046499 A1 | 2/2008 | Cabrera |
| 2008/0046777 A1 | 2/2008 | Chen |
| 2008/0046974 A1 | 2/2008 | Minodier |
| 2008/0049616 A1 | 2/2008 | Kamath |
| 2008/0049786 A1 | 2/2008 | Ram |
| 2008/0052226 A1 | 2/2008 | Agarwal |
| 2008/0063195 A1 | 3/2008 | Li |
| 2008/0096562 A1 | 4/2008 | Wu |
| 2008/0104454 A1 | 5/2008 | White |
| 2008/0112315 A1 | 5/2008 | Hu |
| 2008/0120707 A1 | 5/2008 | Ramia |
| 2008/0140520 A1 | 6/2008 | Hyder |
| 2008/0140688 A1 | 6/2008 | Clayton |
| 2008/0141131 A1 | 6/2008 | Cerny |
| 2008/0144513 A1 | 6/2008 | Small |
| 2008/0151821 A1 | 6/2008 | Cho |
| 2008/0155586 A1 | 6/2008 | Yang |
| 2008/0195461 A1 | 8/2008 | Li |
| 2008/0209499 A1 | 8/2008 | Ramesh |
| 2008/0215718 A1 | 9/2008 | Stolorz |
| 2008/0215756 A1 | 9/2008 | Lee |
| 2008/0235746 A1 | 9/2008 | Peters |
| 2008/0247326 A1 | 10/2008 | Cormier |
| 2008/0263180 A1 | 10/2008 | Hurst |
| 2008/0305801 A1 | 12/2008 | Burgess |
| 2008/0313040 A1 | 12/2008 | Rose |
| 2009/0010155 A1 | 1/2009 | Liu |
| 2009/0019503 A1 | 1/2009 | Vorbau |
| 2009/0043906 A1 | 2/2009 | Hurst |
| 2009/0059812 A1 | 3/2009 | Chinnaswamy |
| 2009/0082020 A1 | 3/2009 | Ch'ng |
| 2009/0083631 A1 | 3/2009 | Sidi |
| 2009/0106392 A1 | 4/2009 | Zuckerman |
| 2009/0117893 A1 | 5/2009 | Weigand |
| 2009/0119722 A1 | 5/2009 | Versteeg |
| 2009/0125625 A1 | 5/2009 | Shim |
| 2009/0150487 A1 | 6/2009 | Wolfish |
| 2009/0164656 A1 | 6/2009 | Guan |
| 2009/0170440 A1 | 7/2009 | Eyuboglu |
| 2009/0172200 A1 | 7/2009 | Morrison |
| 2009/0187956 A1 | 7/2009 | Sommer |
| 2009/0192929 A1 | 7/2009 | Hoeflinger |
| 2009/0234940 A1 | 9/2009 | Pal |
| 2009/0248872 A1 | 10/2009 | Luzzatti |
| 2009/0271101 A1 | 10/2009 | Relyea |
| 2009/0271520 A1 | 10/2009 | Siddiqui |
| 2009/0288012 A1 | 11/2009 | Hertel |
| 2009/0327489 A1 | 12/2009 | Swildens |
| 2009/0328124 A1 | 12/2009 | Khouzam |
| 2010/0043014 A1 | 2/2010 | Hebeler, Jr. |
| 2010/0080290 A1 | 4/2010 | Mehrotra |
| 2010/0088373 A1 | 4/2010 | Pinkham |
| 2010/0100635 A1 | 4/2010 | Takemura |
| 2010/0114562 A1 | 5/2010 | Hutchinson |
| 2010/0125675 A1 | 5/2010 | Richardson |
| 2010/0131642 A1 | 5/2010 | Chalikouras |
| 2010/0138273 A1 | 6/2010 | Bateni |
| 2010/0161729 A1 | 6/2010 | Leblanc |
| 2010/0169195 A1 | 7/2010 | Trest |

(56) References Cited

U.S. PATENT DOCUMENTS

| | | |
|---|---|---|
| 2010/0235503 A1 | 9/2010 | Sitaraman |
| 2010/0241701 A1 | 9/2010 | Lester |
| 2010/0302002 A1 | 12/2010 | Guo |
| 2010/0306368 A1 | 12/2010 | Gagliardi |
| 2011/0014972 A1 | 1/2011 | Herrmann |
| 2011/0016225 A1 | 1/2011 | Park |
| 2011/0047413 A1 | 2/2011 | McGill |
| 2011/0058675 A1 | 3/2011 | Brueck |
| 2011/0060649 A1 | 3/2011 | Dunk |
| 2011/0082946 A1 | 4/2011 | Gopalakrishnan |
| 2011/0119724 A1* | 5/2011 | Damola ............ H04N 21/47202 725/110 |
| 2011/0179435 A1 | 7/2011 | Cordray |
| 2011/0196943 A1 | 8/2011 | Bornstein |
| 2011/0202593 A1 | 8/2011 | Vaderna |
| 2011/0218957 A1 | 9/2011 | Coon |
| 2011/0235103 A1 | 9/2011 | Ito |
| 2011/0252138 A1 | 10/2011 | Ahuja |
| 2011/0258049 A1 | 10/2011 | Ramer |
| 2011/0296048 A1 | 12/2011 | Knox |
| 2011/0314130 A1 | 12/2011 | Strasman |
| 2012/0007866 A1 | 1/2012 | Tahan |
| 2012/0047542 A1 | 2/2012 | Lewis |
| 2012/0093098 A1 | 4/2012 | Charbit |
| 2012/0110167 A1 | 5/2012 | Joch |
| 2012/0124179 A1 | 5/2012 | Cappio |
| 2012/0173753 A1 | 7/2012 | Moorthy |
| 2012/0178426 A1 | 7/2012 | Filipov |
| 2012/0198492 A1 | 8/2012 | Dhruv |
| 2012/0204068 A1 | 8/2012 | Ye |
| 2012/0204153 A1 | 8/2012 | Peterson |
| 2012/0209717 A1 | 8/2012 | Henry |
| 2012/0219271 A1 | 8/2012 | Vunic |
| 2012/0221421 A1 | 8/2012 | Hammad |
| 2012/0226734 A1 | 9/2012 | Poese |
| 2012/0231885 A1 | 9/2012 | Speer, II |
| 2012/0240176 A1 | 9/2012 | Ma |
| 2012/0259698 A1 | 10/2012 | Yurow |
| 2012/0265596 A1 | 10/2012 | Mazed |
| 2012/0278496 A1 | 11/2012 | Hsu |
| 2012/0311126 A1 | 12/2012 | Jadallah |
| 2013/0024364 A1 | 1/2013 | Shrivastava |
| 2013/0024371 A1 | 1/2013 | Hariramani |
| 2013/0046861 A1 | 2/2013 | Biderman |
| 2013/0067052 A1 | 3/2013 | Reynolds |
| 2013/0067109 A1 | 3/2013 | Dong |
| 2013/0091249 A1 | 4/2013 | McHugh |
| 2013/0094445 A1 | 4/2013 | De Foy |
| 2013/0124724 A1 | 5/2013 | Madgwick |
| 2013/0132605 A1 | 5/2013 | Kocks |
| 2013/0142129 A1 | 6/2013 | Rinne |
| 2013/0144785 A1 | 6/2013 | Karpenko |
| 2013/0151673 A1 | 6/2013 | Gouache |
| 2013/0151687 A1 | 6/2013 | Mooneyham |
| 2013/0159531 A1 | 6/2013 | Katyal |
| 2013/0166332 A1 | 6/2013 | Hammad |
| 2013/0198328 A1 | 8/2013 | Green et al. |
| 2013/0198361 A1 | 8/2013 | Matsuzaki |
| 2013/0218765 A1 | 8/2013 | Hammad |
| 2013/0304642 A1 | 11/2013 | Campos |
| 2013/0305299 A1 | 11/2013 | Bergstrom |
| 2013/0326024 A1 | 12/2013 | Chen |
| 2013/0336221 A1* | 12/2013 | Damola ............ H04L 61/2539 370/328 |
| 2014/0019352 A1 | 1/2014 | Shrivastava |
| 2014/0108671 A1 | 4/2014 | Watson |
| 2014/0129303 A1 | 5/2014 | Aiglstorfer |
| 2014/0143089 A1 | 5/2014 | Campos |
| 2014/0149557 A1 | 5/2014 | Lohmar |
| 2014/0150046 A1 | 5/2014 | Epstein |
| 2014/0198641 A1 | 7/2014 | Perkuhn |
| 2014/0245359 A1 | 8/2014 | De Foy |
| 2014/0324690 A1 | 10/2014 | Allen |
| 2014/0330980 A1 | 11/2014 | Richardson |
| 2014/0337175 A1 | 11/2014 | Katzin |
| 2014/0348049 A1 | 11/2014 | Kim |
| 2015/0026239 A1 | 1/2015 | Hofmann |
| 2015/0067185 A1 | 3/2015 | Tamblin |
| 2015/0088607 A1 | 3/2015 | Georgoff |
| 2015/0095704 A1 | 4/2015 | Sokolik |
| 2015/0112774 A1 | 4/2015 | Georgoff |
| 2015/0134431 A1 | 5/2015 | Georgoff |
| 2015/0201042 A1 | 7/2015 | Shah |
| 2015/0220989 A1 | 8/2015 | Hayes |
| 2015/0302456 A1 | 10/2015 | Rego |
| 2015/0334153 A1 | 11/2015 | Koster |
| 2015/0379554 A1 | 12/2015 | Copeland |
| 2016/0055583 A1 | 2/2016 | Liberty |
| 2016/0072716 A1 | 3/2016 | Chow |
| 2016/0234293 A1 | 8/2016 | Berger |
| 2016/0292731 A1 | 10/2016 | Khwaja |
| 2016/0328272 A1 | 11/2016 | Ahmed |
| 2017/0161717 A1 | 6/2017 | Xing |
| 2017/0289188 A1 | 10/2017 | Shaikh |
| 2017/0339222 A1 | 11/2017 | Newton |

OTHER PUBLICATIONS

"Relay Nodes in Wireless Sensor Networks: A Survey"—Ataul Bari, University of Windsor, Nov. 2005, http://richard.myweb.cs.uwindsor.ca/cs510/survey_bari.pdf.

"Simple Opportunistic Routing Protocol for Wireless Mesh Networks"—Rozner et al, University of Texas at Austin, Aug. 2011 http://ericrozner.com/papers/wimesh06.pdf.

Elo et al., "Virtual URLs for Browsing & Searching Large Information Spaces", WebNet Journal, pp. 38-43, p. 66, Jan.-Mar. 1999. http://www.cs.berkeley.edu/~kubitron/articles/techreview.pdf "The Internet Reborn"—Wade Roush, Technology Review, Oct. 2003.

Theotokis et al., A Survey of Peer-to-Peer Content Distribution Technologies, ACM Computing Surveys, vol. 36, No. 4, Dec. 2004, pp. 335-371.

Wade Roush, Technology Review, Published by MIT, TR10: Peering into Video's Future, Mar. 12, 2007, http://technologyreview.com/printer_friendly_article.aspx?id=18284.

Coppens et al., Design and Performance of a Self-Organizing Adaptive Content Distribution Network, 2006.

* cited by examiner

|  | DMA | | | | |
|---|---|---|---|---|---|
| ASN | 0.2 (CDN 2) | 0.1 (CDN 1) | 0.2 (CDN 1) | 1.2 (CDN 1) | 1.8 (CDN 1) |
| | 0.3 (CDN 1) | 1.5 (CDN 2) | 1.2 (CDN 2) | 0.1 (CDN 1) | 0.2 (CDN 1) |
| | 0.6 (CDN 1) | 0.1 (CDN 1) | 0.4 (CDN 2) | 0.1 (CDN 2) | 0.3 (CDN 2) |

Best CDN *(buffering ratio)*

FIG. 6

Example 1 - Common Path on CDNs, Direct Integration, Manifest response http://vrlm.conviva.com/path/to/video/asset.ism/Manifest?foo=1234&bar=28ad94&
  c3.vr=2&
  c3.ck=a123456789b123456789c123456789d123456789&
  c3.rt=m&
  c3.vp=s&
  c3.im=d&
  c3.um=i&
  c3.ri=1234.56789&
  c3.os=XBOX&
  c3.ov=4.1.2&
  c3.an=My%20Test%20Content&
  c3.db=Microsoft&
  c3.dm=XBox%20360&
  c3.at=ON_DEMAND&
  c3.dt=CONSOLE&
  c3.ext.serviceType=Premium 1402, 1404, 1406

FIG. 14

Example 2 - Different Paths on CDNs. Direct Integration. Manifest response

```
https://vrl.m.conviva.com/a.m3u8?
c3.vr=2&
c3.ck=a123456789b123456789c123456789d123456789&
c3.rt=m&
c3.vp=l&
c3.im=d&
c3.uv=d&
c3.ts=1390899270000&
c3.r1=http%3A%2F%2Fone.cdn1.com%2Fmy%2Fpath%2Fto%2Fvideo%2Fasset.m3u8%3Ffoo%3D1234%26bar%3D28ad94&
c3.r2=http%3A%2F%2Fsecond.cdn2.com%2Fa%2Fdifferent%2Fpath%2Fto%2Fvideo%2Fasset.m3u8%3Fbaz%3Daasd%26rand%3D1234&
c3.os=iOS&
c3.ov=6.1.3&
c3.dc=WWAN&
c3.an=My%20Test%20Content&
c3.db=Apple&
c3.dm=iPad%20Mini&
c3.at=ON_DEMAND&
c3.ext.serviceType=premium
```

Example 3 – Proxy Integration, *PriorityList response*

```
https://vrl.m.conviva.com/a.ism/Manifest?
c3.vr=2&
c3.ck=a123456789b123456789c123456789d123456789&
c3.rt=p&
c3.vp=s&
c3.im=p&
c3.um=i&
c3.ts=1390899270000&
c3.cs=PoC&
c3.ip=1.2.3.4&         1602
c3.os=SAMSUNG&
c3.ov=2013&
c3.an=My%20Test%20Content&
c3.db=Samsung&
c3.dm=GalaxyTabMini&
c3.at=ON_DEMAND
```

FIG. 16

Example 4 – Encoded Hostname VRL for a Progressive-Download Set-top Box http://v2mpdi-a123456789b123456789c123456789d123456789-stb.m.conviva.com/vod/hd.mp4?foo-123&bar=abc ⌐1702

VIRTUAL RESOURCE LOCATOR

CROSS REFERENCE TO OTHER APPLICATIONS

This application is a continuation of co-pending U.S. patent application Ser. No. 14/229,724, entitled VIRTUAL RESOURCE LOCATOR filed Mar. 28, 2014 which is incorporated herein by reference for all purposes, which claims priority to U.S. Provisional Application No. 61/806,648, entitled VIRTUAL RESOURCE LOCATOR filed Mar. 29, 2013 which is incorporated herein by reference for all purposes.

Co-pending U.S. patent application Ser. No. 14/229,724, is also a continuation in part of U.S. patent application Ser. No. 13/752,252, entitled SOURCE ASSIGNMENT BASED ON NETWORK PARTITIONING filed Jan. 28, 2013, now U.S. Pat. No. 9,246,965, which is incorporated herein by reference for all purposes, which claims priority to U.S. Provisional Patent Application No. 61/697,225 entitled SOURCE ASSIGNMENT BASED ON NETWORK PARTITIONING filed Sep. 5, 2012 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are ongoing challenges in distributing that content efficiently and with high quality. As one example, when a client requests content (e.g., a particular television episode), the content may be available in multiple bitrates from multiple sources. Unfortunately, the client may not receive the content from the most appropriate source, or in the most appropriate bitrate.

BRIEF DESCRIPTION OF THE DRAWINGS

Various embodiments of the invention are disclosed in the following detailed description and the accompanying drawings.

FIG. 6 illustrates a table depicting a selection of the best CDN for a given DMA/ASN pair.

FIG. 14 illustrates an example of a Virtual Resource Locator.

FIG. 15 illustrates an example of a Virtual Resource Locator.

FIG. 16 illustrates an example of a Virtual Resource Locator.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
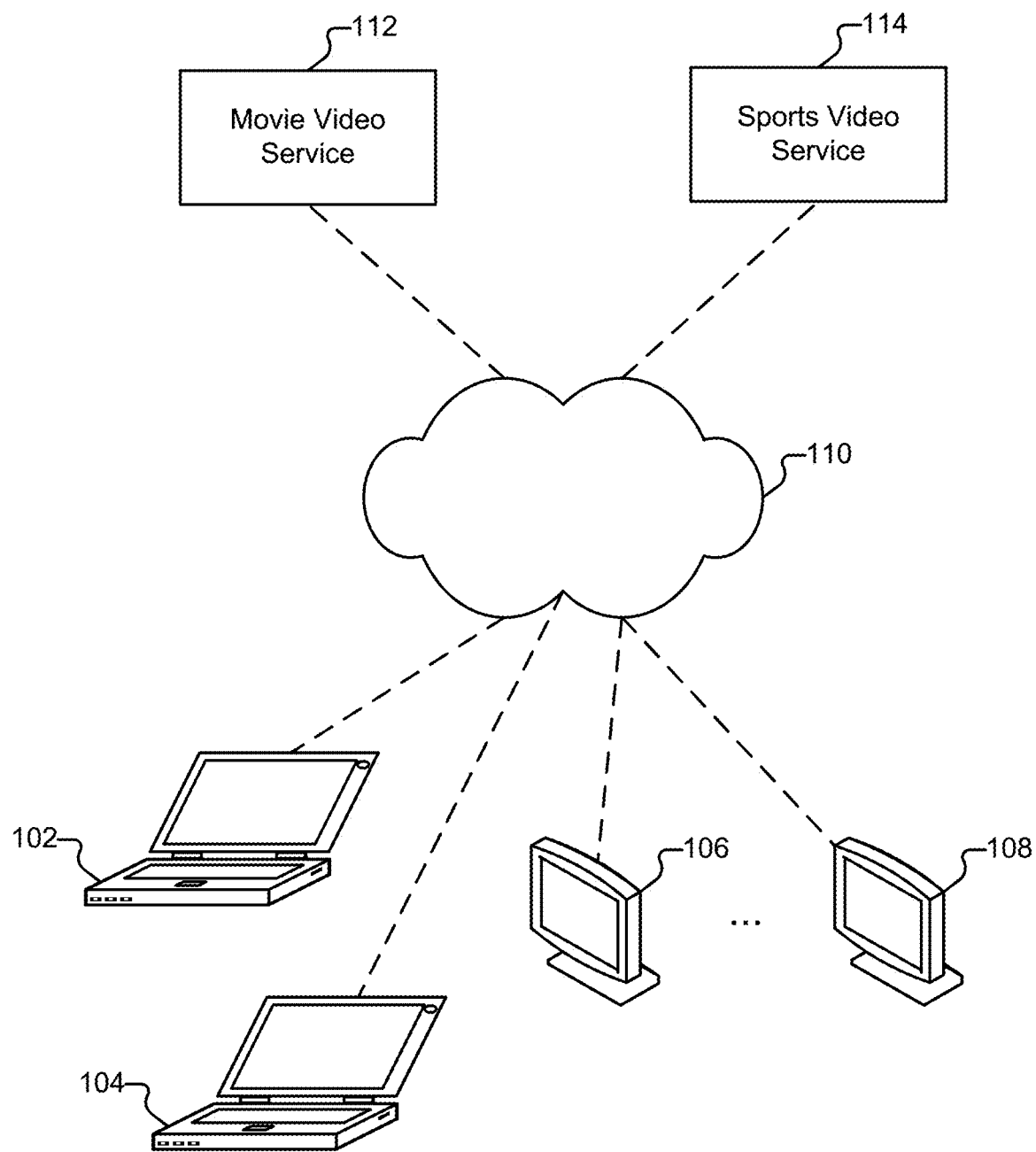
FIG. 1 illustrates an environment in which content is distributed.

FIG. 1 illustrates an environment in which content is distributed. In the example shown, client devices are used to access content, such as audiovisual content (e.g., movies, songs, television shows, sporting events, games, images, etc.) that is owned by content owners. Content is stored (or captured) at origin servers, then distributed via other servers, caches, content delivery networks (CDNs), proxies, etc. (collectively, "content sources"). Examples of CDNs include Akamai, Limelight Networks, and Level 3 Communications. Content sources employ a variety of technologies and include HTTP, Adobe Flash Media, and Microsoft Internet Information Service servers. Examples of clients include personal computers, laptops, cellular and smart phones/personal digital assistants, and other types of information appliances such as set-top boxes, game consoles, broadband routers, file servers, video servers, digital video recorders, or other devices involved in data/video streaming and playback as applicable.

In the example shown in FIG. 1, client device 102 is operated by a user hereinafter referred to as Alice. Alice lives in the Washington, D.C. area. Her Internet Service Provider (ISP) is hereinafter referred to as "ACME Internet." Suppose Alice wishes to watch a movie, streamed to client device 102 via one or more networks (represented as a single network cloud 110), from movie video service 112. Client device 102 includes a web browser application. Alice uses the web browser application to navigate to a portal owned by movie video service 112, such as "http://movievideoservice12.com/welcome." Her request for a particular movie is directed to a particular CDN and ultimately to a particular CDN node. Her client device begins streaming the content from the CDN node, which is in turn rendered in her browser (e.g., via a Flash, Silverlight, or HTML5 player).

The CDN (and/or CDN node) assigned to Alice's client device can be selected in a variety of ways. As one example, a CDN can be selected based on current estimated load, or for financial reasons (e.g., where traffic to one CDN is preferred over another). Further, a given CDN node can be assigned (e.g., by the CDN) based on its distance to Alice (i.e., with the CDN node that is the fewest hops away from her client device being selected). As another example, a CDN node may be assigned based on a load balancing scheme, irrespective of or in addition to its distance from Alice. As will be described in more detail below, the CDN node closest to Alice (or that would be assigned based, e.g., on a round robin load balancing scheme) may or may not offer her the best viewing experience relative to other CDN nodes having been assigned (including those belonging to other CDNs). Using the techniques described herein, a decision of which content source should be used, and/or what bitrate should be used, can be made. As will be described in more detail below, such decisions can be made both at the time Alice initially requests content, and also as an ongoing decision. Also as will be described in more detail below, such decisions can be made for Alice's client based on historical performance information collected from other client devices that share some commonality with her client.

Client device 104 is operated by a user hereinafter referred to as Bob. Bob also lives in Washington, D.C., and also likes to stream movies from service 112. Bob's ISP is "Beta Telecommunications." Many additional client devices (represented by client devices 106 and 108) connect to service 112, from a variety of geographical locations (e.g., Milwaukee and Albuquerque), via a variety of ISPs. Client devices also connect to other services, such as sports video service 114.

Quality Issue Examples

Figure 2:
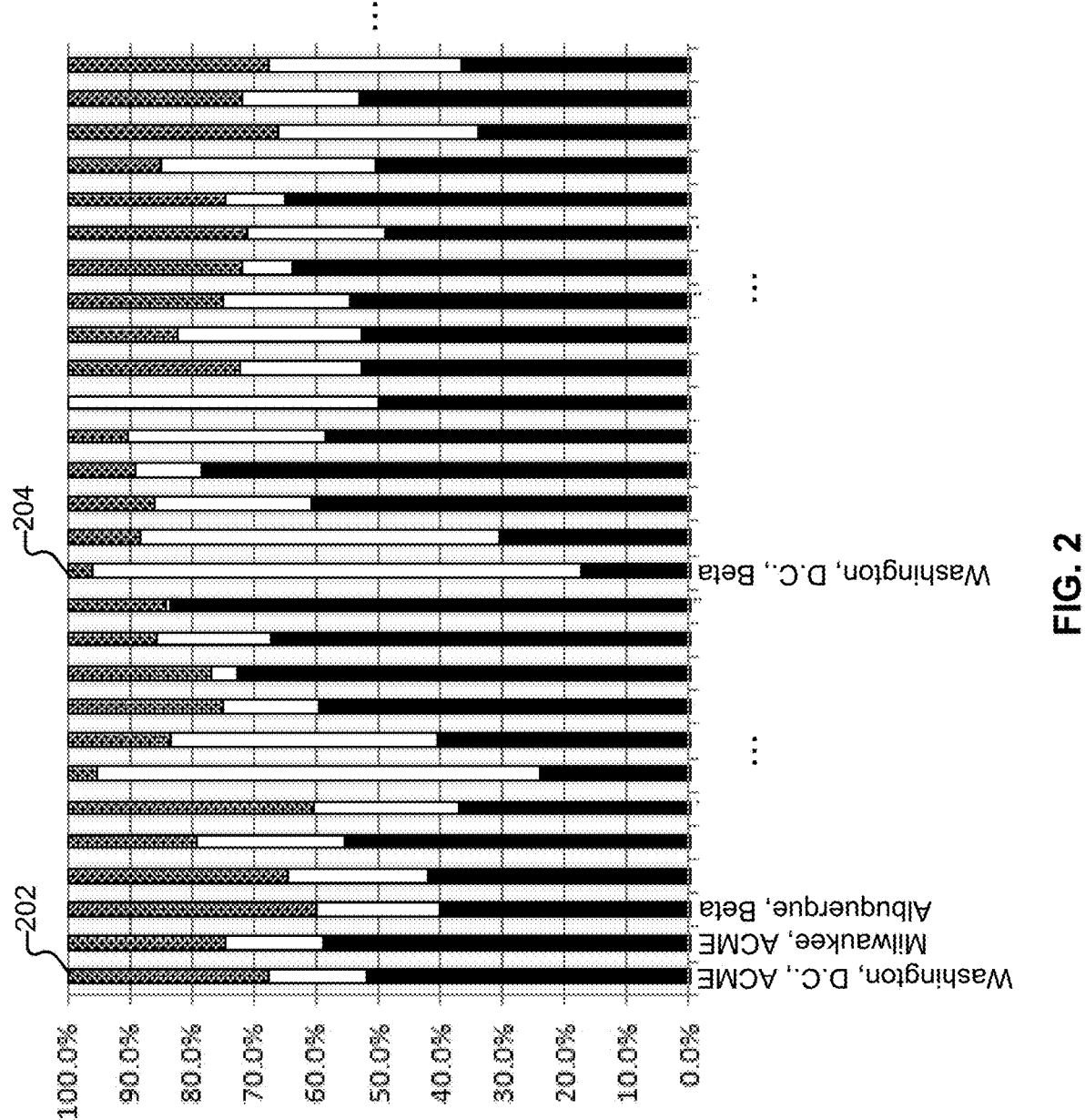
FIG. 2 depicts an example of the performance associated with three different content delivery networks (CDNs).

FIG. 2 depicts an example of a performance metric associated with three different content delivery networks (CDNs). In particular, FIG. 2 depicts the percentage of time a given CDN provides the best performance for a particular combination of a Designated Market Area (DMA) and an Autonomous System Number (ASN). For a given combination, performance with respect to each of three CDNs is shown as a stack, where CDN 1 is depicted as the black portion of the stack, CDN 2 is depicted as the white portion of the stack, and CDN 3 is represented as the crosshatched portion of the stack. A variety of measures of performance can be used—whether individually or in combination. Examples include, but are not limited to: (1) the number/percentage of client connection failures, (2) how quickly a video begins playing on a client (e.g., number of seconds until playback starts), (3) the amount of time clients spend buffering (e.g. as a buffering ratio), and (4) whether the maximum bandwidth of the client is used. The example shown depicts an aggregate assessment of quality (e.g., taking into account all four measures by weighting each equally). Other aggregation techniques can also be used. For example, buffering ratio can be weighted more heavily than other factors. As another example, not all factors need be aggregated—some can be omitted.

Using bar 202 as an example: approximately 51% of the time, an arbitrary client located in Washington, D.C. and serviced by ACME will have the best video streaming experience when connected to CDN 1. CDN 2 will provide the best experience to the client approximately 16% of the time, and CDN 3 will provide the best experience to the client approximately 33% of the time. Using bar 204 as another example: approximately 17% of the time, an arbitrary client also located in Washington, D.C., but serviced by Beta will have the best video streaming experience when connected to CDN 1. CDN 2 will provide the best experience to the client approximately 76% of the time, and CDN 3 will provide the best experience to the client approximately 5% of the time. Thus, even though Alice and Bob are both located in Washington, D.C., their respective clients will likely experience different performance when connecting to the same CDN (e.g., CDN 1), because they have different ISPs. Specifically, Alice's client is most similar to clients represented by bar 202, and Bob's client is most similar to clients represented by bar 204.

Figure 3:
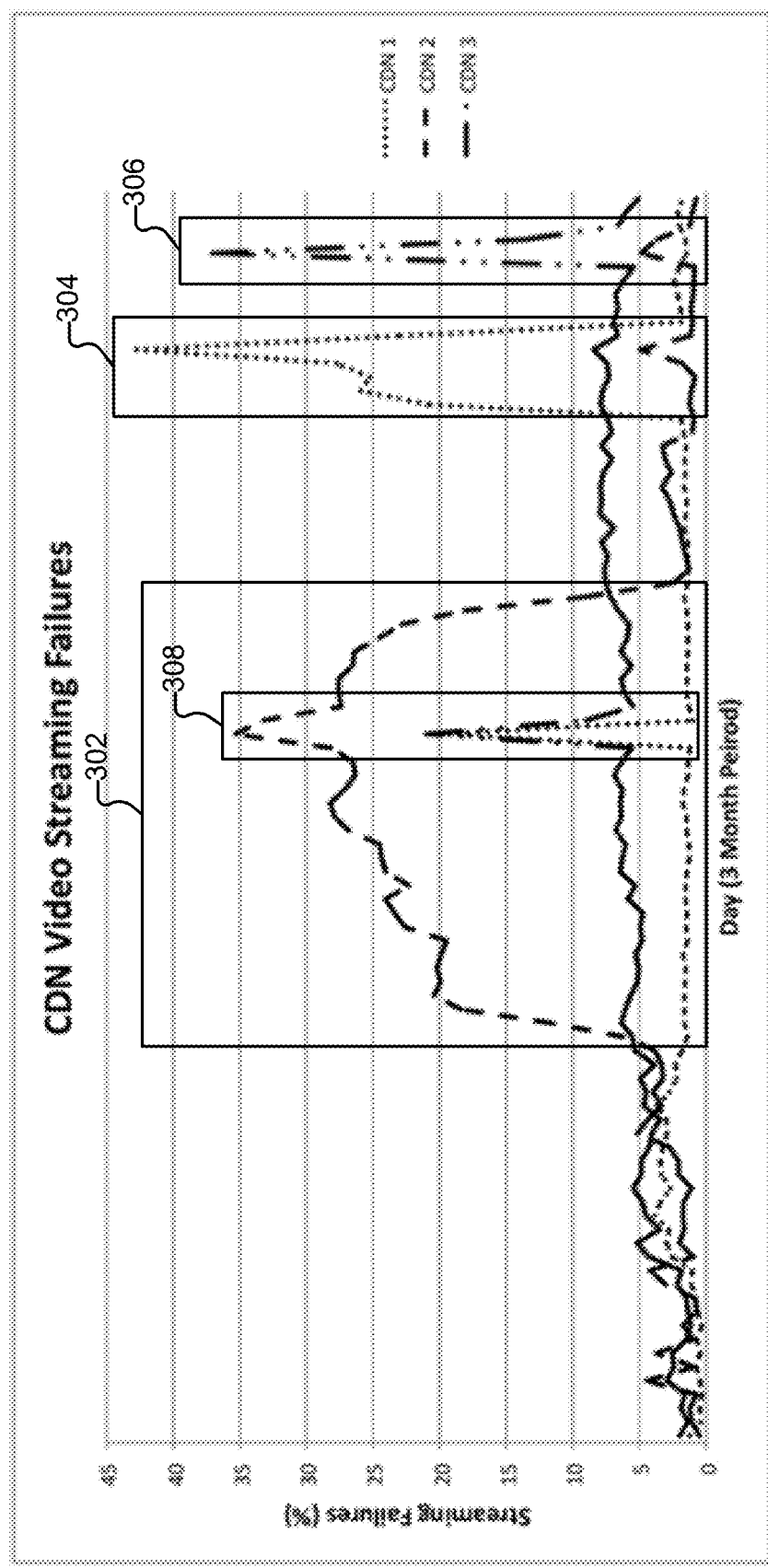
FIG. 3 depicts examples of both uncorrelated and correlated quality issues.

FIG. 3 depicts examples of both uncorrelated and correlated quality issues. In particular, FIG. 3 depicts, over a three month period, the percentage of connection failures experienced by clients attempting to connect to each of the three CDNs. During period 302, CDN 2 had the worst performance (i.e., had the most connection failures). During period 304, CDN 1 had the worst performance, and during period 306, CDN 3 had the worst performance. Further, during period 308, all three CDNs experienced a failure spike (i.e., a correlated failure). One reason for such a spike is a period of high load (e.g., a holiday weekend or national sporting event when many people watch videos at the same time).

Determining Assignments

Figure 4:
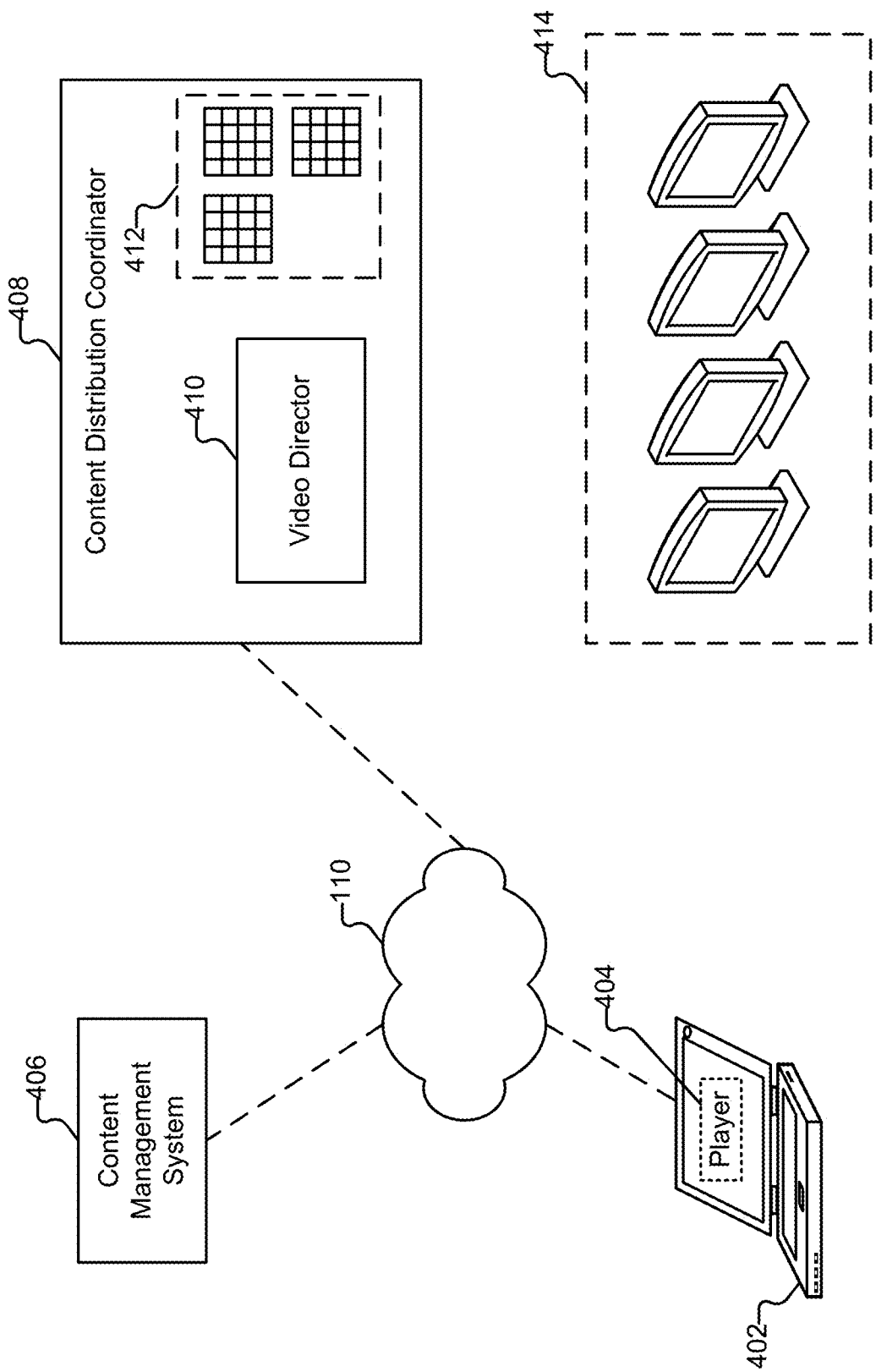
FIG. 4 illustrates an environment in which source assignment based on partitioning is performed.

FIG. 4 illustrates an environment in which source assignment based on partitioning is performed. Suppose an operator of a client device, such as client device 402, wishes to watch a video using video player application 404. In some embodiments, the player application is a dedicated application. In other embodiments, the player application is provided by a web browser application. In the example shown, client device 402 connects to Content Management System (CMS) 406 (e.g., via one or more networks 110) and requests the content. As will be described in more detail below, information about the client device (e.g., its IP address, User Agent string, what type of device it is, what operating system it is running, firmware version, browser type/version, player version, display size, and/or any other applicable attributes) is used to determine a set of other client devices that are correlated with client 402. Historical performance of devices in that set is evaluated to determine a content source and/or bitrate for client 402. Instructions for contacting the content source and obtaining the content are then provided to client 402. In some embodiments, content management system 406 contacts content distribution coordinator 408 to determine the set of instructions to provide to device 402. In other embodiments (e.g., described in conjunction with FIG. 8), content management system 406 redirects client 402's request (e.g., via HTTP redirect).

In some embodiments, content management system 406 and content distribution coordinator 408 are operated by the same entity. For example, an online movie streaming service could operate both content management system 406 and content distribution coordinator 408. Content distribution coordinator can also be operated by other entities. For example, content distribution coordinator 408 can be operated by an operator of a CDN. Content distribution coordinator 408 can operate independently of content management system 406 and/or independently of a CDN. As one example, the owner of content distribution coordinator 408 could provide services to multiple content management systems (e.g., one associated with movie service 112 and one associated with sports video service 114) and/or multiple CDNs.

As will be described in more detail below, quality experienced by clients such as clients 414 is measured and stored by content distribution coordinator 408. The information obtained from/about clients 414 is partitioned (412) and can be used, e.g., by a video direction engine 410 to predict a performance quality likely to be experienced by a client device if it is assigned a given content source.

Figure 5A:
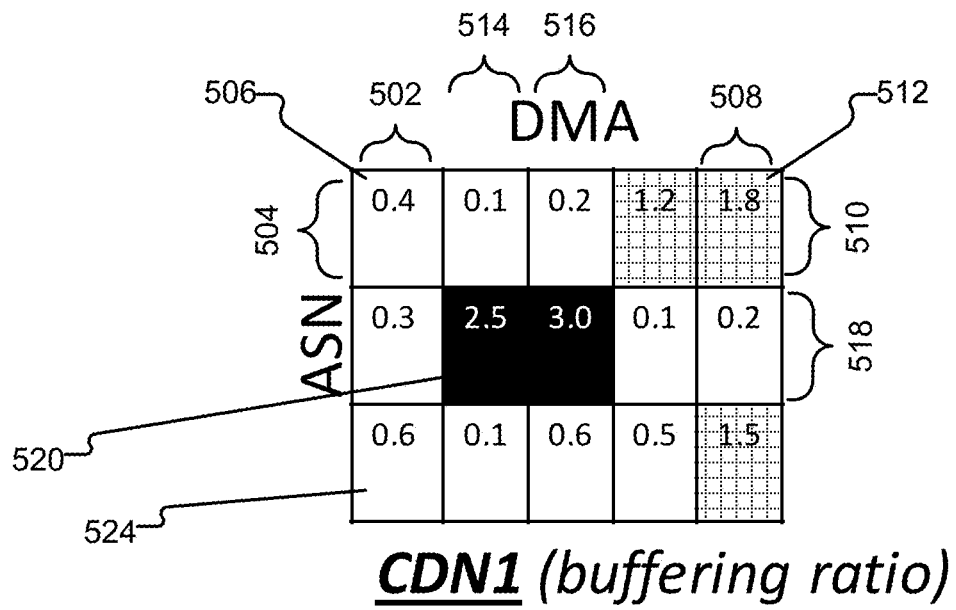
FIGS. 5A and 5B depict examples of partitioning pertaining to two CDNs.
Figure 5B:
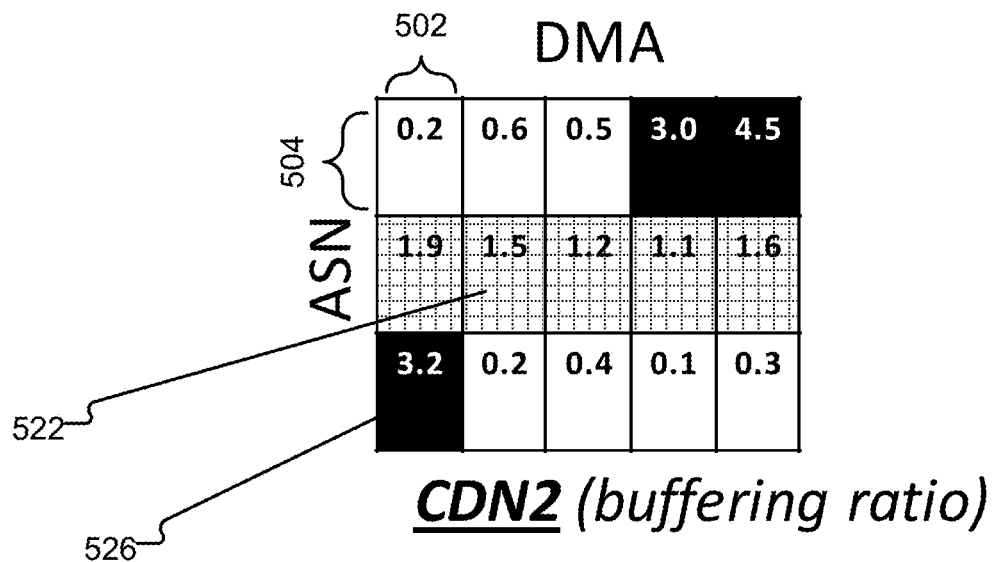

FIGS. 5A and 5B depict examples of partitioning pertaining to two CDNs. In particular, FIG. 5A shows, for clients located in one of five DMAs, and located within one of three ASNs, the buffering ratio experienced with respect to CDN 1. For example, clients in DMA 502 and in ASN 504 experience a buffering ratio of 0.4 (506). Clients in DMA 508 and in ASN 510 have a worse (higher) buffering ratio—1.8 (512). Clients in either of DMA 516 or 518, and also in ASN 514 have the worst buffering ratios—2.5 and 3.0, respectively.

FIG. 5B shows, for the same ASN/DMA partitioning as FIG. 5A, the buffering ratio experienced with respect to CDN 2. For some clients, CDN 2 will provide better performance than CDN 1. As one example, compare the values in regions 520 and 522. For some clients, CDN 2 will provide worse performance than CDN 1. As one example, compare the values in regions 524 and 526.

When a client, such as client device 402, requests content, information such as is shown in FIGS. 5A and 5B can be used (e.g., by content distribution coordinator 408) to determine whether to assign the client CDN 1 or CDN 2 as a content source. Other decisions can also be made using similar information, such as determining which CDN node to assign and/or determining which bitrate to assign. Further, once a video is being played on a client, information such as is shown in FIGS. 5A and 5B can be used to assess the predicted impact switching the client from one content source to another (or adjusting the bitrate) would have.

The values depicted in FIGS. 5A and 5B pertain to a single quality metric—buffering ratio. Data for other metrics can also be used in partitioning (e.g., pertaining to failed connection attempts). Further, the data can combined in a variety of ways. For example, a bitrate dimension can be added (i.e., further partitioning the clients based on their bitrates). Other attributes can also be used to partition the data, such as client type (e.g., desktop computer vs. tablet computer), browser (e.g., Internet Explorer vs. Firefox), and display size (e.g., 17" vs. 10").

FIG. 6 illustrates a table depicting a selection of the best CDN for a given DMA/ASN pair. In particular, each cell in FIG. 6 corresponds to whichever of CDN 1 or CDN 2 provides a better performance quality for the DMA/ASN pair represented by the cell. For example, compare clients in DMA 502/ASN 504 pair with respect to CDN 1 and CDN 2. Such clients have a predicted buffering ratio of 0.4 if connected to CDN 1, and a predicted buffering ratio of 0.2 if connected to CDN 2. Accordingly, CDN 2 is a better choice for performance reasons (as indicated in cell 602).

In the examples shown in FIGS. 5A and 5B, the values included in a given cell (e.g., the value of 0.4 appearing in cell 506) represent the buffering ratio experienced by the average client included in the given partition (i.e., the score is determined as an average of the buffering ratios of all clients in the set). Other techniques can also be used to assess the quality scores. For example, a distribution of buffering ratios can be determined, and only those clients having scores in the second/third quartile used as predictors, or of specific percentiles (e.g., 80th percentile).

Figure 7:
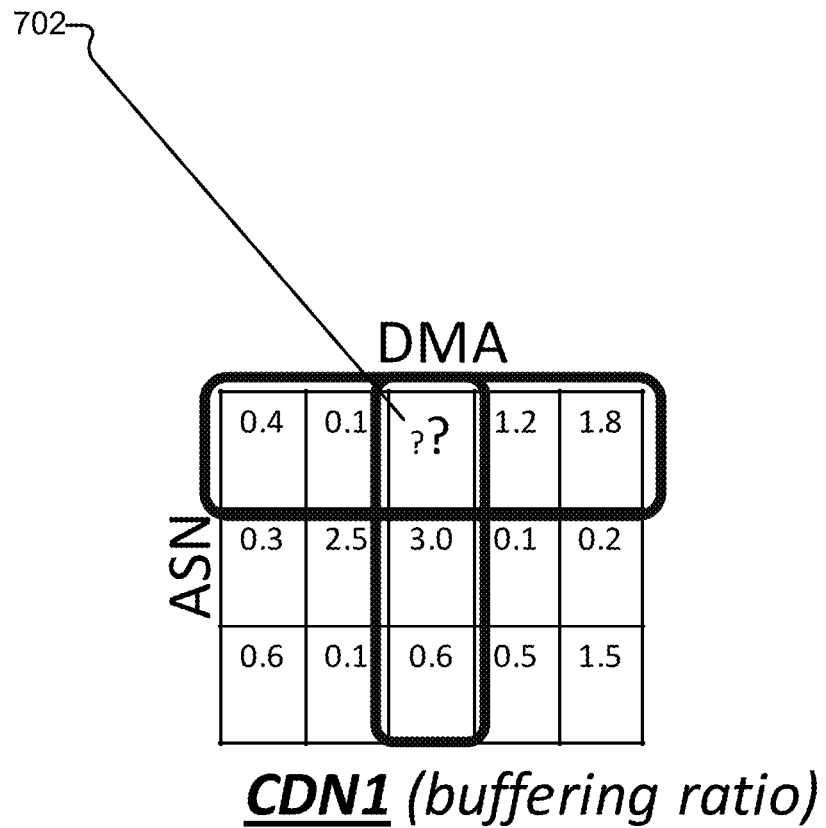
FIG. 7 depicts an example of a partition that includes limited information.

In some cases, a given partition may have data on few or no clients. Such a scenario is depicted in FIG. 7. Specifically, information pertaining to clients in cell 702 is limited. In some embodiments, when a given partition has insufficient information to make a reliable prediction, a larger partition is used. For example, the quality experienced by all clients in the same ASN can be aggregated, and/or the quality experienced by all clients in the same DMA can be aggregated, and used to predict which CDN would be best for a client having the attributes of cell 702.

Directing a Content Player to a Content Source

As described above, the global intelligence of a content distribution coordinator such as CDC 408 (in which telemetry can be aggregated from multiple clients and used to predict which CDN would be best for a requesting client having a particular set of attributes) can be leveraged to dynamically assign a new incoming content request to the CDN that will provide the best quality for the client device requesting content.

Described below are example integration modes for integrating the services of a CDC with a CMS to enable dynamic source assignment functionality (e.g., source assignment based on network partitioning via a CDC, as described above). In some embodiments, integration of a CDC into a content delivery environment/ecosystem includes integrating/implementing the use of a communication protocol that is also referred to herein as a "Virtual Resource Locator" or VRL. In some embodiments, the VRL is a Universal Resource Locator (URL) that is used to invoke/enables the services/functionality of the CDC across a content delivery ecosystem. For example, implementing the VRL in a content delivery ecosystem allows a CMS to utilize a CDC's multi-CDN management services (described in more detail below) across all client devices (e.g., in order to direct a content player to a content source) even if a client and the CDC may not be initially known to each other, as will be described in more detail below. The VRL protocol allows a global intelligence system such as a CDC to be queried, with the CDC configured to process the information encoded (according to the VRL protocol) in the VRL to satisfy the query request (e.g., with an optimal CDN selection, prioritized ranked list of CDNs, etc.). In some embodiments, as will be described in more detail below, implementing the VRL can include modifying components in a content delivery ecosystem, such as a CMS and CDC, to include logic for handling communications using the VRL protocol (e.g., VRL requests, responses to VRL requests, etc.).

In some embodiments, use of VRLs allows the use of client attributes and capabilities in addition to other parameters (which are embedded in the VRL) to aid in decision making for the selection of an optimal CDN and/or bitrate (e.g., optimal video stream out of one or more CDNs using one or more bitrate resolutions). In some embodiments, the VRL specifies how to play an asset using real-time/dynamic selection/recommendation for highest quality viewing experience, for example, using techniques such as source assignment based on network partitioning as described above.

In some embodiments, when a viewer clicks "Play" for a video, the video player makes an HTTP request to a headend (or content management system) for the video. The headend/CMS responds with a video URL on a CDN. As part of integration of a CDC and source assignment functionality, companies (e.g., content owners) typically replicate their asset catalog on multiple CDNs, giving the companies multiple CDN URLs for every video asset. In some embodiments, these multiple URL choices are encoded in a single VRL, where the VRL protocol provides a mechanism to bundle content asset URLs for different CDNs and session metadata (which may be maintained by a CMS) into the single VRL. For example, in some embodiments, the VRL includes the URLs of CDNs (or paths to assets, which may be identical or different for the various CDNs on which an asset may be replicated) on which a requested asset is stored (knowledge of which is maintained by the CMS and included in the VRL by the CMS), and the CDC can evaluate the provided set of resources to determine an optimal CDN (or a ranked list of CDNs) for the requesting client. The VRL request is then sent to the CDC, which responds with the CDN that represents the optimal selection for that specific video player.

Depending on the services selected and the VRL integration mode used (e.g., direct or proxy, which will be described in more detail below), the CDC will use the information encoded in the VRL to either serve the requested asset's master manifest file to the requesting content player (e.g., in direct mode), or provide a set of starting parameters to be used in session initiation (e.g., priority list to CMS in proxy mode).

The VRL communication protocol and its implementation will be described in more detail below.

In some embodiments, the CDC is operated as part of a highly available platform, which includes functionality ensuring video playback if the response by the CDC fails or is delayed (e.g., due to network issue). Mechanisms for detecting such scenarios and enabling of graceful degradation will be described in more detail below.

For purposes of illustration, examples in which video is distributed will be described below. Any other appropriate type of content (e.g., audiovisual content) can be distributed, with the techniques described herein adapted accordingly. The video distribution depicted in the following examples makes use of HTTP chunking delivery techniques. In HTTP chunking, content is divided into chunks (e.g., with each chunk being 2-10 seconds of data) and then distributed as files via CDNs. Clients download chunks and stitch them together, such that a viewer of the content sees a continuous video stream. A CMS provides metadata associated with a video stream, including the information required to deliver the content, e.g., the URL of a manifest file. In particular, the manifest file contains the URL names of the chunks encoding the content, and can also include the URL/names of other manifest files. Each chunk is encoded at a particular bitrate, and it is stored on a particular CDN or (origin) server. Manifest files can be themselves distributed through CDNs.

Integration with a CDC and the use of the VRL protocol may require modification to the logic of a content management system. Described below are two example modes of VRL protocol/CDC integration, direct mode integration and proxy mode integration. Use of the modes may depend on the characteristics of components in a content delivery ecosystem, such as the architecture of the CMS.

Direct Mode Integration

In direct mode, the video content player on a viewer's device directly communicates with the CDC using the VRL protocol. To achieve this, the CMS generates and returns a VRL to the device (instead of a CDN URL). When the device makes a request for the VRL, it will be directed to the CDC/control platform, which will select the optimal CDN and/or initial bitrate (e.g., using source assignment based on network partitioning) and use, for example, HTTP 302 redirect to send the requesting client device to the selected destination CDN. An example sequence diagram below illustrates a workflow for session initiation using the direct mode.

In some embodiments, direct mode integration is utilized in scenarios in which video URLS are served to content players directly from CDN caches without the possibility of dynamic generation of the URL at a CMS or similar component. In direct mode, the URL sent to the video player (VRL) can be cached as it contains metadata and not the CDN decision (which will be provided by the CDC). In some embodiments, direct mode integration requires minimal changes to a CMS and is utilized in scenarios in which the CMS is difficult to modify.

Figure 8:
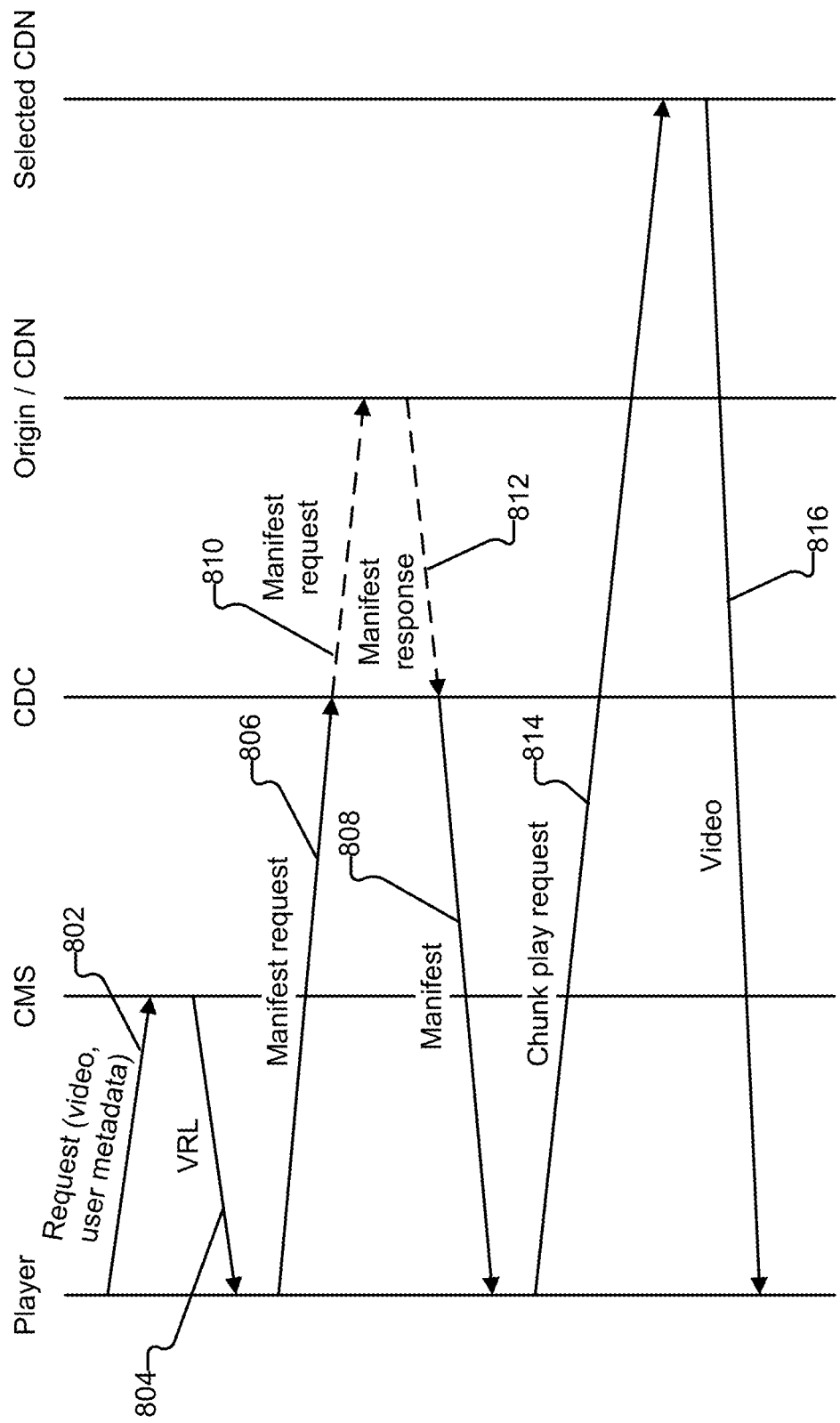
FIG. 8 depicts a call flow used, in some embodiments, to direct a video player to a video source.

FIG. 8 depicts a call flow used, in some embodiments, to direct a video player to a video source using a direct mode. In this example, an appropriate CDN/bitrate can be initially selected for a client such as client 402, and the selection(s) can also be revised as needed. The call flow is as follows: first, the client sends a request to the CMS (802). In addition to the video being requested, additional information about the user/client is included in the request, or is otherwise obtained by the CMS about the client. The additional user/client information may be limited (e.g., just an IP address, or an IP address and a User Agent string) but can also include a variety of attributes (e.g., client type and display size). As one example, the CMS may be publicly accessible, and not require a user to have an account to watch videos. Further, that CMS may make use of standard video playback capabilities provided by a browser application. In such a scenario, limited information about the client may be provided at 802. As another example, access to the CMS may require a user account, and/or may require a customized player application that can obtain more detailed information about the user/client and provide it at 802. The CMS replies with metadata, including a URL to a manifest file (804).

To control the selection of the CDN and bitrate, an indirection mechanism is used. Specifically, instead of including a traditional URL to the manifest file, the CMS returns a URL that points the client to the CDC. In some embodiments, this URL is a "Virtual Resource Locator" or VRL as described above. A URL such as the VRL may be used in the direct mode, as a client device may be configured to expect a URL type response (e.g., traditional URL to the manifest file) from the CMS. The VRL (described in more detail in conjunction with FIG. 9) includes the content name, and encodes other information (e.g., about the device). When the CDC is accessed via a VRL (806), the CDC dynamically generates and sends to the client (808) a manifest file based on the following information: (1) information embedded in the URL; (2) playback quality experienced by other similar clients watching at the same time; (3) a Global IP address; (4) bitrates at which the content is encoded, and the CDNs or origin servers where the content is stored; and (5) Global policies such as the fraction of clients allowed on each CDN, or the maximum arrival rate of new clients at a given CDN. Information associated with (4) can be communicated off-line by the content provider, embedded in the VRL, or obtained from existing manifest files of the content (specified in VRL) that are already stored at various CDNs (see dotted lines 810 and 812).

In the example of FIG. 8, "similar" clients include those clients sharing a subset of attributes with the client making the request. Examples of these attributes include: DMA, ASN, content, content provider, device type, streaming protocol, etc. The higher the overlap between the values of the attributes of two clients, the higher the "similarity" of the clients. The quality experienced by similar clients is used by the CDC to accurately predict the quality that the requesting client will experience when streaming at a given bitrate and from a given CDN.

Once the client receives the manifest file (808), the client uses (814) the information in this file to download (816) and start playing the video chunks. In various embodiments, content source/bitrate decision-making is performed on an ongoing, periodic basis, and a given client can be provided with updated instructions midstream. As one example, after ten consecutive chunks are received by a client, the client can be provided with a new VRL 804, or a manifest that includes a VRL (i.e., causing CDC to re-evaluate the client's content source/bitrate) and send revised instructions if warranted. As another example, in some embodiments, clients run dedicated video player applications and/or applications that otherwise natively support a feature that allows the client to periodically evaluate its performance and request revised instructions, e.g., when quality issues are experienced midstream. In some embodiments, the client receives an indication, such as a pointer/redirect, to an asset URL from the CDC in response to the VRL request, which content player uses to receive a manifest file.

In some embodiments, in the direct mode of integration, VRL integration is implemented by the CMS replacing CDN URLs (maintained by the CMS) with VRLs (to the CDC) for each content asset (or simply creating VRLs without replacing CDN URLs). As will be described in more detail below, even after the requesting client is handed off to the CDC (via the VRL redirection), the CMS is able/configured to monitor the status of the request between the client and the CDC. Fallback options can then also be provided in the case that a failure occurs. For example, as will be described in more detail below, if the CMS detects that there is a timeout by the CDC in satisfying the client's redirect VRL request, a fallback option can be provided by the CMS in which VRLs are replaced with CDN URLs and DNS Canonical Names (CNAMEs) are changed. In some embodiments, in the direct mode of integration, VRLs may be cached (e.g., with short TTL<5 min) if CDN URLs were cached. In the event of a fallback occurring, a cache purge may be performed, as will be described in more detail below. In some embodiments, in order to support the use of VRLs in the direct mode configuration, content players are configured to support HTTP 302 REDIRECT.

Figure 9:
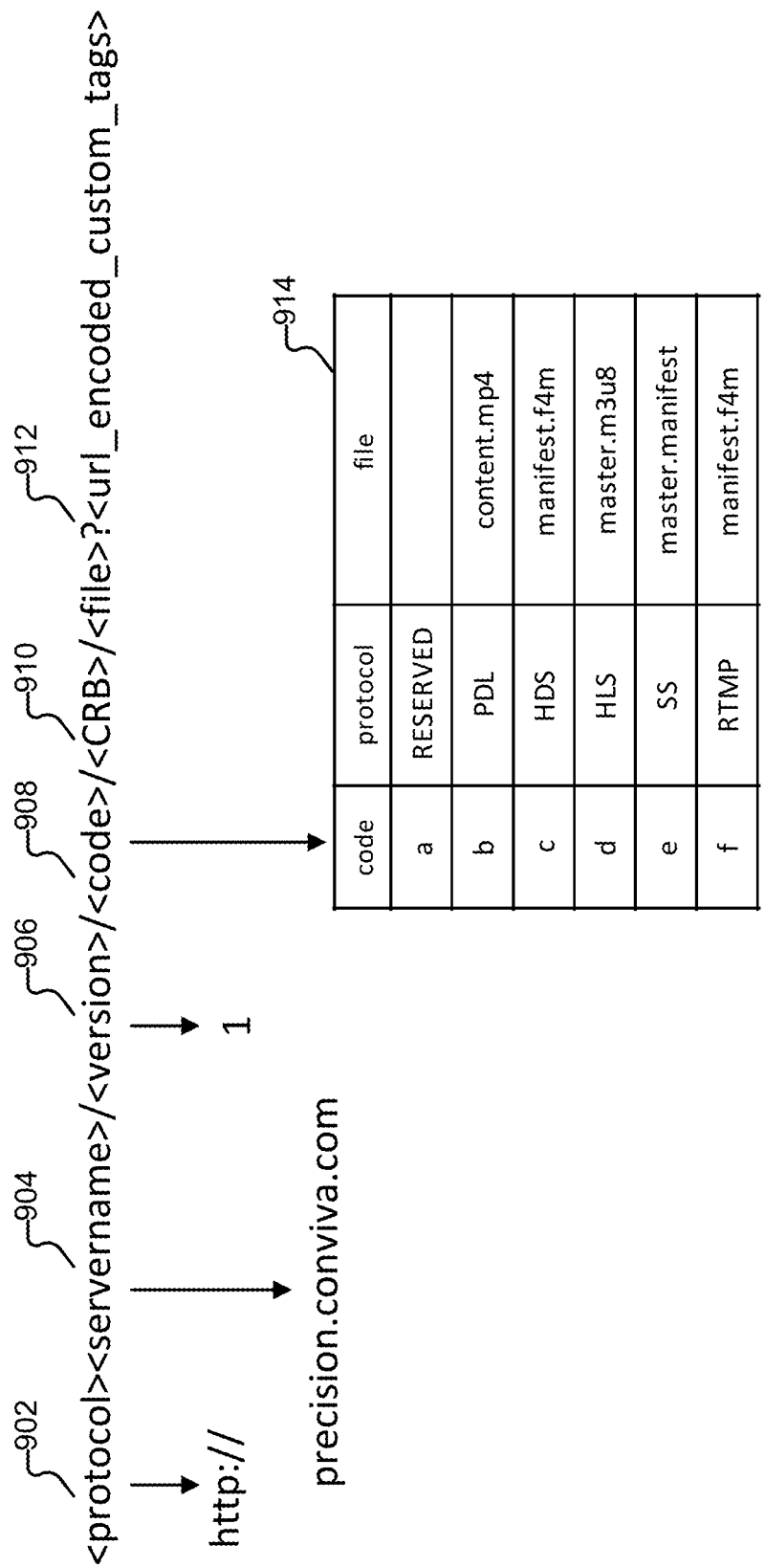
FIG. 9 illustrates an example of a Virtual Resource Locator.

FIG. 9 illustrates an example of a Virtual Resource Locator. In the direct mode example above, a VRL is provided by a content provider's CMS to a client requesting content, and is used by the client to invoke the services of the CDC. As shown in FIG. 9, in some embodiments, a VRL of this example format includes six regions. The first (902) indicates the protocol being used to perform the request. One example of a protocol is HTTP. The second (904) indicates the location of the CDC (e.g., a DNS name of the CDC). The third (906) indicates the version of VRL being used. One example is version "1." The fourth (908) is a code that indicates a protocol type associated with the data to be retrieved. A chart of example codes is included in FIG. 9 (914). The fifth (910) is a request block that specifies required parameters, such as the asset (content) name, customer ID, bitrates at which the content is stored, and CDNs at which the content is stored. The final region includes the name of what is being requested, and a set of optional parameters encoded as key-value pairs. Examples of such parameters include content metadata (e.g., episode, show, season), content type (e.g., advertisement, short video on demand clip, or live stream).

The following is a list of example optional parameters that can be embedded in portion 912.

tok ("securityToken"): A token generated by the CDC that is passed out-of-band to the video CMS and is validated at request time.

an ("assetName"): a human-readable string describing the video asset. Maximum length: 127 bytes.

at ("assetType"): a string identifying the type of the content. May be one of the following values: ON_DEMAND, LIVE_EVENT, LINEAR_LIVE, EVENT_REPLAY, OTHER.

dvt ("deviceType"): a string indicating the form-factor type of the device. May be one of the following: PC, MOBILE, CONSOLE, SETTOP, SMART TV, OTHER.

dvb ("deviceBrand"): a string that names the brand of the device. Maximum length is 64 bytes. For example, "Roku," "Microsoft."

dvm ("deviceModel"): a string that defines the model of the device. Maximum length is 64 bytes. For example, "Xbox 360."

dvv ("deviceVersion"): a string representing the firmware version number of the device. Maximum length is 64 bytes.

dvc ("deviceConnection"): a string describing the last-mile access connection the video device has to the Internet. May have one of the following values: T1, CABLE, DSL, WIFI, 4G, 3G, OTHER.

dvid ("deviceId"): a string defining a unique device identifier. Must be less than 127 bytes. For example, UDIDs for iOS devices.

drm: ("drmType"): The type of digital rights management technology used. May be one of the following: MICROSOFT_PLAY_READY, APPLE_FAIR_PLAY, ADOBE_ACCESS, MARLIN, ADOBE_PHDS ADOBE_PHLS, OTHER, NONE.

os: a string naming the operating system in which the video is playing. Maximum length is 64 bytes.

osv ("osVersion"): a string indicating the full version number of the operating system indicated under "os," if any. Maximum length is 64 bytes.

vid ("viewerId"): a string identifying the video sessions of a single viewer, without collecting any personally identifiable information. Typically a hashed/obfuscated version of a Subscriber ID. Maximum length is 127 bytes.

<other customer meta-data> For example:
"serviceType": "Premium"
"show": "SingingIdol"
"episode": "S8:E5"

Additional details regarding the VRL protocol, including additional VRL protocol versions/formats/implementations, responses, parameters, examples, etc. will be provided below.

Figure 10:
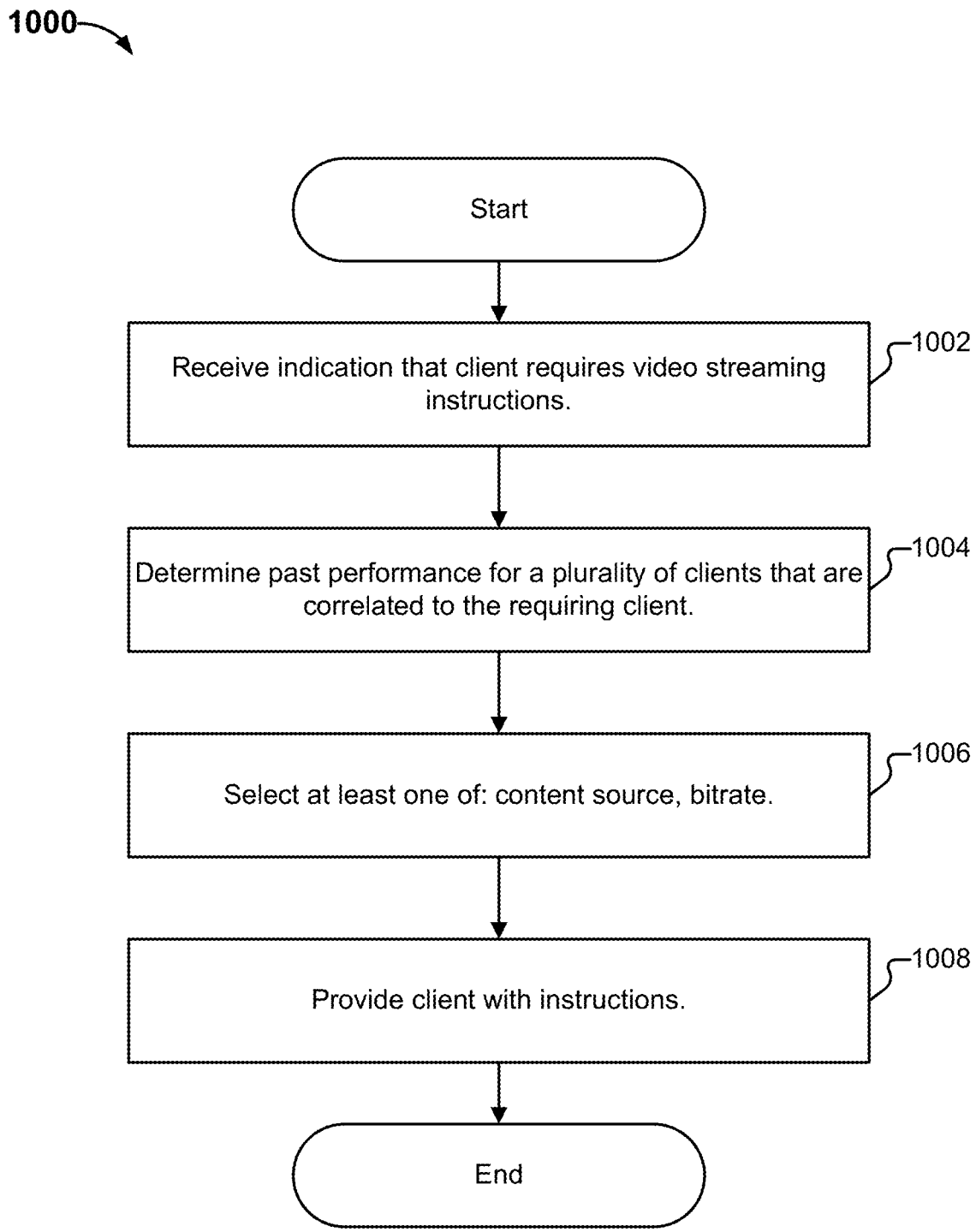
FIG. 10 illustrates an embodiment of a process for directing a video player to a video source.

FIG. 10 illustrates an embodiment of a process for directing a video player to a video source. In some embodiments, process 1000 is performed by content distribution coordinator 408. As explained above, content distribution coordinator 408 can be operated independently, but can also be operated by an operator of a content management system (e.g. CMS 406) or other entity, such as an operator of a CDN. Accordingly, in some embodiments/scenarios, other components may perform process 1000, instead of or in addition to CDC 408. Further, multiple components may cooperate to perform process 1000.

The process begins at 1002 when an indication that a client requires video streaming instructions is received. In some embodiments, portion 1002 of the process is performed when CDC 408 is contacted by client 102 as a result of client 102 receiving a VRL from CMS 406 and being directed to CDC 408. For example, the VRL may be included in a first manifest request from the client. In some embodiments, the VRL includes information generated as a result of the client contacting the CMS and receiving back from the CMS encoding information about the client along with the redirection to the CDC. For example, in response to receiving the manifest request from the client, the CMS builds/forwards a VRL (e.g., by converting an existing asset URL maintained by the CMS) that has embedded/encoded information about the client. The VRL is sent to the client, which causes the client to be redirected to the CDC. As described above, the VRL can be encoded to contain information (e.g., attributes, parameters, characteristics, etc.) about the client. In some embodiments, the VRL includes (e.g., by specifying VRL parameters) an indication of the content sources on which the requested asset is stored (e.g., either through URLs of the resources, aliases of the resources, etc.). The CDC will then select an optimal resource from the indicated candidate resources.

Based on the information in the VRL, a content source is determined. At 1004, past performance for a plurality of clients that are correlated to the requesting client is determined. As one example, portion 1004 of the process is performed when CDC 408 receives attributes about the requesting client, determines (e.g., from partitions 412) which other clients are most similar to the requesting client, and evaluates those clients performance history. Suppose a determination is made that the requesting client is in a particular DMA and ASN. The performance history of other clients in the same DMA and ASN is examined at 1004.

In some embodiments, a video director engine included in CDC 408 is configured to perform the actions of (a) determining which set of clients are most similar to the requesting client, and (b) evaluating their performance history. The clients most similar to the requesting client need not be requesting (or have requested) the same content as is requested by the client. For example, other clients in the same DMA and ASN may be (have been) watching other movies from movie video service 112. As a further example, correlated clients may be (have been) watching video provided by other services, such as sports video service 114. CDC 408 can be configured to collect statistical information from a wide variety of clients, including clients associated with multiple services (e.g. services 112 and 114), and can use the collected information to aid in decision-making.

At 1006, at least one of: a content source, and a bitrate, is determined based at least in part on the past performance information examined at 1004. As one example, the correlated clients' performance with respect to different CDNs can be examined (e.g., at 1004), and a decision that the requesting client should obtain content from a particular CDN can be made based on the examination (e.g., as described in conjunction with FIG. 6). As another example, the current average bitrate of the correlated clients can be selected for use with the requesting client. A bitrate selection performed in this way can have a particularly positive impact on the experience of a user viewing short video clips, as contrasted with picking a default bitrate and adjusting the bitrate up or down empirically (either while the video plays, or as part of an initialization). As yet another example of the processing performed at 1006, a particular CDN node can be determined for the client (e.g., where an owner of a CDN network is operating CDC 408, or is otherwise using CDC 408 to assist in CDN node selection). In some embodiments, the CDC is configured to evaluate the set of resources that are specified in the VRL by the CMS as storing the content (information of which is maintained by the CMS). In some embodiments, the resources indicated in the VRL must match to resources that have been configured in the CDC, and which the CDC is configured to monitor and collect performance information. The optimal CDN and/or bitrate is then selected from the indicated resources based, for example, on the evaluation/determination described above.

In some embodiments, the decision made at 1006 is based wholly, or predominantly, on the performance information of correlated clients. As one example, in the case of a video service that offers short clips and does not require users to log in, very little, if any, information may be known about the specific requesting client. Further, as explained above, the requesting client may be running a standard browser application that does not provide details about the client/the client's performance to other entities such as CMS 406 or CDC 408. In other embodiments, the performance information of correlated clients is one of multiple factors in deciding a content source and/or bitrate for the client. For example, if CMS has existing information about the client (e.g., because it has stored historical performance information about the client), or if CDC 408 has information about the client (e.g., because the client is already streaming content and/or is reporting statistical information to either of CMS 406 or CDC 408), the decision made at 1006 can be based both on knowledge about the client, as well as knowledge about clients correlated with the client.

Finally, at 1008, instructions are provided to the client. In some embodiments, the instructions include manifest type responses from the CDC to the client. As one example, instructions are provided to the client at 1008 when a CDC provides a manifest to a client (e.g., 808). In some embodiments the instructions are included in a message that will result in the client sending a second manifest request to the CDN selected by the CDC. For example, the CDC provides a URL to the client for the selected CDN, which redirects (e.g., via HTTP 302 REDIRECT) the client to request a manifest file from the selected CDN. In other embodiments, the CDC, based upon the determination made at 1006, retrieves a manifest file from a CDN and rewrites the retrieved manifest file (e.g., rewrites bitrate field), an sends the updated file to the client. Other types of responses, such as those for handling errors and fallback can also be sent, as will be described in more detail below. In some embodiments, although the client has been redirected away from the CMS to communicate directly with the CDC, the CMS is able to monitor the status of services of the CDC provided by the CDC (e.g., to detect service degradation).

Proxy Mode Integration

In proxy mode, a CMS acts as the middleman between the viewer's video player and the CDC. For every video request the CMS receives, the CMS sends, in some embodiments, a VRL request to the CDC (which is used to query the CDC and invoke the global intelligence of the CDC). Upon receiving a response back from the CDC (e.g., priority list of selected CDNs, ranked), the CMS constructs a URL for a CDN (e.g., top ranked CDN in received priority list) for the player and sends the constructed URL back to the requesting device. An example sequence diagram below illustrates a workflow for session initiation using the direct mode.

For purposes of illustration, a VRL protocol message is sent from the CMS to the CDC. Any other communication protocol, such as a private communication protocol, can be used to query the CDC.

In some embodiments, proxy mode integration is utilized in scenarios in which the CMS is flexible and modifiable, as proxy mode integration eliminates additional integration for failover, and also reduces the number of components with which a content player communicates (e.g., in comparison with the direct mode, in which a content player communicates with both the CMS and the CDC).

Figure 11:
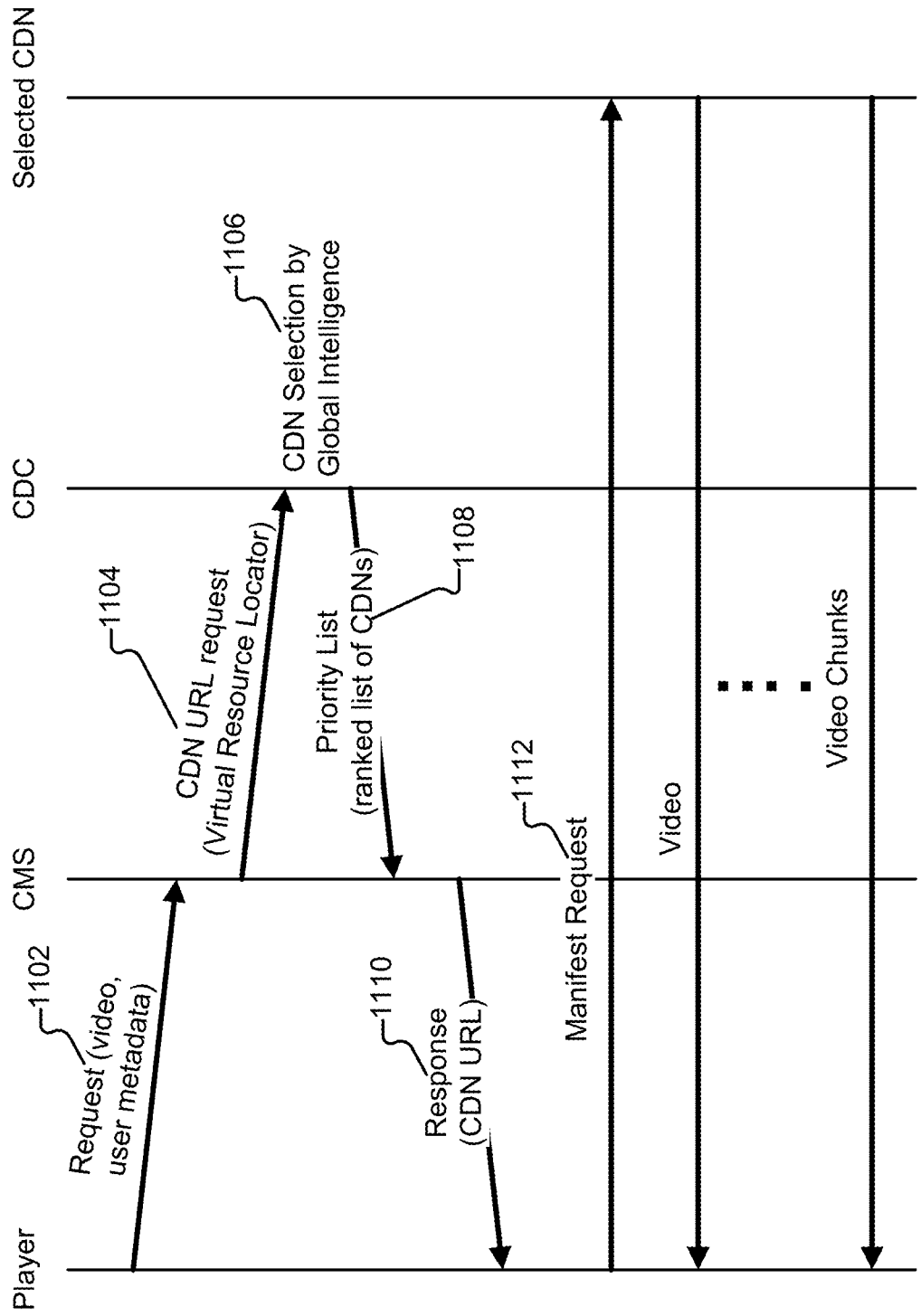
FIG. 11 depicts a call flow used, in some embodiments, to direct a video player to a video source using a proxy mode.

FIG. 11 depicts a call flow used, in some embodiments, to direct a video player to a video source using a proxy mode. First, as in the example direct mode call flow described above, a client such as client 102 of FIG. 1 sends a request for video to the CMS 1102. In addition to the video being requested, additional information about the user/client is included in the request, or is otherwise obtained by the CMS about the client. As described in FIG. 8, the additional client information may be limited (e.g., just an IP address, or an IP address and a User Agent string) but can also include a variety of attributes (e.g., client type and display size). As one example, the CMS may be publicly accessible, and not require a user to have an account to watch videos. Further, that CMS may make use of standard video playback capabilities provided by a browser application. In such a scenario, limited information about the client may be provided at 1102. As another example, access to the CMS may require a user account, and/or may require a customized player application that can obtain more detailed information about the user/client and provided at 1102. In some embodiments, the VRL is configured by the CMS to include (e.g., by specifying VRL parameters) an indication of the content sources on which the requested asset is stored (e.g., either through URLs of the resources, aliases of the resources, etc.). The CDC will select an optimal resource from the indicated candidate resources.

In this example, instead of the CMS answering with a VRL to the client (as in the direct mode described above), at 1104, the CMS builds and forwards the VRL to the CDC (e.g., CDC 408). In some embodiments, the VRL is constructed by modifying an existing asset URL (e.g., by adding query parameters, changing the hostname, etc.). In some embodiments, while the CMS awaits a response from the CDC, the client's request is buffered at the CMS.

At 1106, upon receiving the VRL, the CDC selects a list of preferred CDNs based on the following information: (1) information embedded in the URL (e.g., client attributes, the set or resources storing the content, as indicated by the CMS, etc.); (2) playback quality experienced by other similar clients watching at the same time; (3) a Global IP address; (4) bitrates at which the content is encoded, and the CDNs or origin servers where the content is stored; and (5) Global policies such as the fraction of clients allowed on each CDN, or the maximum arrival rate of new clients at a given CDN. In one embodiment, the list contains only the CDNs that satisfy the global policies, listed in the decreasing order of the client's predicted performance when using the recommended CDN and bitrate (i.e., the CDNs are ranked). The list is then provided as a response to the CMS. In some embodiments, instead of a list of prioritized recommendations for content sources, a single CDN is recommended and provided as a response to the CMS. In some embodiments, the CDC is configured to evaluate the set of resources that are specified in the VRL by the CMS as storing the content (information of which is maintained by the CMS). In some embodiments, the resources indicated in the VRL must match to resources that have been configured in the CDC, and which the CDC is configured to monitor and collect performance information. The resources indicated in the VRL are then ranked/prioritized based, for example, on the evaluation/determination described above.

At 1108, the CMS then picks a CDN from this list (e.g., the first CDN in the list), creates an URL for the content requested by the client and the CDN it has selected, and sends this URL to the client (1110). In some embodiments, at 1108, the CMS picks a CDN and/or bitrate from a ranked list of CDNs and/or bitrates. In turn, at 1112, the client uses this URL to download the manifest file. Once the client receives the manifest file, the client uses the information in this file to download and start playing the video chunks.

As described above, "similar" clients include those clients sharing a subset of attributes with the client making the request. Examples of these attributes include: DMA, ASN, content, content provider, device type, etc. The higher the overlap between the values of the attributes of two clients, the higher the "similarity" of the clients. The quality experienced by similar clients is used by the CDC to accurately predict the quality that the requesting client will experience when streaming at a given bitrate and from a given CDN.

In some embodiments, in the proxy mode of integration, VRL integration is implemented by the CMS making a synchronous VRL call to the CDC for each content request. As the CMS/headed makes a direct call to the CDC, the CMS is able to monitor directly for responses from the CDC and can, for example, timeout if no response is received. As will be described in more detail below, in the event that such a failure occurs, in some embodiments, the CMS is configured to use a last good (cached) CDC response for the requesting device type. In some embodiments, the CMS is configured to perform VRL caching (if a VRL protocol message is used between the CMS and CDC), which may be used with very short time-to-lives (TTLs)/cache expiration timer (e.g., <1 minute per device type). In some embodiments in order to implement proxy mode integration, the CMS is configured to handle responses of a particular type (e.g., JSON) from the CDC (allowing for interoperability). Additionally, in some embodiments, the CMS is configured to pass device IP addresses through to the CDC in a message (e.g., as a query parameter of a VRL).

Figure 12:
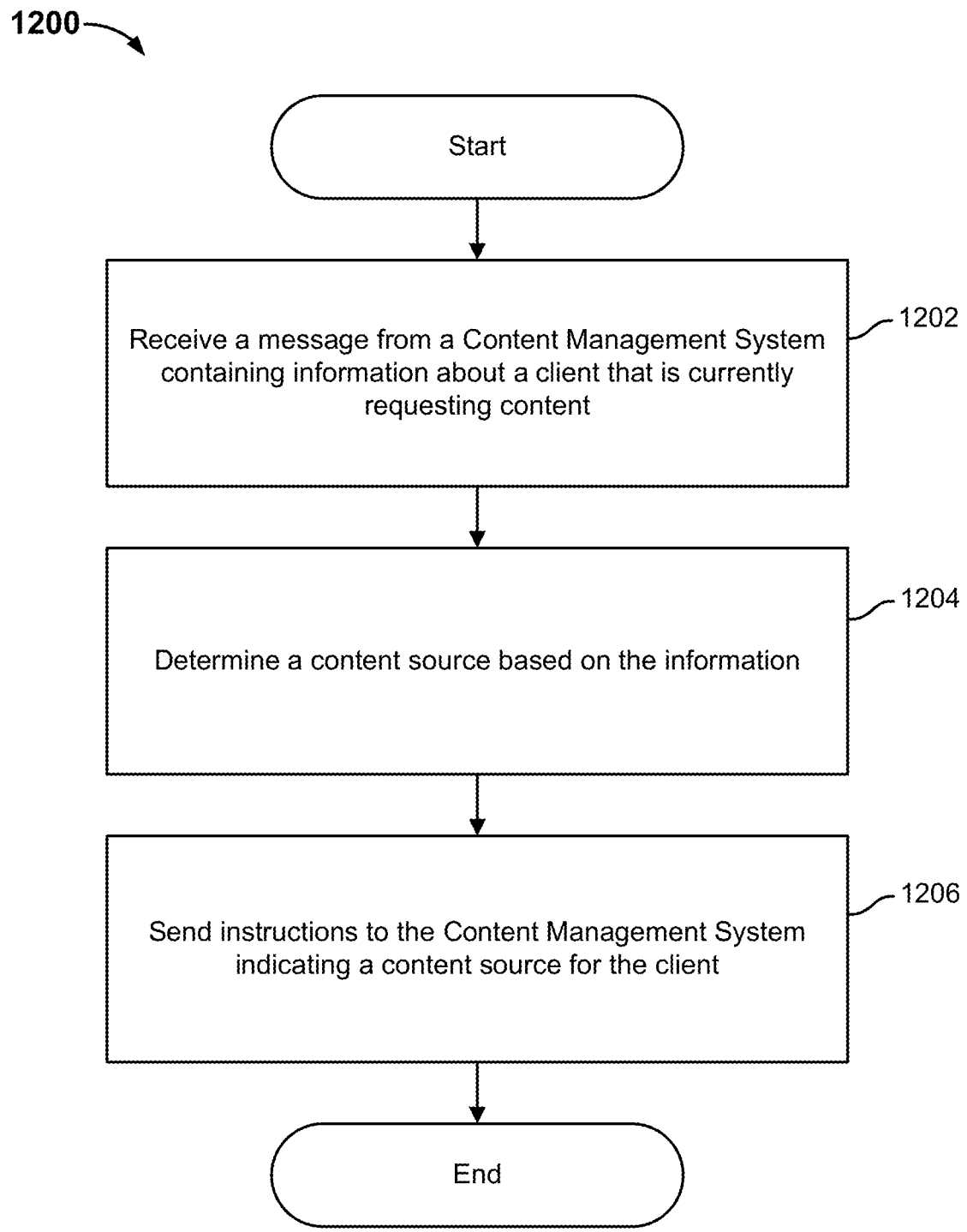
FIG. 12 illustrates an embodiment of a process for directing a video player to a video source.

FIG. 12 illustrates an embodiment of a process for directing a content player to a content source. In some embodiments, process 1200 is performed by content distribution coordinator 408. As explained above, content distribution coordinator 408 can be operated independently, but can also be operated by an operator of a content management system (e.g., CMS 406) or other entity, such as an operator of a CDN. Accordingly, in some embodiments/scenarios, other components may perform process 1200, instead of or in addition to CDC 407. Further, multiple components may cooperate to perform process 1200.

The process begins at 1202, when a message is received from a content management system containing information about a client that is currently requesting content. As explained above, the information about the client can include various attributes and parameters about the client, such as the device type of the client device (e.g., set-top box, mobile device (e.g., smartphone, tablet, etc.), desktop, laptop, smart TV, console, bluray player, disc player, streaming media player, dongle, etc.). The information about the client can also include the streaming/content/data plane protocol to be used (e.g., Apple® HTTP Live Streaming (HLS), Microsoft® Smooth Streaming (SS), Adobe® HTTP Dynamic Streaming (HDS), Progressive Download, MPEG DASH, MS® Windows Media, etc.). The information can also include a request identifier for the requester and timestamp for the request (e.g., that corresponds to the time when the message was generated). The information can also include the operating system version of the client device (e.g., Windows® Operating System, Mac® OS, Android®, iOS®, Windows® Phone, etc.). The information can also include the public/global IP address of the end-user client's device. This can be used by the CDC to perform geo-location services. The information embedded in the message can also include a user-agent of the video device. The information can also include the brand of the end-user client device (e.g., Apple®, Samsung®, etc.), device model, device firmware version, etc. The information can also include device connection/connectivity information, for example, a string that identifies the device's last-mile connection (e.g., 3G, 4G LTE, WWAN, WiFi, Satellite, Cable, ISDN, dialup, DSL, ETH, TX (such as T1 or T3), Frame Relay, OCX, Fixed wireless, mobile wireless, etc.). The information can also include a unique device identifier (e.g., in case device-specific policies are configured).

The information can also include information about the asset. For example, the information can include encoding information about the bitrates of available encodes of the content being requested. The message can include the name of the content/asset that the client is requesting (e.g., the title of the asset, unique content identifier, etc.). The information can also include information associated with the type of content being requested (e.g., on demand, live event, linear live, event replay, download, etc.)

The information included in the message can also include information associated with the CMS. In some embodiments, the message also includes a set of URLs/path names (or any other appropriate location identifier) of CDNs/content sources that store copies of the content item. The provided set can be used an initial set of content sources from which a content source such as a CDN is selected to be assigned to the requesting client. The set of resource paths/URLs can also be ranked according to a determination of the best quality resources for a given requesting client. The information can also include a customer id (e.g., alphanumeric account identifier assigned to owner of CMS that is a customer of the CDC). The information can also include customer-specific key-value pairs, such as customer-specific metadata to be used for policy control or analytics.

The information can also include information about the end-user operating the requesting client device, such as account user information, permissions, preference information, subscriber level (e.g., premium vs. standard), subscriber/viewer identifier (e.g., obfuscated value of a service subscriber ID) or any other appropriate attributes.

In some embodiments, the message is a Virtual Resource Locator (an example of which is shown in FIG. 9 and also described in more detail below), which has embedded the information about the client and any other appropriate information. In some embodiments, the VRL is generated by the CMS, which converts an existing asset URL maintained by the CMS (which may include a directory of the URLs to assets on content resources). Any other communication protocol (e.g., private communication protocol) can be used between a proxy (e.g., CMS) and server (e.g., CDC). Further details of the VRL are described below.

At 1204, a set of potential/candidate resources to assign to the client is determined/selected. In some embodiments, similar to the example of FIG. 10, content source determination/assignment can include determining past performance for a plurality of clients that are correlated (or "similar") to the requesting client based on attributes of the client (included in the VRL) using network partitioning techniques such as those described above. In some embodiments, the set is ranked/prioritized according to the determination (e.g., quality evaluation). For example, the VRL/message received from the CMS can include a set of URLs/paths to copies of an asset stored on various CDNs (which may also be encoded at different bitrates). The set of candidate resources is evaluated by the CDC and prioritized based on the information contained in the received message. Each candidate content source can be evaluated to determine a prioritized list of content sources and/or bitrates based at least in part on the past performance information that was previously determined.

At 1206, instructions are sent to the content management system indicating a content source for the client. For example, based on the determination, a priority list of CDNs and bitrates are sent back to the CMS in a JSON formatted response. In some embodiments, the priority list is a resource list with the sort order determined by a ranking filed priority. The list can include, for each resource (e.g., CDN) listed (e.g., with accompanying URL or alias), the priority of the CDN, and the name of the selected CDN (e.g., from a CDC-published list of CDN canonical names). Upon receiving the list, the CMS is configured to point/direct the requesting client player to a CDN in the list (e.g., the top priority CDN from the list). For example, the CMS can create an URL for the content requested by the client and the selected CDN, and use the URL to redirect the client to the selected CDN. In some embodiments the CMS is configured to fail back to lower priority CDNs when higher priority backends are unavailable. Further details of the priority list are provided below. In some embodiments, the priority list is included in a JSON formatted response from the CDC to the CMS. Responses for handling errors and bad message requests can also be sent to the CMS, as will be described in more detail below.

Figure 13:
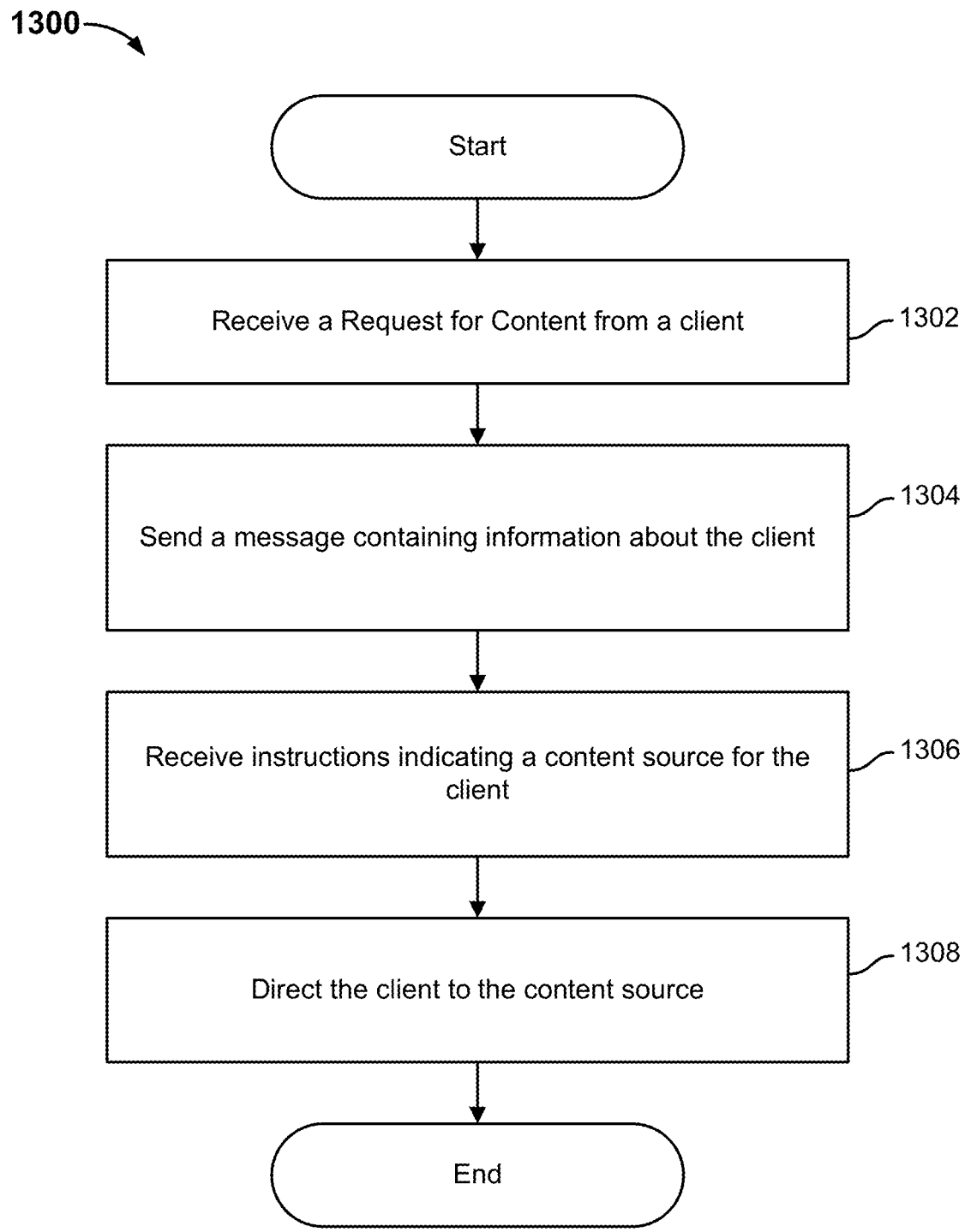
FIG. 13 is a flow diagram illustrating an embodiment of a process for directing a video player to a video source.

FIG. 13 is a flow diagram illustrating an embodiment of a process for directing a video player to a video source. In some embodiments, process 1300 is performed by a content management system such as CMS 406. The process begins at 1302, when a request for content is received from a client. In some embodiments, the client's request is buffered while the message and instructions described below are communicated between the CMS and a CDC whose services are invoked. In some embodiments, error handling and fail back measures (described in more detail below) are provided in the event of an outage or a transient failure.

A 1304, a message containing information about the client is sent, for example, to a content distribution coordinator such as CDC 408. As described above, in some embodiments, a VRL is constructed (e.g., by modifying an existing asset URL maintained by the CDC) and sent to the CDC. The VRL has embedded various information about the client device, end-user operating the client, the asset to be requested, as well as any other appropriate parameters/attributes/characteristics.

At 1306, instructions are received indicating a content source for the client. For example, a priority list can be received from a CDC indicating a ranked list of content resources (e.g., CDNs) and bitrates to assign to the client.

At 1308, the client is directed to the content source. For example, upon receiving the priority list, a URL for the top priority CDN in the list (i.e., the CDC's recommended selection) is constructed and sent to the client. The client is then redirected to the selected CDN and/or bitrate according to the URL. In some embodiments, fail back to a URL of a lower priority CDN is formed when higher priority backends are unavailable.

Additional Details Regarding Embodiments of Error Handling and Fallback

In some embodiments, a content distribution coordinator such as CDC 408 is configured to provide error handling and fallback handling in the event of errors/failures. In some embodiments, a CDC is part of a control platform that includes redundant infrastructure and is designed for high availability without any single points of failure in the component architecture that serves the VRL requests. Thus, for example, customer-facing (e.g., entity utilizing CDC services) critical services can be prevented from being impacted by any planned maintenance on the CDC service.

In order to account for errors/failures that may occur in directing a content player to a content source (or satisfying a VRL request), in some embodiments, the CDC and/or a CMS are configured to provide fallback handling such that the CDC integration process described above, which can include the use of VRLs for communication between content delivery ecosystem components, can fall back gracefully in the event of an outage or transient failure in processing a VRL request. In some embodiments, fallback handling is dependent upon the CDC/VRL integration mode used in the content delivery ecosystem (e.g., direct mode, proxy mode, etc.).

Direct Mode Fallback

In direct mode, the CMS instructs the requesting client to redirect away from the CMS and to directly communicate with the CDC to retrieve content. In some embodiments, even after the client is handed off to the CDC, the CMS is configured to monitor the status of the services provided by the CDC in order to detect to service (e.g., VRL request) degradation and, for example, react by temporarily bypassing the VRL. To facilitate the monitoring, in some embodiments, the CMS is provided (e.g., by the operator of the CDC) with an application programming interface (API) for checking on the status of VRL requests to the CDC.

CDC Status Check

In some embodiments, the VRL status API is an HTTP API that provides availability monitoring for the CDC (or control platform that the CDC may be a part of). In some embodiments, API responses are generated using the same infrastructure as the service processing VRL requests. Thus, it can be assumed/determined that a persistent error or timeout in receiving a response from the VRL status API reflects the same impact on content players (e.g., API response error reflects a persistent error or timeout experienced by the content player in receiving a response from the CDC).

In some embodiments, the VRL status API can be accessed via an HTTP GET call, such as the example call shown below:

http://status.cdc.com/vrl

An example of a successful response from the API is:

$ curl http://status.cdc.com/vrl
{"status": "OK"}
$

For example, in some embodiments, a failure can be assumed if the request times out or returns an HTTP Status Code other than 200.

For direct mode integration, monitoring agents for the VRL Status API can be setup with various parameters. One example parameter is a polling timeout, which specifies the time to wait for after making an HTTP GET request on the Status API before considering the poll attempt to be failure. An example value for the polling timeout is 500 ms. Another example parameter is a polling interval, which specifies the minimum time between successive calls. An example polling interval is 5 seconds. Another example parameter is a number of bypass retries, which specifies a minimum number of consecutive failures that require a VRL bypass action. An example bypass retries value is 5.

Fallback Options

Upon detection of a CDC service degradation and that a VRL should be bypassed (e.g., a health/status check failure has occurred), in some embodiments, fallback options are provided, which include falling back to a default CDN URL. One example fallback option includes using a DNS CNAME change. Another example fallback option includes purging cached CDN URLs. Although the techniques can be used individually, the two techniques may also be applied in tandem, as a DNS may be able to enforce a Canonical Name (CNAME) change sooner than a CDN is able to perform cache purging. Both fallback options are described below.

DNS CNAME Fallbacks

In the fallback option using a DNS CNAME change, the CMS can fallback using DNS CNAME via Domain Name System (DNS) changes. In some embodiments, a DNS Canonical Name (CNAME) record is used in conjunction with the VRL request. The change can then be enforced through a DNS system or provider to point the CNAME to a default fallback CDN hostname.

In some embodiments, DNS providers may also provide health/status check monitoring service and the DNS provider, configured with an appropriate fallback setup, can implement the VRL Status API monitoring:

For example, a customer (e.g., CMS operator that is a customer of an operator of the CDC services) can use the following scheme:

'cdn.xyz.com' is a CNAME for 'vrl.m.cdc.com'

In case of Health/Status Check failures, this DNS CNAME change can be pushed

'cdn.xyz.com' is a CNAME for 'xyz.default-cdn.com'

DNS changes may start propagating rapidly, allowing the CMS to direct content players to fallback to a default CDN URL without causing any client/player modifications if the default CDN is able to serve a valid asset URL and the DNS infrastructure honors the DNS TTLs (time-to-live). An example DNS TTL setting, which specifies a time-to-live setting for DNS CNAMEs for VRLs, is 5 minutes.

Purging Cached CDN URLs Fallback Option

In the fallback option of purging cached CDN URLs, in some environments and embodiments, a caching layer can be used on a CDN to store per-asset metadata and CDN URLs. This can be performed, for example, when using an Online Video Platform (OVP) or if video metadata pointing to CDN URLs is also in the CDN itself. In some embodiments, once a CDC is integrated with a CMS (e.g., to coordinate content distribution to client devices), the VRLs to assets are also stored in the video metadata of CDNs. As new content is made available, content providers can push new files to the CDN storage and purge old content.

In some embodiments, upon determining a service degradation (e.g., health/status check failure), metadata for a content catalog can be updated to replace VRLs with default CDN URLs. In a globally distributed cache/CDN, the changes will propagate across various edge server locations.

As described above, as DNS changes may propagate more quickly than CDN purges, in some embodiments, the DNS CNAME technique can be employed in addition to using CDN purges.

Proxy Mode Fallback

In proxy mode integration, in which the CMS acts as a proxy, communicating with a CDC on behalf of a requesting client, failures may potentially occur at various points in the call flow. For example, a failure may occur in which the CDC is unable to provide a priority list back to the CMS (e.g., due to network failures). Thus, in some embodiments, an appropriate timeout setting can be set for the CMS while waiting for a response back from the CDC. For example, a VRL timeout setting of 500 milliseconds can be set as the timeout for measuring the delay between initiating the HTTP call for a VRL and receiving a response back. In some embodiments, the time-out is a time that the CMS should wait for after making a VRL request before failing back to a default CDN URL (e.g., to provide to the client whose request has been buffered at the CMS and that is awaiting a response from the CMS). In some embodiments, both the CMS and the CDC are configured to detect and handle error/failure scenarios, examples of which are described in further detail below.

Additional Details Regarding Embodiments of the VRL Protocol

As described above, use of VRLs allows the use of client attributes and capabilities in addition to other parameters (e.g., CDC/CMS parameters) to aid in decision making for the selection of an optimal content source and/or bitrate for a requesting client (e.g., optimal video stream out of one or more CDNs using one or more bitrate resolutions).

Described herein are two example versions/implementations of the VRL Protocol (which are provided in addition to the example VRL format described in conjunction with FIG. 9).

First Example VRL Protocol Version/Implementation:

VRL Request

In some embodiments, the VRL is used to replace an existing content asset URL (e.g., URL maintained by CMS for assets on various CDNs/bitrates). In some embodiments, the VRL uses query parameters to encode the information to be used by the CDC. The query parameters may be required, recommended, optional (e.g., based on availability), etc.

VRL Format

Two example formats for the first example version of the VRL are provided below. In some embodiments, the format used depends on the (level of) integration of components such as a CDC, CMS, and client device, and/or the capabilities/configuration of client devices, the CMS, the CDC, etc. in a content delivery ecosystem.

The first example format is a query parameter based VRL (also referred to herein as a "QVRL"), which can be used whenever a VRL is configured to include query parameters whose corresponding values are to be used by a CDC (e.g., CDC-specific query parameters). This format can be used, for example, when a CMS is configured to modify not just the hostname (of an existing, traditional asset URL maintained by the CMS from which the VRL is created), but also add query parameters to the URL. In some embodiments, use of such a VRL supports advanced features such as client authentication, CDN token authentication, analytics on assets and policy control, etc. based on custom parameters. An example of the first VRL format is provided below:

http[s]://vrl.m.cdc.com/path?query-params

If query parameters cannot be included, a second VRL format (shown below), also referred to herein as an "encoded-hostname" VRL (also referred to herein as an "HVRL"), can instead be used to encode required parameters in the hostname:

http[s]://encoded-hostname.m.cdc.com/original-path

The second format can be used when systems such as a CMS attempting to convert/modify a traditional content asset URL (that is maintained by the CMS) into a VRL readable by the CDC are configured to change the Hostname (e.g., via a DNS CNAME) of the asset URL, but are not configured to modify the path or add CDC-specific query parameters. Further details of how the encoded-hostname can be used to encapsulate information required by the CDC will be provided below.

VRL Size

In some embodiments, the VRL is constrained to a maximum size (e.g., 2048 bytes). In some embodiments, if a VRL larger than the maximum is generated (e.g., by a CMS), then the VRL is truncated to the first 2048 bytes. Thus, required parameters should be encoded in the query-string ahead of other parameters (which can include optional parameters as well).

VRL Path

In the first example QVRL format described above, the path is the part of a URL that is after the hostname and before the question mark that precedes the query parameters. For encoded-hostname VRLs (HVRL example format, above), in some embodiments, the existing path of the CDN URL is required to be used when constructing the path of the VRL.

In some embodiments, for VRLs with query parameters, such as in the first example format (1), the path of the VRL is configured to include a protocol-specific file extension, as the VRL may be handed off directly to a content player (e.g., in direct mode), and the content player may require a file extension. For the VRL, the existing path of the CDN URL can be used (e.g., assuming that the existing path is identical on all CDNs), or the following example literal values for VRL paths for various video protocols can be used:

For example, for the Apple® HTTP Live Streaming (HLS) video protocol, an example literal value for the VRL path is "/a.m3u8."

For the Microsoft® Smooth Streaming (SS) protocol, an example literal value for a VRL's path is/a.ism/Manifest. In some embodiments, a parameter indicating an extra directory can be specified for when using Microsoft Smooth Streaming.

For the Adobe® HTTP Dynamic Streaming (HDS) protocol, an example literal value is "/a.f4m."

For the progressive download video protocol, an example literal value is "/a.mp4."

VRL Query Parameters

In some embodiments, CDC-specific information (i.e., information to be used by the CDC) included in the VRL is encoded in URL query parameters (e.g., QVRL format described above). In some embodiments, the query parameters include required and/or optional parameters, with certain parameters enabling advanced features such as content analytics, device break-downs, and custom policies.

In some embodiments, the formation of query parameters can be based on a set of associated rules. One example rule is that each query parameter defines a key-value pair. In some embodiments, the key is a pre-defined string (examples of which are provided below). In some embodiments, the value is either customer-specific (e.g., CMS operator specific) or a pre-defined enumerated value.

Another example rule is that all query parameter values should be properly URL encoded (e.g., according to URL/HTTP protocol). Another example rules is that any non-ASCII query parameter values must use UTF-8 encoding.

Another example rule that can be used to govern query parameters in VRLs is the requirement that each query parameter key be of the form "PFX.KEY," where the "PFX" is representative of a prefix for query parameter keys. An example default value for PFX is "c3." As VRLS can be constructed from existing asset/CDN URLs, in some embodiments, if the CDN URL that is to be converted into a VRL (e.g., the CDN URL stored by the CMS being modified) includes query parameters that conflict with "c3" (e.g., which would cause a collision), the PFX can be overridden with another prefix defined by an optional special query-string key (e.g., "CDC PREFIX") to avoid collisions. The examples below use prefix "PFX"="c3."

In some embodiments, custom key-value pairs can also be implemented in a VRL (e.g., for different customers/entities utilizing CDC services). A rule can be configured such that custom key-value pairs adhere to a particular form (e.g., "PFX.ext.key"). In some embodiments, omitting required parameters results in an error, which can be enforced using a rule validating VRLs. Example query parameters, including required and/or optional query parameters, for a VRL are provided below:

PFX.vr ("VRL protocol version"): a query parameter for indicating the VRL protocol version being used PFX.ck ("customer key"): a query parameter for indicating a customer key. As one example, the value is a 40-character alphanumeric account identifier assigned to the customer CMS (e.g., customer using CDC services). An example value is c3.ck="a123456789b123456789c123456789d123456789" (where "c3" is the prefix being used to indicate a CDC query parameter key).

PFX.rt ("response type"): a query parameter for indicating response type. Example values are "m" for manifest response type (e.g., for manifest responses from the CDC in direct mode described above) and "p" for priority list response (e.g., for priority list responses from the CDC in proxy mode described above). In some embodiments the manifest response type indicates that a manifest file from a CDN selected by the CDC should be returned (e.g., to the client requesting content). Additional values can be used, for example, to specify a particular manifest type response if more than one manifest response type is available (e.g., manifest rewrite, redirection, etc.). In some embodiments, the priority response type indicates that a ranked list of content startup parameters (e.g., CDNs and/or bitrates) should be returned. Further details regarding responses to VRL requests are provided below.

PFX.vp ("video protocol"): a query parameter for indicating the data plane protocol to be used (e.g., streaming protocol). Examples of data-plane video protocols include progressive download, Apple HLS, MS Smooth Streaming, Adobe HDS, MPEG DASH, MS Windows Media, etc. (with unique values corresponding to each of the protocols). Protocols for other types of content (e.g., audio files, documents, etc.) can also be specified.

PFX.im ("integration mode"): a query parameter for indicating integration mode of a CDC in directing a content player to a content source (e.g., direct mode, proxy mode, etc.). As one example, the value for the parameter is a Boolean value that indicates whether the VRL (i.e., asset request) is sent directly from a content player of a device (i.e., direct mode), or through a proxy server (e.g., CMS or Headend in proxy mode).

PFX.um ("URL mode"): a query parameters for indicating URL mode. As one example, the value for the parameter is a Boolean value that indicates whether a requested asset's URL paths are identical or different on various CDNs (that the asset may be replicated on). In some embodiments, if URL tokenization is used, the value corresponding to different asset URL paths must be selected, and the full, tokenized URLs for each CDN provided in the query parameters (e.g., using PFX.r1, PFX,r2, etc. described in more detail below).

PFX.ri ("Request Identifier"): a query parameter for indicating a unique identifier for the VRL request. In some embodiments, this allows a content distribution control platform such as a CDC to track every VRL request in order to make an optimization decision. An example value for the query parameter is a 64-bit non-negative random decimal number. The protocol can also accept two 32-bit non-negative random decimal numbers separated by a period. Example supported formats include: c3.ri=<64 bit-random-number> or c3.ri-<32 bit-random-number>.<32-bit-random-number>. An example value is "c3.ri=9876543211234" or "c3.ri-1234.123456789." Alternatively, a timestamp query parameter (described below) can be used to provide a unique VRL identifier.

PFX.ts ("timestamp"): a query parameter for indicating a server request timestamp. An example value for the parameter is a Unix Epoch timestamp in milliseconds at the CMS/CDC at the time when the player requested the video from the CMS/CDC. This can correspond to the time when the VRL was generated.

PFX.cs ("custom string"): a query parameter for entering an arbitrary string. In some embodiments, this is an optional parameter that enables the VRL request/device to be associated with a particular policy (configured on a policy engine of a CDC, described in more detail below along with additional details of a content distribution coordinator). An example value for the query parameter is "c3.cs=mss."

PFX.r1 ("Primary/Default CDN Resource"): a query parameter for specifying customer-specific primary/default CDN resource (e.g., via an alias or URL) on which the requested content is stored. In some embodiments, the query parameter is optional if CDN paths are identical and all CDN host/paths can use the same query-parameters. In some embodiments, this query parameter is required if CDN paths are different or require different query parameters. In some embodiments, the value specified for the value is a valid and complete CDN URL pointing to the primary/default CDN, including encoded information such as hostname and any query parameters associated with the primary/default CDN (e.g., for CDN authentication). In some embodiments, the value corresponding to the query parameter is the default CDN resource to be used as a fallback if a CDC does not have sufficient information to make a source assignment decision. In some embodiments, when CDN paths are different, or URL tokenization is used on two or more CDNs that require different query parameters, the value should be a valid and complete CDN URL for the primary CDN, and should include hostname, path, and any query parameters (e.g., CDN tokenization parameters). In some embodiments, when CDN paths are identical, but PFX.r1 is required, PFX.r1 should at least have the scheme and hostname of the CDN URL (e.g., http://custA.fplive.net). PFX.r1 should correspond to a resource listed in the policy engine (described in more detail below) of a CDC (where the resource is usually a prefix-match of PFX.r1). For example, if the primary/default URL for an asset is: http://custA.fplive.net/vod/id12345/hd.m3u8, the "r1" parameter can be set as "cd.r1=http %3A %2F %2FcustAfplive.net %2Fvod %2Fid12345%2Fhd.m3u8." The corresponding resource in the policy engine of the CDC can be configured in the following example manner: "Resource URL Prefix: 'http://custAlplive.net'"; "CDN: 'AcmeCDN'"; "Name: 'Primary AcmeCDN VOD'."

PFX.r2-PFX.r<n> ("other CDN resource(s)"): query parameters used to specify other customer (e.g., CMS operator/content owner) CDN resource(s) on which the requested asset/content is stored. The values may be customer-specific. For example, PFX.r2-PFX.r<n> can be specified to enable multi-CDN selection (e.g., selection of CDN resource(s) other than/in addition to the primary/default CDN specified in the PFX.r1 parameter described above).

PFX.os ("operating system"): a query parameter for indicating the operating system of a requesting client device. An example value for the query parameter is a string representing the operating system of a client video device. This parameter can, for example, include generic Android® and derivatives.

PFX.ov ("operating system version"): a query parameter for indicating operating system version of the requesting client device (e.g., full version number of the device's operating system). This parameter can also be used for troubleshooting/debugging, for example to detect content delivery issues (e.g., video streaming problems) that may be specific to a particular operating system version.

PFX.ip ("ip address"): a query parameter for indicating the public/global IP address of an end-user's device. In some embodiments, specification of this parameter is required if the integration mode is proxy mode. For example, in direct mode, the player IP address is directly available to the CDC when the player is the entity making the VRL request. However, if a proxy (such as a CMS) invokes the VRL request on behalf of an end-user's video player, the IP address of the player is not directly available to the CDC (as the player does not directly communicate with the CDC). The IP address of the end-user is used by the CDC for geo-location services. An example value is "c3.ip=1.2.3.4."

PFX.ua ("user agent"): a query parameter for indicating the user-agent of the video device, with appropriate URL-encoding.

PFX.b1-b9 ("streaming bitrate"): query parameters for indicating (streaming) bitrates of available encodes of a content asset (e.g., in Kbps).

PFX.an ("asset name"): a query parameter for indicating the asset name of a requested asset. In some embodiments, a content description (e.g., title) can also be specified. A unique content ID and a human readable string can be specified for this query parameter.

PFX.dt ("device type"): a query parameter for indicating the device type of the requesting client device. In some embodiments, the value corresponding to this query parameter is a predefined string that identifies the type of the requesting client device. For example, in video distribution environments, values can be specified for video devices such as set-top boxes, streaming devices, Internet-connected televisions, mobile devices (e.g., smartphones or feature phones used to watch a video in a browser or dedicated application), consoles (e.g., game consoles), tablet devices, personal computers (e.g., desktop computers, laptops, etc.), disc players (e.g., BluRay® players used as set-top boxes), or any other appropriate device. A value for unspecified types of devices can also be specified for the query parameter.

PFX.db ("device brand"): A query parameter for specifying a string that identifies the device platform manufacturer for the requesting device (e.g., "Apple®," "Samsung®," etc.). In some embodiments, the device brand information can be provided to other entities. For example, a business can use the information to determine where to allocate development (e.g., to the content player or mobile application) and other (e.g., advertising, partnership development, etc.) resources. Such information can be made accessible via a portal as described in more detail below.

PFX.dm ("device model"): A query parameter for specifying a string that identifies the model version of the requesting device (e.g., "iPhone5S®"). In some embodiments, this query parameter can be used to optimize bitrate selection. For example if a device is known to have 720p screen resolution, a high bitrate stream available for 1080p screens will not be selected. This information, along with asset metadata, can also be used by other entities and third parties, for example, audience research personnel, to drive editorial and programming decisions. In some embodiments, the information is available via a web portal or any other interface provided by the CDC.

PFX.dc ("device connection"): A query parameter for specifying a requesting device's last-mile connection. In some embodiments, a pre-defined string value is specified for the key that identifies the last-mile connection. The last-mile connections that can be specified include 3G, 4G, LTE, WWAN, WiFi, satellite, cable, IDSN, dialup, DSL, ETH, T1, T3, Frame Relay, Fixed Wireless, Mobile Wireless, or any other appropriate last-mile connection.

PFX.di ("unique device identifier"): A query parameter for specifying a string that uniquely identifies a device, for example in scenarios in which device-specific polices are implemented. In some embodiments, the device identifier information can be used for advanced audience analytics in order to evaluate content consumption habits/patterns of content consumers (e.g., on specific devices). For example, the information can be used to improve programming and editorial decisions.

PFX.vi ("viewer ID"): A query parameter for specifying a unique string that corresponds to a particular subscriber/viewer. This value can be an obfuscated value of a service subscriber ID (e.g., subscriber ID for a subscriber of a movie streaming service). The value associated with this parameter can also be used to identify viewer-specific sessions to provide customer service or analyze content consumption patterns. In some embodiments, this information can be provided to other parties to analyze the type of content being requested. The information can be used, for example, to improve viewer retention and increase viewership hours, as well as advertising decisions.

PFX.at ("asset type"): A query parameter for specifying a (predefined) string indicating the type of content being requested. For example, in the case of video content, different types of content that can be supported include on-demand video, live events, linear live video content, event replay video content, content to be downloaded, etc.

PFX.ci ("client identifier"): A query parameter for specifying a client-specific identifier generated by the CDC operator, if the client device has installed a monitoring module (e.g., for providing performance/telemetry data to the CDC).

PFX.si ("session identifier"): A query parameter for specifying a session-specific id generated by the CDC operator, if the client device has installed a monitoring module (e.g., for providing performance/telemetry data to the CDC).

PFX.cp: A query parameter for specifying a URL encoded existing path to asset. In some embodiments, this parameter is used when a manifest response type is expected. In some embodiments, the URL does not include the hostname (assuming that the paths of assets are identical on all CDNs) but includes any query parameters. In some embodiments, if any CDN authentication parameters are included, CDN tokenization information (e.g., scheme type, parameters, shared secrets, etc.) should be provided to the CDC, as the CDC can be configured to replace the hostname to construct a final CDN URL used when providing a manifest response (described in more detail below).

PFX.ext.<key>=<value> ("customer-specific key-value pairs"): Query parameters for specifying any customer-specific metadata to be used, for example, for policy control or analytics. In one example implementation, all customer-specific keys must be prefixed with 'ext' to distinguish them from CDC-specific keys. The key and values can each be limited to a particular size of valid UTF-8 characters. An example value is "c3.ext.serviceType=premium" to indicate premium service.

VRL Responses

In some embodiments, aliases or URLs of CDN resource are configured in a policy engine of a content distribution coordinator out-of-band prior to the services of the CDC being enabled.

In some embodiments, once a CDC selects initial session parameters (e.g., based on client attributes and network partitioning), the CDC returns an appropriate response to a VRL request based on the value of the parameter specifying the response type requested from the CDC. Example response types include manifest response types and priority list response types (which in turn may correspond to direct mode/proxy mode integration of the CDC in a content delivery ecosystem), which will be described in further detail below.

Manifest Response Type (Direct Mode Integration)

In some embodiments, the manifest type response is used when a VRL request is sent to a CDC directly from a device or content player, for example, in the direct mode of integration of the CDC (client directly communicates with the CDC). In some embodiments, a manifest response type can be used in the proxy mode of integration.

Successful Manifest Type Response

In some embodiments, a CDC is configured to return a manifest file to a requesting client device. In other embodiments, the CDC can also redirect the client device to a URL from which the client device can retrieve a manifest file.

In some embodiments, upon determining an appropriate CDN selection, a CDC generates a URL of the requested asset on the selected CDN (e.g., selected optimal CDN). In some embodiments, the URL is constructed using the VRL request used to query the CDC. For example, in an encoded-hostname format VRL (described in more detail below), the VRL hostname can be replaced with the selected CDN's configured resource name (that is configured in a policy engine of a CDC, and which can either be another hostname, or a hostname followed by a fixed PATH string). For VRLs that include query parameters, a CDN URL (for the selected CDN) can be obtained from a URL specified in a resource query parameter of the VRL, or by appending a selected CDN's configured (in a policy engine of the CDC) resource name and the path/query encoded/passed in the VRL to generate a URL of the asset on the selected CDN.

In some embodiments, in a first manifest response type, the CDC responds (to the client) with an HTTP 200 Status Code and the appropriate master manifest file. In some embodiments, upon generating an asset URL on a selected CDN as described above, the CDC fetches the manifest file at the URL, and rewrites fields of the manifest file (e.g., bitrate). The CDC then sends the updated manifest file back to the client device.

In other embodiments, in a second manifest response type, the CDC responds (to the client) with an HTTP 302 REDIRECT Status Code with a Location HTTP Header pointing to a valid URL for the requested asset on the CDN selected by the CDC. For example, the CDC can generate an HTTP 302 to the URL generated by a CDC from a VRL request as described above. Handling of the HTTP 302 is transparent to the content player, and the content player receives a master manifest file regardless of how the CDC handles the VRL request (i.e., the client ultimately receives a manifest file, whether by receiving a (rewritten) manifest file from the CDC as described above, or through a redirection by the CDC to a CDN to retrieve the manifest file).

In some embodiments, if a warning occurs for HTTP 302 redirects, an extension HTTP header can be configured to include a warning message.

Error Response

In some embodiments, in the event that an error occurs while processing a VRL request, an HTTP Status code can be used to indicate the error. In some embodiments, a CDC attempts to fall back to a first resource (e.g., default resource) indicated in the VRL via an HTTP 302 REDIRECT. In the event that the CDC cannot return a valid manifest file, and HTTP Status code error can be returned along with a JSON formatted (or any other appropriately formatted) error response (e.g., by the CDC). An example JSON error response format is shown here:

{
"is_error": true,
"error_code": "ErrorCode",
"error_message": "ErrorMessageString",
"vrl": "The RequestVRLThatGeneratedThisResponse"
}

The following is a list of potential error scenarios or warning conditions for the manifest response type. Each scenario is associated with a corresponding HTTP Status code and JSON Error Code. The same HTTP status code may be returned for more than one scenario, while the JSON error code may be unique for each scenario. In some scenarios, no JSON text (error code) is returned.

Invalid Customer ID: an HTTP Status Code of 403 (indicating a forbidden request) is returned. No JSON text is returned. In some embodiments, if a primary/default URL is available and specified in the VRL (e.g., c3.r1 parameter described above in a VRL format that includes query parameters), the CDC responds with a redirection to the primary/default URL.

Invalid VRL version: the VRL version indicated in the VRL cannot be parsed or its value is outside the range of supported versions. An HTTP Status Code of 400 (indicating a bad request) is returned, with a first JSON error code (e.g., "CVRL0001").

Invalid VRL hostname: the VRL hostname cannot be parsed or its syntax is invalid. An HTTP status code of 400 (indicating a bad request) is returned, with a second JSON error code (e.g., "CVRL0002"). In some embodiments, the request is failed. In some embodiments, the CDC responds with an HTTP status code of 404 (indicating a resource is not found) and the request is failed.

VRL query-parameters cannot be parsed: A required query parameter is not available in the VRL, the syntax is invalid, or extraction of parameters embedded in the VRL failed. An HTTP status code of 400 is returned, with a third JSON error code (e.g., "CVRL0003").

Unsupported Parameters: In some embodiments, for a particular customer (e.g., of the CDC operator), only a subset of configurations are supported by the CDC. For example, the CDC may only support manifest type responses, and thus a corresponding parameter indicating a policy list response type would be unsupported. Supported configurations/parameters can be specified in a policy engine of a CDC. In some embodiments, the CDC responds with an HTTP Status Code of 400.

Required resources are not available in the VRL and resources are not configured in the policy engine of a CDC: The CDC cannot generate a valid CDN URL for the asset. An HTTP status code of 400 is returned, with a fourth JSON error code (e.g., "CVRL0004").

Required resources are not available in the VRL and CDN URL paths are different: The CDC cannot generate a valid CDN URL for the asset. An HTTP status code of 400 is returned, with a fifth JSON error code (e.g., "CVRL0005").

Hostname lookup fails: The VRL does not include CDC query parameters and the Hostname CNAME lookup does not result in a VRL encoded-hostname. An HTTP status code of 400 is returned, with another JSON error code (e.g., "CVRLP0008").

No resources are configured in the policy engine of the CDC: This error scenario may occur if no resources are configured for a customer on a CDC (e.g., no aliases or URLs for resources are configured in a policy engine of the CDC). If a primary/default CDN resource is available in the VRL (e.g., c3.r1 parameter described above), the CDC responds with an HTTP 302 to that URL and also sends a JSON message with an error code. The CDN selection may not be optimal in this scenario. An extension HTTP header may be provided that includes a warning message as described above. In some embodiments, if no resources (e.g., primary/default) are available, then content source selection is not performed.

Required resources do not match those configured in the policy engine of the CDC: Multiple CDN resources are listed in the VRL (e.g., both c3.r1 and c3.r2 parameters described above), but the sources indicated by the CMS as storing the requested asset do not match any of the resources configured in the policy engine (i.e., no corresponding resource/CDN found in CDC). In this scenario, the response by the CDC is a redirection of the client to the primary/default URL listed in the VRL. An extension HTTP header may be provided that includes a warning message.

Missing IP address parameter when in proxy integration mode: In some embodiments, the IP address of a requesting client device is required for both policy enforcement and CDN selection. In this scenario, if the IP address is missing and no matching policy is found, the missing IP address is a valid warning/error situation, and a redirection to the primary/default URL listed in the VRL is provided. An extension HTTP header may be provided that includes a warning message.

Cannot fetch a master manifest file: The CDC redirects to the primary/default CDN URL even if it cannot be fetched. In some embodiments, this is a best-effort attempt to allow the client device to request the master manifest directly from the CDN as a re-try from its location (e.g., a different device/geography). An extension HTTP header may be provided that includes a warning message.

Server Processing Error: A server side error occurred. In some embodiments, an HTTP 500 status code (indicating an internal server error) is returned along with a JSON error code (e.g., "CVRL5000").

Priority List Response Type

As described above, in the proxy integration mode, in which a proxy such as a CMS communicates with the CDC on behalf of a requesting client, the CDC is configured to respond with a priority list of CDN resources ranked, for example, based on a quality assessment (e.g., evaluation of quality). The message sent from the CMS to the CDC can be a private message protocol used to send information, such as client attributes, to the CDC. In the following example, the message protocol used is the VRL protocol. In some embodiments, a priority list response type can be used in the direct mode of integration.

In some embodiments in either a success or error scenario for the priority list response type, the CDC is configured to respond with a JSON-formatted response. The CMS is in turn configured to receive and process the JSON-formatted response from the CDC (i.e., as part of integration of the CDC with the CMS). A list of example fields/keys in the JSON formatted response is provided below.

"is_error" key: if the associated value is true, 'error_code' and 'error_message' (see below) may also be present. If false, the resource list may be present "error_code" key: An error code that maps to a specific problem.

"error_message" key: A description of the error.

"warning_message" key: A warning message that may be generated along with an otherwise successful response (e.g., the CDC falls back to a default CDN).

"resource_list" key: Ranked list of CDN resources. In some embodiments, the first resource in the list is expected to provide the highest asset quality for the requesting session. In some embodiments, the resource list is sorted in an order determined by a ranking filed priority. In some embodiments, the resource list includes resources aliases or URLs for selected CDNS (as configured on the CDC policy configuration backend). The resource list also includes priorities of the CDNs (where the CMS is expected/configured, for example, to point the client to the top priority CDN from the list and fail back to lower priority CDNs only when the higher priority backends are unavailable). In some embodiments, the resource list also includes the names of selected CDNs (e.g., from a CDC published list of CDN canonical names).

"bitrate list" key: An (optional) list of selected bitrates or a list of ranges of bitrates. In some embodiments, the first bitrate in the list is expected/determined to be the most optimal starting bitrate. Other included bitrates are candidates available for selection/switching during the lifetime of the video session. In some embodiments, this may be used to restrict to a subset of bitrates available for a particular device type.

"vrl" key: The VRL request that generated the response. Repeating the VRL in the response allows for debugging in the event of an error.

"priority" key: priority of the specified resource. In some embodiments, the proxy (e.g., CMS) is configured to point a content player to the top priority resource from the list. The CMS may fail back to a lower priority resource when the higher priority resources are not available.

"cdn" key: name of the selected CDN from the CDC's published list of CDN canonical names (e.g., "Akamai", "Level3", "Limelight", etc.).

In some embodiments, a sorted list of bitrates is also provided in the JSON formatted response.

Successful Priority List Response

In the event of a successful response in the priority list mode (i.e., proxy mode), the CDC is configured to respond with an ordered list of resources. The list can include the selected resource, the CDN name, and the priority of the resource. In some embodiments, the highest priority resource is the recommended selection. An example of a successful response is provided below:

{
  "is_error": false,
  "warning_message": "OptionalWarningMessageForDebugging",
  "resource_list": [
    {"resource": http://a1.cp123.cdn1.net/60449/live, "cdn": "CDN1", "priority": 2},
    {"priority": 1, "resource": http://bb123.cdn2.net/vod, "cdn": "CDN2"}
  ],
  "bitrate_list": [800, 500, 1200, 2400, 3200],
  "vrl": "TheRequestVRLThatGeneratedThisResponse"
}

In the example JSON formatted response above, a resource priority list including two resources is shown. For each resource in the list, the CDN name (any aliases/URL), type, and priority of the resource is specified. Also specified in the above example is an identifier for the VRL request that generated this JSON response.

Error Response

In the event that an error occurs while processing a VRL request, in some embodiments, an appropriate HTTP Status code is returned by the CDC with a message body that contains a JSON-formatted message string that describes the error scenario. An example error response is shown below:

{
  "is_error": true,
  "error_code: "ErrorCode",
  "error_message": "ErrorMessageString
  "vrl": "TheRequestVRLThatGeneratedThisResponse"
}

The following is a list of potential error scenarios or warning conditions for the priority list response type. Each scenario is associated with a corresponding HTTP Status code and JSON Error Code. The same HTTP status code may be returned for more than one scenario, while the JSON error code may be unique for each scenario. In some scenarios, no JSON text (error code) is returned.

Invalid Customer ID: an HTTP Status Code of 403 (indicating a forbidden request) is returned. No JSON text is returned. In some embodiments, if a primary/default URL is available and specified in the VRL (e.g., c3.r1 parameter described above in a VRL format that includes query parameters), the CDC responds with a redirection to the primary/default URL.

Invalid VRL version: the VRL version indicated in the VRL cannot be parsed or its value is outside the range of supported versions. An HTTP Status Code of 400 (indicating a bad request) is returned, with a first JSON error code (e.g., "CVRL0001").

Invalid VRL hostname: the VRL hostname cannot be parsed or its syntax is invalid. An HTTP status code of 400 (indicating a bad request) is returned, with a second JSON error code (e.g., "CVRL0002"). In some embodiments, the request is failed. In some embodiments, the CDC responds with an HTTP status code of 404 (indicating a resource is not found) and the request is failed.

VRL query-parameters cannot be parsed successfully: A required query parameter is not available in the VRL, the syntax is invalid, or extraction of parameters embedded in the VRL failed. An HTTP status code of 400 is returned, with a third JSON error code (e.g., "CVRL0003").

Unsupported Parameters: In some embodiments, for a particular customer (e.g., entity utilizing CDC services), only a subset of configurations are supported by the CDC. For example, the CDC may only support manifest type responses, and thus a corresponding parameter indicating a policy list response type would be unsupported. Supported configurations/parameters can be specified in a policy engine of a CDC. In some embodiments, the CDC responds with an HTTP Status Code of 400.

Required resources are not available in the VRL and resources are not configured in the policy engine of a CDC: The CDC cannot generate a valid CDN URL for the asset. An HTTP status code of 400 is returned, with a fourth JSON error code (e.g., "CVRL0004").

Required resources are not available in the VRL and CDN URL paths are different: The CDC cannot generate a valid CDN URL for the asset. An HTTP status code of 400 is returned, with a fifth JSON error code (e.g., "CVRL0005").

No resources configured in the CDC policy engine: This error scenario may occur if no resources are configured for a customer (e.g., no resources matching those included in the VRL are configured in a policy engine of the CDC—resources can be identified using aliases/URLs). If a primary/default resource is specified in the VRL (e.g., c3.r1 parameter described above), in some embodiments, the CDC will respond with the primary/default resource as the first and only element in the returned resource priority list. The primary/default CDN may not be the optimal CDN. An extension HTTP header as described above may be provided that includes a warning message. In some embodiments, if no resources (e.g., primary/default) are available, then content source selection is not performed.

Required resources do not match those in the policy engine of the CDC: Multiple CDN resources are listed in the VRL (e.g., both c3.r1 and c3.r2 parameters described above are specified), but the sources indicated by the CMS as storing the requested asset do not match any of the resources configured in the policy engine (i.e., no corresponding resource/CDN found in CDC). In this scenario, the CDC responds with the primary/default CDN resource (e.g., c3.r1) or the highest priority resources as the lone element in a resource list. If there is a subset of matches, only those resources are considered for the selection (e.g., invalid resources are ignored). An extension HTTP header may be provided that includes a warning message.

Missing IP address parameter when in proxy integration mode: IP address is required for both policy enforcement and CDN selection. In this scenario, if the IP address is missing and no matching policy is found, an error message is sent. In some embodiments, even if the IP address is missing, the request may still be accepted and a source assignment decision is made without the IP address or its derived geolocation attributes.

Server Processing Error: A server side error occurred. In some embodiments, an HTTP 500 status code (indicating an internal service error) is returned along with a JSON error code (e.g., "CVRL5000").

Additional Details Regarding Encoded-Hostname VRL

As described above, the encoded-hostname VRL can be used when the asset URL cannot be easily replaced with a VRL. For example, if a CMS is only capable of changing the hostname of an existing asset URL (e.g., via DNS) and unable to include query parameters, the encoded-hostname VRL format can be used to encode the minimal required information in the hostname. An example is provided below.

http[s]://encoded-hostname.m.cdc.com/original-path

Where the "encoded-hostname" has the following example format:

[version] [response-type] [video-protocol] [integration-mode] [url-mode]-[customer-key] [-] [custom-string]

The parameters of the "encoded-hostname" portion of this VRL format are provided below.

"version": the protocol version of the VRL. Example values include "v1," "v2," etc.

"response-type": the response type (e.g., manifest response type, priority list response type, etc.). If a value indicative of the manifest response type is specified, the manifest file from the selected CDN is returned. If a priority list response type is specified, a ranked list of video startup parameters is returned, as described above. In some embodiments, if a content protocol (e.g., video protocol) does not use manifest files (e.g., for progressive download), the manifest file response type can still be specified in the case that the requesting device directly communicates with the CDC. The CDC should be configured to use HTTP redirection instead of a manifest rewrite (e.g., rewrite of a manifest file with selected CDN and/or bitrates). Example values for the response-type parameter include "m" for manifest response type and "p" for priority list response type.

"video-protocol": the data-plane video protocol (for video content). Values corresponding to different protocol types can be specified (e.g., "p" for progressive download, "1" for Apple HLS, "s" for MS Smooth Streaming, "d" for Adobe HDS, "m" for MPEG DASH, "w" WMS, "o" for other, etc.).

"integration-mode": A Boolean value can be specified that indicates whether the VRL is sent directly from a device (e.g., direct mode) or through a proxy server (e.g., CMS or headend system in proxy mode). Example values for the integration-mode parameter include "p" for proxy mode integration and "d" for direct mode integration.

"url-mode": URL mode. For encoded hostname VRL, in some embodiments, the URL paths on the CDNs must be identical; thus, the only supported value is one that indicates "identical." Example values for the url-mode parameter include "i" for identical.

"custom-string": an optional custom (customer-specific) string limited to 12 bytes that can be used to define CDC polices. In some embodiments, the value specified for the parameter is transformed into a predefined internal tag for policies.

"customer-key": a customer key that is, for example, a 40-character (or 40 bytes) alphanumeric account identifier assigned to a content owner (or CMS operator).

The following are three example of valid 'encoded-hostname' portions of encoded-hostname format VRLs"

v2mpdi-a123456789b123456789c123456789d123456789 (1)
v2mldi-a123456789b123456789c123456789d123456789-twelveOrLess (2)
v2mldi-a123456789b123456789c123456789d123456789-stb (3)

QVRL and HVRL Examples

In the following VRL examples, the prefix "c3" is used to denote query parameters. As described above, in some embodiments, a prefix is used to avoid collisions with potentially conflicting parameters/characters in an asset/CDN URL from which the VRL is derived.

FIG. 14 illustrates an example of a Virtual Resource Locator. In this example, a non-secure VRL for smooth streaming protocol in direct mode with manifest response type is shown. In this example, asset paths on different CDNs are identical/common. In this example, the existing video path to asset is preserved along with a portion of the pre-existing query parameters (e.g., foo 1402 and bar 1404). In this example, a custom query parameter 'c3.ext.serviceType=premium' (1406) is also passed in to enable traffic segmentation.

FIG. 15 illustrates an example of a Virtual Resource Locator. In this example, a secure VRL for HLS protocol in direct mode with manifest response type is shown. In the example shown, asset paths differ between CDNs. The paths on the CDNs are in two URL-encoded CDN URLs 1502 and 1504. In this example, required query-parameters c3.os (1506), c3.r1 (1508), and c3.r2 (1510) appear along with optional parameters. If the two CDN URLs, the first (1502) is the default URL. The CDC falls back to this URL in case of processing errors.

FIG. 16 illustrates an example of a Virtual Resource Locator. In this example, a secure VRL for the smooth streaming protocol in proxy mode with priority list response is shown. In this example, asset paths on different CDNs are identical. The public IP address of the end-users' video player is provided (1602).

Figure 17:
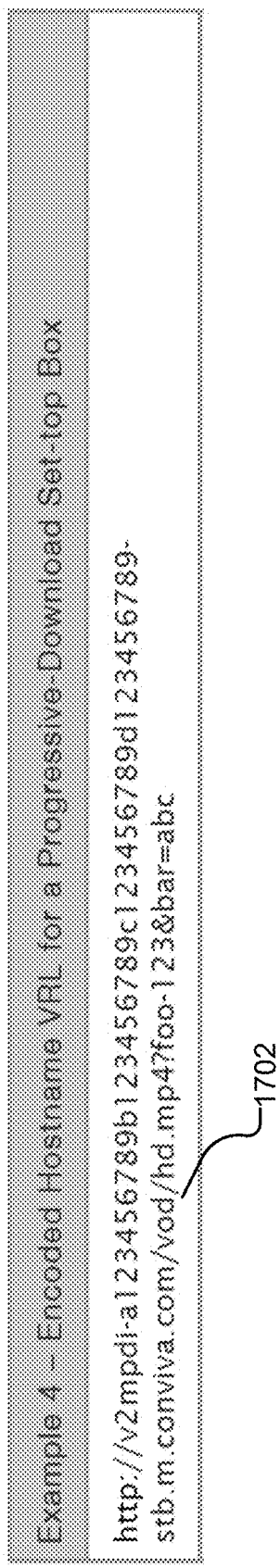
FIG. 17 illustrates an example of a Virtual Resource Locator.

FIG. 17 illustrates an example of a Virtual Resource Locator. In this example, a non-secure encoded hostname VRL in direct integration mode with manifest response type for progressive download, and optional custom string stb' (indicating that the requesting client device is a set-top box) is shown. In this example, asset paths must be identical between CDNs as shown below (e.g., where "vod/hd.mp4" is the common/identical asset path on both CDNs as shown at 1702):

http://custA.fplive.net/vod/hd.mp4 (1)
http://custA.11nwd.net/vod/hd.mp4 (2)

In addition, the resources should be configured in the policy engine of the CDC, for example, in the following manner:

Resource: http://custA.fplive.net/vod/hd.mp4 CDN: Level3 Name: L3
Resource: http://custA.11nwd.net/vod/hd.mp4 CDN: Limelight Name: LL
Resource Override Mode: Enabled
Gateway Action: HTTP REDIRECT Second Example VRL Protocol Version/Implementation:

As described above, the use of VRLs allows for the use of client attributes and capabilities in addition to CDC-side parameters to aid in decision making for the selection of the optimal one or more CDNs and/or one or more optimal bitrates for requested content.

In some embodiments, the VRL specifies how an asset should be played based on the recommendation of a CDC (e.g., by selecting an optimal CDN and/or bitrate). Described below is a second example VRL protocol version/implementation, which includes two example VRL formats, use of which can depend on factors such as the integration mode of a CDC with a CMS/OVP (e.g., direct mode or proxy mode).

VRL Format:

The first example format of this version of the VRL protocol is referred to herein as a "HostOnly" VRL. In this example, the HostOnly VRL involves changing the hostname of the CDN URL. An example of the HostOnly VRL format is shown below:

http[s]://<t><r><i><p><v>-<customerid>.m.cdc.com/<cdn-path-to-asset>

The second example format of this version of the VRL protocol is referred to herein as a "Full" VRL. In this example, the Full VRL is used in scenarios where the CMS is configured to modify not only the hostname of an existing CDN URL, but also add query parameters to the URL. In some embodiments, the Full VRL supports advanced features such as client authentication, CDN token authentication, analytics on assets, and policy control based on custom parameters. An example of the Full VRL format is shown below:

http[s]://<t><r><i><p><v>-<customerid>.m.cdc.com/a.<extn>[/Manifest]?<required-and-optional-query-parameters>

As shown in the example formats above, while the hostname portion (described in more detail below) of both HostOnly and Full VRLs is identical in both formats, the Full VRL includes the presence of an asset with extension and query parameters.

Hostname and Path Parameters for HostOnly and Full VRLs

The following is a list of example hostnames and path parameters for HostOnly and Full VRLs. The examples shown below include required/optional hostname and path parameters that may be applicable to one or both of HostOnly and Full VRLs. They keys listed below correspond to the keys shown in the example HostOnly and Full VRL format examples provided above.

"VRL Type": key: <t>. A parameter for specifying/indicating whether the VRL is of type "HostOnly" or "Full." In some embodiments, this is a required parameter that is applicable to both HostOnly and Full VRLs. Example values for the key "<t>" include "h" for indicating a HostOnly VRL, and "f" for indicating a Full VRL.

"Response Action": key: <r>. A parameter for specifying/indicating whether the CDC will redirect a client to the selected CDN's URL, will fetch and rewrite manifest files (to be returned to the client), for example in direct mode, or return a ranked priority list of initial CDNs and/or bitrates (e.g., in proxy mode). In some embodiments, this is a required parameter that is applicable to both HostOnly and Full VRLs. Example values for the key "<r>" include "d" for indicating redirect response, "w" for indicating rewrite response, and "p" for indicating priority list response."

"Integration Mode": key <i>: A parameter for specifying/indicating how a requesting client is requesting an asset, for example, via a CMS acting as a proxy (e.g., proxy mode), or directly from a CDC (e.g., direct mode). In some embodiments, this is a required parameter that is applicable to both HostOnly and Full VRLs. Example values for the key "<i>" include "p" for indicating proxy mode and "d" for indicating direct mode.

"Streaming Protocol": key: <p>. A parameter for specifying/indicating a data-plane protocol for delivering an asset (e.g., data-plane video streaming protocol). In some embodiments, this is a required parameter applicable to both HostOnly and Full VRLs. Example values for the key "<p>" include "p" for indicating progressive download, "i" for indicating Apple® HLS, "s" for indicating Microsoft® smooth streaming, "d" for indicating Adobe® HDS, "m" for indicating "MPEG DASH," "w" for indicating WMS, and "o" for indicating other streaming protocols without corresponding identifiers.

"VRL Protocol Version": key <v>. A parameter for specifying/indicating the protocol version of the VRL being used to request an asset. In some embodiments, this is a required parameter applicable to both HostOnly and Full VRLs. Example values for the key "<v>" include alphanumeric values for indicating the protocol version (e.g., "1").

"Customer ID": key:<customerid>. A parameter for specifying/indicating a customer (of the services of a CDC). In some embodiments, this is a required parameter applicable to both HostOnly and Full VRLs. In some embodiments, the value is a customer specific identifier string assigned by the CDC operator for each customer account. In some embodiments, the value for the customer id has a maximum length (e.g., 40 characters).

"CDN Path to Asset": key <cdn-path-to-asset>. A parameter for specifying/indicating the full path to an asset on the indicated CDN, including any querying parameters. In some embodiments, this is a required parameter applicable to HostOnly VRLs (as shown in the example HostOnly format above). In some embodiments, if query parameters are included in the path, the included query parameters will be preserved. In some embodiments, the cdn path to the asset assumes that the paths of assets are identical across all CDNs (known to the CDC). In some embodiments, if the original CDN URL from which the HostOnly VRL is generated includes any CDN authentication parameters, in some embodiments, CND tokens are generating using the CND hostname first, then replaced with the CDC VRL hostname while preserving the remaining portion of the "<cdn-path-to-asset>," including the token parameters. In some embodiments, CDN hostname resources configured on the CDC are identical to those used in generating the authentication tokens (otherwise the CDC generated CDN URL will be rejected by the CDN).

"File Extension": key <extn>. A parameter for specifying/indicating a file extension for an asset. In some embodiments, this is a required parameter applicable to Full VRLs. In some embodiments, for particular streaming protocols, it is required for the URL ultimately handed to a content player to have a specific file extension (e.g., ".m3u8" for Apple® HLS). In some embodiments, the CDC is configured to honor any other file extension as long as the content player is configured to play the received URL. Example values for the <extn> key include "mp4" for progressive download, "m3u8" for Apple® HLS, "f4m" for Adobe® HDS, and "ism" for Microsoft® smooth streaming.

Key: "[/Manifest]". A parameter for specifying/indicating an extra directory. In some embodiments, this is an optional parameter applicable to the Full VRL format, and is used for specific streaming protocols (e.g., Microsoft® smooth streaming protocol, where the key <p> described above has a corresponding value of "s").

Query Parameters for Full VRLs

As described above, Full VRLs, in contrast to HostOnly VRLs, are configured to include query parameters. In some embodiments, the values of the query parameters should be URL Safe or properly URL encoded. A list of example query parameters/keys for Full VRLs is described below, including both optional and required parameters. In some embodiments, required parameters that will be described below such as original primary CDN URL, original secondary CDN URL, etc. are required (e.g., by a CDC) to be passed for successful service delivery. In some embodiments, some optional parameters, such as asset name, device type, or custom parameters should be provided for enabling advanced features such as content analytics, device breakdowns, custom policies, etc. In some embodiments, the parameters/keys described below are included in the "<required-and-optional-query-parameters>" portion of the Full VRL format example shown above, following the "?".

"CDN Path to Asset": Key: "cp". A parameter for specifying a URL encoded existing CDN Path to asset that does not include the hostname, but includes any query parameters (of the existing CDN URL/path). In some embodiments, this is equivalent to the HostOnly VRL's "cdn-path-to-asset" field, and also assumes that the paths of assets are identical across all CDNs. In some embodiments, specification of the "cp" parameter is mutually exclusive with the specification of the "r1," "r2," etc. parameters described below, which are used for specifying the aliases to a CDN or the valid and complete URL for CDN resources. In some embodiments, if any CDN authentication parameters are included, the CMS is required to share CDN tokenization information (e.g., scheme type, parameters, shared secrets, etc.) with the CDC, as the CDC will replace the hostname to construct the final CDN URL. In some embodiments, the "cp" parameter is a required parameter. In some embodiments, the customer-specific value for this parameter is specified for when the response action specified in the VRL (e.g., using the <v> response type parameter/key described above) is HTTP redirect of manifest rewrite, and is not specified when the response action is the return of a priority list.

"Primary CDN Resource": Key: "r1". A parameter for specifying a primary CDN resource. In some embodiments, this key is utilized for redirect, manifest rewrite response, and priority response actions.

In the case where redirect or manifest rewrite response actions are specified, in some embodiments, the value specified for this key is a valid and complete CDN URL pointing to the primary default CDN, including hostname and any existing query parameters for the CDN (e.g., CDN authentication parameters). In some embodiments, the value for this parameter should be fully URL encoded (e.g., "%"-encoded), so as to stay disambiguated from the VRL's query parameters. In some embodiments, the resource without the asset-specific portion of the URL should match to the corresponding resource configured on the CDC policy engine. In some embodiments, the "r1" parameter/key is a required parameter. In some embodiments, there may be a maximum supported for the value specified for the parameter (e.g., 512 characters). In some embodiments, this parameter is mutually exclusive with the "cp" parameter described above, and may be used when the CDN paths of assets are different on one or more CDNs storing the requested asset. An example of an "r1" value is http://cp1234.akamai.net/ondemand/12378/myvideo.m3u8.

In some embodiments, in the case of a priority list response action being specified, the alias to a CDN or the valid and complete URL for a CDN resource is specified for the parameter. If a URL is specified, then the URL should be URL safe. In some embodiments, the resource with the asset-specific portion of the URL should be identical to the corresponding resource configured on the CDC policy engine. For example, "r1"=AKAMAI (alias) or "r1"="http://cp1234.akamai.net/ondemand/12378/myvideo.m3u8" (URL). In some embodiments, there may be a maximum supported for the value specified for the parameter (e.g., 512 characters).

"Other CDN Resource URLs": key "r2=, r3=, r<n>=, . . . ". One or more parameters for specifying other CDN resource URLs (in addition to r1 primary/default CDN).

In the scenario in which redirect or manifest rewrite response actions are requested/specified (e.g., using <r" response type parameter described above), in some embodiments, the values for the parameters include valid and complete CDN URLs pointing to other, non-primary/default CDNs, including hostname and any existing query parameters of the CDN URLs (e.g., CDN authentication parameters). In some embodiments, the URLs should be fully URL-encoded (e.g., %-encoded), so as to stay disambiguated from the query parameters of the VRL. In some embodiments, the resource without the asset-specific portion of the URL should match to the corresponding resource configured on the CDC policy engine. In some embodiments, "r2" is required to be sent in addition to "r1" in order to allow the CDN to be able to select between more than one CDN resource.

In the scenario in which a priority list response action is to be taken, the alias to a CDN or the valid and complete URL for a CDN resource is specified for the parameter. If a URL is specified, then the URL should be URL safe. In some embodiments, the resource with the asset-specific portion of the URL should be identical to the corresponding resource configured on the CDC policy engine. In some embodiments, "r2" is required to be sent in addition to "r1" in order to allow the CDN to be able to select between more than one CDN resource. An example of a value for the r<n> parameter is r<n>=LEVEL3 (alias) or r<n>=http://bb1234-vod.hds.adaptive.level3.net.

"Available bitrates": key "b1=, b2=, . . . , b<n>=, . . . ". Parameters for specifying available bitrates (in which an requested asset is encoded, e.g., in Kbps). In some embodiments, these parameters are a candidate list of bitrates available for the requested asset. In some embodiments, if provided, "b1" (first bitrate listed in the list) should include the default starting bitrate. In some embodiments further bitrates (e.g., "b2" . . . "b<n>") are optional.

"IP address": key "ip". A parameter for specifying the ip address of a client device. An example value is a dotted decimal IPv4 (or v6) address of devices that do not talk directly to the CDC, but via a proxy (e.g., in proxy mode) such as a CMS/OVP that serves as a proxy server between the client and the CDC. In some embodiments, this parameter is required for proxy mode, but optional for direct mode.

"Asset Name": key "an". An optional parameter, for specifying a URL encoded asset name. This can include a description of the requested asset (e.g., a title). In some embodiments, if this parameter is specified, the value for the parameter can be used to enable advanced audience and analysis and used to drive editorial decisions. For example, most popular content can be kept on the front page of a CMS portal (that a client first accesses for selecting content) to drive increased traffic and minutes-viewed. In some embodiments, the parameter value is associated with a maximum length (e.g., 127 bytes).

"Device type": key "dt". An optional parameter for specifying the device type of the requesting client. Example values include strings for specifying whether the device type is a settop device (e.g., streaming device, such as cable settop box, Roku®, Apple® TV, etc.), a TV (e.g., Internet connected smart TV used to watch online video via a browser or dedicated application), a mobile device (e.g., smartphone or feature phone used to view content either through a browser or a dedicated application), a console device (e.g., consoles such as Xbox®, Wii®, PS4®, etc.), a tablet (e.g., tablet device such as Apple® iPad, Amazon® Kindle Fire, etc.), a PC (e.g., desktop computer or laptop), a bluray/disc player (e.g., devices that can be used as both a disc player and a settop box), or any other appropriate device (a string value may be specified for unspecified types of devices).

"Device Brand": key: "db". An optional string parameter for specifying the name of the brand of the requesting client device. For example, "Microsoft®," "Apple®," "Samsung®," etc. In some embodiments, presence of this parameter allows a CDC to determine popular devices. In some embodiments, the parameter value is associated with a maximum length (e.g., 64 bytes).

"Device Model": key: "dm". An optional string parameter for specifying a device model. Presence of this parameter can be used by a CDC to determine an optimized bitrate selection. For example, if a device has a display resolution of 720p, a high bitrate stream for 1080p resolution is not selected by the CDC. In some embodiments, the parameter value is associated with a maximum length (e.g., 64 bytes).

"Device version": key: "dv". An optional string parameter for specifying the firmware version of the requesting device. In some embodiments, the parameter value is associated with a maximum length (e.g., 64 bytes).

"Last Mile Connection": key: "dc". An optional parameter for specifying the last mile connection of a device. If specified, this parameter can be used in making operation decisions regarding the number of bitrates per video asset, optimizing delivery and storage costs, etc. Example values include "ETH," "DSL," "WiFi," "3G," "4G," "LTE," etc.

"Device identifier": key: "di". An optional parameter for specifying a unique identifier for the requesting client device (e.g., UDID for iOS devices). Values for this parameter can be aggregated across all sessions for particular viewers, allowing an understanding of viewing patterns on specific devices.

"Viewer ID": key "vi". An optional parameter/string for uniquely identifying a subscriber/viewer. In some embodiments, the value for this parameter is an obfuscated value of a service subscriber id (e.g., id of user of a movie service). In some embodiments, the parameter value is associated with a maximum length (e.g., 127 bytes).

"Asset Type": key: "at". An optional string parameter for specifying the type of the requested content. Values include "ON_DEMAND," "LIVE_EVENT," "LINEAR_LIVE," "EVENT_REPLAY," "DOWNLOAD," "OTHER."

"Operating System": key "os". An optional parameter for specifying the operating system of a device used to play the requested content (e.g., Linux, Windows, etc.). In some embodiments, the parameter value is associated with a maximum length (e.g., 64 bytes).

"OS version": key: "ov". An optional parameter for specifying (e.g., via a string value) the (full) version number of the requesting device's operating system." In some embodiments, the parameter value is associated with a maximum length (e.g., 64 bytes).

"Client ID": key "ci". An optional parameter for specifying (e.g., via four, 4 byte integers) a client-specific ID generated by the CDC, if the client device is configured, for example, with a monitoring module that communicates directly with the CDC.

"Session ID": key "si". An optional parameter for specifying (e.g., via a 4-byte integer) a session-specific that is generated by the CDC, if the client device is configured, for example, with a monitoring module that communicates directly with the CDC.

Key "cx.<key>=<value>": Optional parameters for specifying customer specific key-value pairs. Multiple key-values pairs can be supported. In some embodiments, any customer (e.g., CMS/OVS) specific metadata to be used by the CDC can be specified using these parameters. In some embodiments, customer-specific parameters are required to have a prefix (e.g., "cx" as in this example) to distinguish them from the query parameters of the VRL protocol. In some embodiments, the "key" and "value" of each pair are configured to include valid Unicode characters such that the total byte length does not exceed a maximum byte length e.g., 64 bytes). In the case of non-ASCII Unicode characters, more than 1 byte may be used for each character. For example, when specifying the customer specific key "serviceType," the following key-value pair can be specified, "cx.serviceType=AcmeType."

VRL Responses

In some embodiments, all CDN resources (e.g., aliases or URLs to be specified in VRL requests) are configured on the CDC (e.g., in a CDC policy engine) out-of-band, prior to enabling the service.

In some embodiments, upon making a decision regarding an optimal CDN and/or bitrate, the CDC takes an appropriate action based on the "response action" parameter described above ("<r>" parameter/key in HostOnly and Full VRL examples above). The actions taken include those described below.

Response Action=HTTP Redirect (d) or Manifest Rewrite (w)

If a HTTP redirect or manifest rewrite action is specified, the CDC first generates the URL of the asset on the selected CDN. In the case in which a HostOnly VRL request was sent, the CDC replaces the VRL hostname with the selected CDN's configured resource name (which can either be another hostname, or a hostname followed by a fixed PATH string). If a Full VRL request was sent, the CDN URL is obtained from the URL passed in through the corresponding query parameter "r1," "r<n>," or in the case that the "cp" parameter was passed, by appending the selected CDN's configured resource name and the path/query passed in via the "cp" parameter. In some embodiments, once the asset URL is constructed, the CDC redirects the client to the asset by either (1) generating a HTTP 302 to the URL (i.e., HTTP redirect) or (2) fetching the manifest file from the URL, re-writing fields of the manifest file (e.g., bitrate) and sending the updated file back to the client (i.e., manifest rewrite).

Response Action=Priority List (p)

If a priority list response action type is specified, the CDC sends an ordered list of CDNs and Bitrates back to the CMS (that is acting as a proxy between the client and the CDC). The following is an example format of a priority list response, including an ordered list of CDNs and Bitrates in a JSON response.

```
{
    "e": 0,
    "b1": [500, 300, 1200],
    "r1":
    [
        {
            "r":    http://a1.cp12345.akamai.net/60449/onde-
                mand,
            "c": "AKAMAI",
            "p": 2
        }
        "p": 1,
        "r": http://bb1234.fplive.net/vod,
        "c": LEVEL3
        }
    ]
}
```

In this example format, "e" indicates an error code from the CDC. An error code of "0" indicates that the request was processed successfully. In this example, "b1" indicates a sorted list of bitrates, where, in some embodiments, the first bitrate is the selected starting bitrate. In this example, "b" indicates the numerical bitrate (e.g., in Kbps). In some embodiments, the bitrate is an integer (e.g., 300, 3600, etc.), which will be a candidate bitrate (in a set of candidate bitrates) that is passed by the CDC (to a CMS). In this example, "r1" refers to a resource list with a sort order determined by a ranking filed priority. Within the resource list, "r" indicates a resource alias or URL for the selected, which can be configured by the policy configuration engine of a CDC. In this example, "p" indicates the priority of the CDN. As described above, in some embodiments, a CMS is expected to point a client to the top priority (e.g., "p"=1" CDN from the list and fail back to lower priority CDNs when higher priority content sources are unavailable. In this example, "c" indicates the name of the selected CDN, which may be returned from a CDC published list of CDN canonical names (e.g., "AKAMAI", "LEVEL3", "LIMELIGHT", etc.).

The following is an example format of an error response in the case of errors:

```
{
    "e": 1,
    "m": "Failed to find customer id"
}
```

In this example format, "e" indicates an error code from the CDC. In this example, "m" indicates an error message in the case of failure. In this example, the error message indicates that the CDC was unable to find a customer id in the VRL request Error Handling for Bad VRL Requests The following is a list of example error conditions and error responses if bad VRL requests are received by the CDC.

For both Full and HostOnly VRLs, if the hostname of a received VRL is not according to a specification (i.e. the VRL is not of the format "<t><r><i><p><v>-xyz.m.cdc-.com"), then the CDC responds, for example, with an HTTP 404 (not found) error response. Thus, if the VRL request cannot be properly parsed, then the request is failed. This allows the error to be made immediately visible (e.g., to CMS). As the request is immediately failed, other types of inappropriate/incompatible responses from the CDC will be prevented from being sent.

For HostOnly VRLs, if a customer ID is not found, the CDC is configured to return, for example, an HTTP 400 (bad request) error response.

For Full VRLs, if a customer ID is not found, then the CDC is configured to respond with either an HTTP 400 (bad request) or redirect. For example, if the "r1" parameter described above is specified, an HTTP redirect to the URL specified in "r1" can be returned as a response. Otherwise, the request is failed.

For both Full and HostOnly VRLs, if parameters in the VRL are unsupported, in some embodiments, the CDC is configured to provide an HTTP 400 (bad request) error response. In some embodiments, for particular customers of the CDC (or entities utilizing the services of the CDC) only a subset of the total supported configurations are supported.

For HostOnly VRL requests, if no resources are configured for the customer of the CDC (e.g., CMS/OVP operator, content owner, etc.) in the CDC policy engine, then, in some embodiments, an HTTP 400 (bad request) error response is provided by the CDC. As no resources are available, no selection can be done.

For Full VRL requests, if no resources are configured for the customer of the CDC (e.g., CMS/OVP operator, content owner, etc.), the CDC is configured, in some embodiments, to return either an HTTP 400 (bad request) error response, or a redirect to the URL specified in the "r1" parameter, if specified.

For Full VRL requests, if required parameters "cp" and (mutually exclusive) "r1," "r2," etc. are missing, the CDC is configured, in some embodiments, to return either an HTTP 400 (bad request) error responses, or a redirect to the URL specified in the "r1" parameter, if specified.

For Full VRLs, an error response is provided if both "cp" and "r1" and/or "r2" parameters are specified. In the event of this scenario, the "cp" parameter is ignored by the CDC.

For Full VRLs, if "r1" and "r2" are specified, but do not match any of the resources configured in the policy engine of the CDC, the CDC is configured to determine that there is an error. In some embodiments, an HTTP 302 (redirect) to the URL specified for the "r1" parameter is performed.

For Full VRLs, if proxy mode is specified, but the required "ip" (IP address) parameter is missing, a redirection to the URL specified in "r1" is performed. IF "cp" is specified, a redirect to the default resource of that customer (as specified in the CDC), with the path specified in the "cp" appended, is returned.

For both Full and HostOnly VRLs, if the CDC is unable to fetch any of the manifest files for manifest rewrite (E.g., due to network issue at CDC), then, in some embodiments, the CDC is configured to respond with an HTTP 302 (redirect). The customer is redirected to the selected resource's manifest file, causing the client, for example, to attempt a re-try for requesting the content.

For Full VRLs, if the resources specified in "r3" "r<n>" parameters do not match any resources configured in the CDC, in some embodiments, those invalid resources are ignored by the CDC.

For Full VRLs, if invalid device parameters (such as device brand, device model, device firmware version, device last mile connection, operating system, operating system version, etc.) are detected, in some embodiments, the CDC is configured to ignore the invalid parameters and does not use those parameters for resource selection.

For Full VRLs, if an invalid client id or invalid session id is detected, in some embodiments, those parameters are ignored by the CDC.

HostOnly and Full VRL Examples

Figure 18:
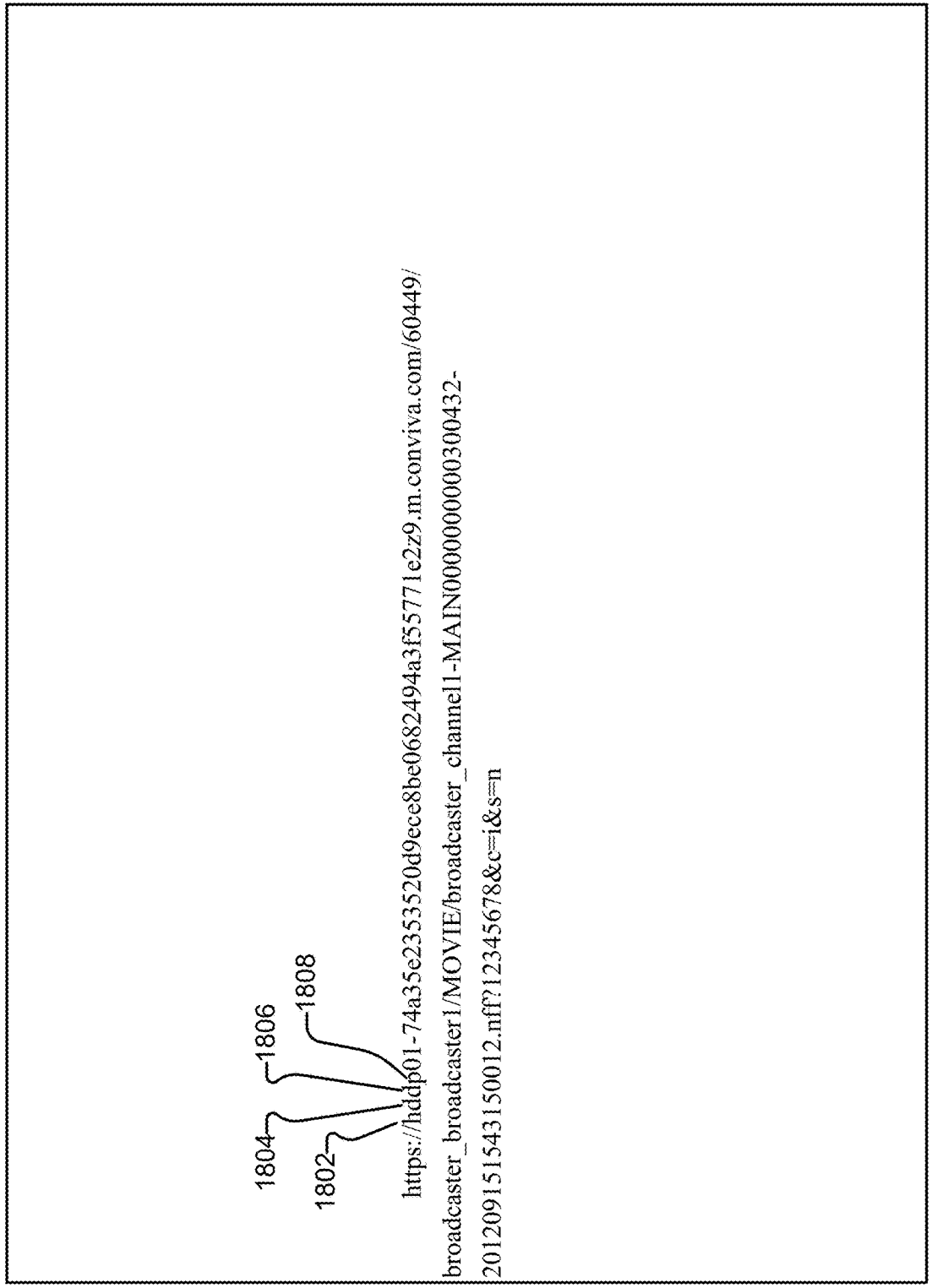
FIG. 18 illustrates an example of a Virtual Resource Locator.

FIG. 18 illustrates an example of a Virtual Resource Locator. In this example, a HostOnly (h) (1802) VRL is shown, requesting a redirect (d) (1804) to the best CDN, contacting the CDC directly (d) (1806) without a proxy, and using the progressive (p) (1808) download protocol. In this example, the path after the hostname is identical to the CDN URL.

Figure 19:
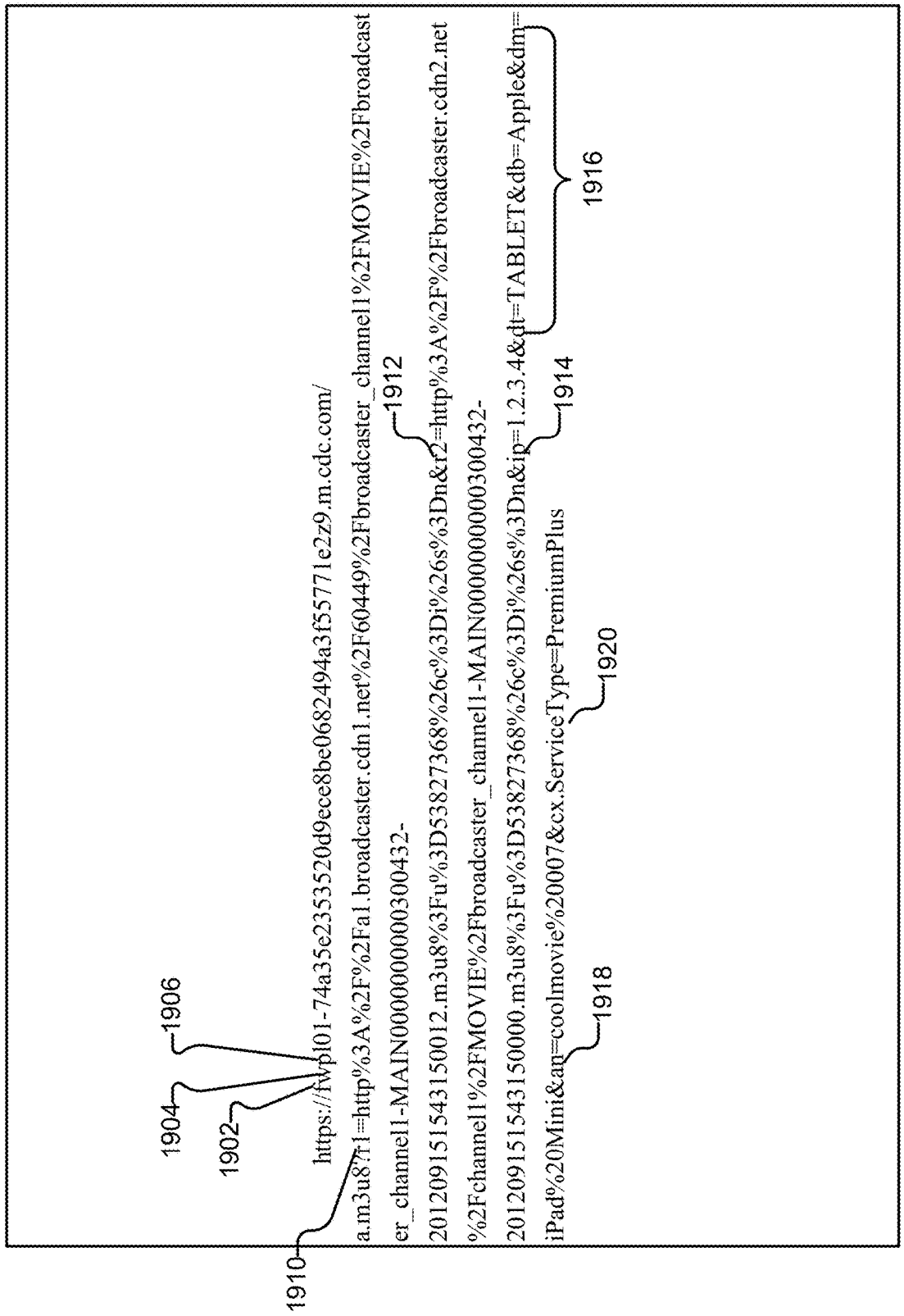
FIG. 19 illustrates an example of a Virtual Resource Locator.

FIG. 19 illustrates an example of a Virtual Resource Locator. In this example, a Full (f) (1902) VRL is shown, requesting a manifest rewrite (w) (1904), contacting the CDC through a CMS proxy (p) (1906), and using the Apple® HLS (1) (1908) protocol. The query parameter "r1" (1910) is a URL encoded version of the original URL on a first CDN, and "r2" (1912) is a URL encoded version of the original URL on a second CDN. The "ip" parameter (1914) is the IP address of the end device streaming the video, which is an Apple® iPad Mini tablet (1916) attempting to watch the asset "coolmovie" (1918) over the premiumplus service (1920).

Additional Detail Regarding Embodiments of the Content Distribution Coordinator

Web Portal

In some embodiments, a content distribution coordinator such as CDC 408 includes a portal by which entities, third parties, customers of the CDC, etc. can access information regarding content distribution. For example, information about the various clients embedded in VRL requests (e.g., encoded in query parameters) or collected via monitoring modules (described below) can be provided via an interface to be used by the entities. As one example, information collected from clients can be used to perform traffic segmentation, aid in performing advertising decisions (e.g., by determining popular device types, asset types, etc.), etc.

Policy Engine Configuration

In some embodiments, a content distribution coordinator such as CDC 408 includes a policy engine in which policies, such as multi-CDN polices, can be configured to determine how the CDC manages content sources such as CDNs. For example, multi-CDN policies can be configured to manage traffic across CDNs, provision new CDNs, remove existing ones from a content deliver ecosystem/environment, etc. Other example s of policies include the global policies described in conjunction with FIGS. 8 and 11. In addition, resources such as CDNs can be configured in the policy engine as well.

In some embodiments CDN resources (aliases or URLs) are also configured in the policy engine. For example, the resources when configured in the policy engine, are known to the CDC and can be monitored (e.g., to perform source assignment via network partitioning as described above). When a VRL request is received by the CDC, asset paths/URLs for resources included in the VRL request (i.e., resources indicated by the CMS as storing the requested asset) can be matched against the resources configured in the policy engine of the CDC. The CDC can then select an optimal CDN from the indicated resources by evaluating the matching resources the CDC is configured to monitor. For example, when requesting content, a client player communicates with a CMS/headed, where the CMS maintains a mapping of the resources/CDNs on which content assets (and various bitrate encodes) are stored. The VRL constructed by the CDN can then include the set of resources (URLs and/or asset paths of CDNs) on which a requested asset is stored. When the CDC receives the VRL, the set of resources provided by the CMS is matched with the resources published/configured on the CDC (i.e., that the CDC is aware of and maintains knowledge about a corresponding resource). Those resources can be evaluated (e.g., the streaming quality of clients connected to a particular CDN) to select an optimal CDN and/or bitrate to assign to the requesting client. An example configuration is described above in conjunction with FIG. 17.

As described above, depending on the integration mode (e.g., direct or proxy), the CDC may need to generate the full CDN URL (or content source URL) for a content asset using information passed in via a VRL request (or from a request using any other appropriate communication protocol). In some embodiments, a storage directory structure of a CDN is required to correspond to the set of CDN resources configured in the CDC. An example form of a configured resource in the policy engine of the CDC is the following:

http://fully.qualified.domain.name

The resource can also include a portion of the path, which may be needed when different resources exist on the same CDN. For example:

http://cust.cdn1.com/ondemand or
http://cust.cdn1.com/live

In some embodiments, the resource is required to be a prefix to the full asset URL that is passed in query parameters of the VRL generated by the CMS (e.g., in the c3.r1, c3.r2 parameters encoded in a VRL).

In some embodiments, the policy engine is also configured to store information associated with configurations of entities utilizing the services of the CDC (e.g., customers of the CDC). This can include configurations for the entity that are supported by the CDC. The configurations can specify, for example, the types of parameters supported by the CDC for a particular client (e.g., only manifest response type, HTTP redirect, etc. for a particular customer).

Receiving Status Information

Figure 20:
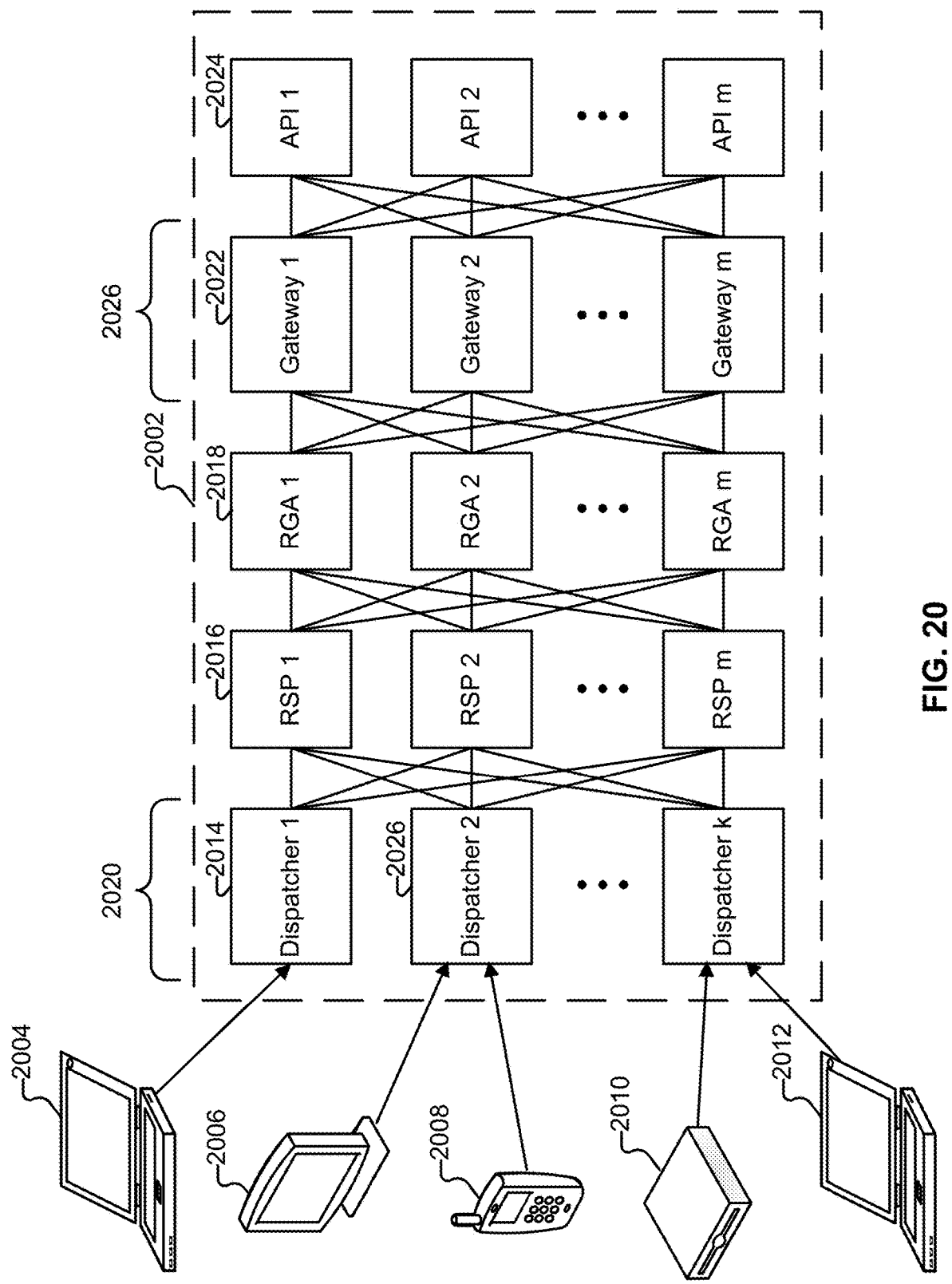
FIG. 20 is an illustration of an environment in which status information is received and processed.

FIG. 20 is an illustration of an environment in which status information is received and processed. In particular, clients included in the environment provide periodic status reports (also referred to as "heartbeats") containing telemetry data to a content distribution such as CDC 408. In various embodiments, the services provided by the content distribution coordinator are implemented across a scalable infrastructure, particularly in embodiments where telemetry data is received from many clients. In the example shown, the elements contained within dashed region 2002 collectively provide the functionality of content distribution coordinator 408. Each of the layers (e.g., dispatcher layer 2020) is horizontally scalable and their respective components can be implemented on standard commercially available server hardware (e.g., having a multi-core processor, 4G+ of RAM, and Gigabit network interface adaptors) running a typical server-class operating system (e.g., Linux).

Clients 2004-2012 each include a monitoring module that collects status information. As one example, performance information associated with video playback is collected, is other information about the client (e.g., information usable for partitioning as described above). Note that clients 2004-2012 can represent a subset of all clients included in an environment such as is shown in FIG. 1 or FIG. 4. That is, a client such as client 102 need not include a monitoring module. Instead, in some embodiments, data from those clients with monitoring modules is used to make predictions about other clients (e.g., client 102). For clients that do not include a monitoring module, a VRL, as described above, can be used to embed/encode information/attributes about the client for use in making predictions about optimal CDNs for the client. Thus, a CDC is able to indirectly receive information about client devices that do not have monitoring modules installed, in order to aid in making an optimal content source selection for the client device. In some embodiments, the information gathered from clients that do not include a monitoring module is limited in comparison to the information that can be gathered from clients that have installed monitoring modules. In some embodiments, monitoring modules are interoperable with VRLs (e.g., for gathering/client attribute information about clients).

When the monitoring module on a client is activated (e.g., because the client has started an instrumented video player), the client is mapped to a dispatcher server. As one example, when the monitoring module starts, it reads a configuration file that includes a list of dispatcher servers. The monitoring module selects a dispatcher server at random from the list.

A dispatcher server (2014) includes two conceptual modules. The first module implements a communication interface for receiving status information from clients. In some embodiments the module is implemented using an off-the-shelf web server, and allows clients to connect over the HTTP protocol (and also allows clients to securely communicate via SSL). Data received by the first module is passed to the second module. The second module normalizes the data (to a format suitable for further processing) and passes the normalized data to a real-time stream processing component (2016).

The real-time stream processing (RSP) layer includes an optimized software component that processes the telemetry data that it receives from the dispatcher in real-time. A dispatcher sends all heartbeats belonging to the same session to the same RSP component.

In some embodiments, the RSP component is implemented as a continuously running service that reads and processes the telemetry data received from dispatchers via the network over TCP. The telemetry data stream comprises individual records, each of which represents the telemetry data sent by the monitoring module. The RSP component reads network data one record at a time and parses the data into a local data representation. The data received by the RSP component can be stored as in-memory hash tables of records allowing fast execution, and very high throughputs. Since the RSP component does not require old information, it can periodically purge the in-memory hash tables and increase scalability accordingly. In other embodiments, optimized in-memory databases are used.

An example mapping function to map heartbeats having a session identifier "ID" to a particular RSP component "i" as follows:

i=hash(ID) mod m, where hash( ) is a hash function and "m" is the total number of RSP components.

Once an RSP component parses the data records, it performs two main tasks. First, it performs data filtering. A filter is a logical expression and is installed at each RSP component instance. As one example, the following filter would identify viewers located in San Francisco, connected to ISP SP1, streaming from CDN A, one of two particular shows:

(city="San Francisco" AND ISP="SP1" AND CDN="CDN A" AND ((show="NewsAt10") OR (show="SundayMagazine"))

For each message of incoming telemetry data, the (key, value) pairs in the record are matched against the filter. If the filter is matched, the data is associated with the filter.

The second task performed is to compute snapshots and on-line statistics over the telemetry data matching each filter. One example of a snapshot is the number of players that are in a particular state (e.g., "playing"). The RSP component generates sequences of these snapshots (e.g., one every second). Examples of statistics computed by the RSP component include: the average number of bytes played over all video streams matching a filter over a given time interval (e.g., 10 seconds) and the minimum frames per second experienced by a stream matching a filter over a time interval. Snapshots and statistics are updated continuously, from new telemetry data received from clients.

The RSP component provides its computed snapshots and statistics to a real-time global aggregation component (2018). The real-time global aggregation (RTGA) component aggregates the information provided by the RSP component for each filter.

As explained above, each RSP component (2016) receives (via a dispatcher) telemetry data from a subset of the monitoring modules and calculates snapshots and statistics for all filters. Each RGA component instance is in turn responsible for a subset of the filters. Based on the identifier of the filter, all RSP components send data for that filter to a single RGA component. The RGA component combines the data from all RSP components for the filters that it is responsible for, resulting in a global snapshot and statistics based on information from all monitoring modules. Examples of aggregation operations performed by an RGA component include: counting the total number of viewers that match a particular filter, determining the percentage of viewers matching a given filter that are in buffering state, the join time distribution experienced by viewers joining a given stream, the current number of viewers in a given city, the rank of the most popular live events, and so on.

In some embodiments an RGA component's functionality is implemented as a continuously running service. It reads records sent by the RSPs asynchronously, thus achieving a high throughput. The RGA component stores the records it receives in in-memory hash tables allowing optimized access for real-time processing. Old information is periodically purged from the hash tables to improve efficiency.

As shown in FIG. 20, gateway 2022 provides a web service API 2024 for accessing data. Through the API, RGAs data is available on a per-filter basis. In addition, it also exposes APIs to edit and install new filters and aggregation functions. In some embodiments gateway 2022 is implemented using an off-the shelf web server (such as Apache) with customized code to handle the various web service API calls. The handlers return data for a given web API call in various data formats including XML, JSON, SOAP, and HTML, as applicable. The handlers serve as middleware for querying and interactively controlling the RSPs and RGAs.

Gateway 2022 also provides access controls and persistently stores the information regarding the API requests, data access and presentation policies, and filter descriptions. The information is maintained in a persistent database, such as mySQL or Oracle database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a content management system, a request for content from a remote client;
in response to receiving the request for content from the remote client, generate a message comprising information associated with the remote client;
query a remote content distribution coordinator at least in part by transmitting, from the content management system to the remote content distribution coordinator, the generated message including the information associated with the remote client;
receive, from the remote content distribution coordinator, a plurality of content delivery networks on which the content requested by the remote client is stored, wherein the plurality of content delivery networks is determined, for the remote client, and by the remote content distribution coordinator, based at least in part on the information associated with the remote client included in the message; and
direct the remote client to a content delivery network in the plurality of content delivery networks received from the remote content distribution coordinator, wherein the content delivery network to which the remote client is directed is selected by the content management system; and
a memory coupled to the processor and configured to provide the processor with instructions.

2. The system recited in claim 1 wherein the information associated with the remote client included in the message comprises at least one of an Internet Protocol (IP) address, a user agent, a client type, and a display size.

3. The system recited in claim 1 wherein the message further comprises an indication of candidate content delivery networks on which the requested content is stored.

4. The system recited in claim 1 wherein generating the message comprises modifying an existing Uniform Resource Locator (URL) associated with the requested content.

5. The system recited in claim 4 wherein modifying the existing URL associated with the requested content comprises at least one of adding query parameters and changing a hostname.

6. The system recited in claim 1 wherein the processor is further configured to buffer the remote client's request while awaiting a response from the remote content distribution coordinator.

7. The system recited in claim 1 wherein the remote content distribution coordinator is configured to select the plurality of content delivery networks from a plurality of candidate content delivery networks.

8. The system recited in claim 7 wherein the remote content distribution coordinator is configured to select the plurality of content delivery networks from the plurality of candidate content delivery networks based at least in part on at least one of the information comprised in the message, playback quality experienced by other clients determined to be similar to the remote client requesting content, a global Internet Protocol (IP) address, bitrates at which the request content is encoded, and a set of policies.

9. The system recited in claim 1, wherein the plurality of content delivery networks received from the remote content distribution coordinator comprises a prioritized list of content delivery networks.

10. A method, comprising:
receiving, at a content management system, a request for content from a remote client;
in response to receiving the request for content from the remote client, generating a message comprising information associated with the remote client;
querying a remote content distribution coordinator at least in part by transmitting, from the content management system to the remote content distribution coordinator, the generated message including the information associated with the remote client;
receiving, from the remote content distribution coordinator, a plurality of content delivery networks on which the content requested by the remote client is stored, wherein the plurality of content delivery networks is determined, for the remote client, and by the remote content distribution coordinator, based at least in part on the information associated with the remote client included in the message; and
directing the remote client to a content delivery network in the plurality of content delivery networks received from the remote content distribution coordinator, wherein the content delivery network to which the remote client is directed is selected by the content management system.

11. The method of claim 10 wherein the information associated with the remote client included in the message comprises at least one of an Internet Protocol (IP) address, a user agent, a client type, and a display size.

12. The method of claim 10 wherein the message further comprises an indication of candidate content delivery networks on which the requested content is stored.

13. The method of claim 10 wherein generating the message comprises modifying an existing Uniform Resource Locator (URL) associated with the requested content.

14. The method of claim 13 wherein modifying the existing URL associated with the requested content comprises at least one of adding query parameters and changing a hostname.

15. The method of claim 10 further comprising buffering the remote client's request while awaiting a response from the remote content distribution coordinator.

16. The method of claim 10 wherein the remote content distribution coordinator is configured to select the plurality of content delivery networks from a plurality of candidate content delivery networks.

17. The method of claim 16 wherein the remote content distribution coordinator is configured to select the plurality of content delivery networks from the plurality of candidate content delivery networks based at least in part on at least one of the information comprised in the message, playback quality experienced by other clients determined to be similar to the remote client requesting content, a global Internet Protocol (IP) address, bitrates at which the request content is encoded, and a set of policies.

18. The method of claim 10, wherein the plurality of content delivery networks received from the remote content distribution coordinator comprises a prioritized list of content delivery networks.

19. A computer program product embodied in a non-transitory computer readable storage medium and comprising computer instructions for:
receiving, at a content management system, a request for content from a remote client;

in response to receiving the request for content from the remote client, generating a message comprising information associated with the remote client;

querying a remote content distribution coordinator at least in part by transmitting, from the content management system to the remote content distribution coordinator, the generated message including the information associated with the remote client;

receiving, from the remote content distribution coordinator, a plurality of content delivery networks on which the content requested by the remote client is stored, wherein the plurality of content delivery networks is determined, for the remote client, and by the remote content distribution coordinator, based at least in part on the information associated with the remote client included in the message; and directing the remote client to a content delivery network in the plurality of content delivery networks received from the remote content distribution coordinator, wherein the content delivery network to which the remote client is directed is selected by the content management system.

* * * * *